US006601057B1

(12) United States Patent
Underwood et al.

(10) Patent No.: US 6,601,057 B1
(45) Date of Patent: Jul. 29, 2003

(54) METHOD AND APPARATUS FOR GENERATING AND MODIFYING MULTIPLE INSTANCES OF AN ELEMENT OF A WEB SITE

(75) Inventors: John Underwood, New York, NY (US); Paul Neilson, New York, NY (US); Hanson Char, New York, NY (US); David Shing, New York, NY (US); Peter Horner, New York, NY (US); Mark Underwood, New York, NY (US); Darren Slaney, New York, NY (US); Gary Evesson, Jersey City, NJ (US)

(73) Assignee: Decentrix Inc., Denver, CO (US)

( * ) Notice: Subject to any disclaimer, the term of this patent is extended or adjusted under 35 U.S.C. 154(b) by 28 days.

(21) Appl. No.: 09/702,356

(22) Filed: Oct. 30, 2000

Related U.S. Application Data

(62) Division of application No. 09/651,874, filed on Aug. 30, 2000.
(60) Provisional application No. 60/163,782, filed on Nov. 5, 1999, and provisional application No. 60/184,300, filed on Feb. 23, 2000.

(51) Int. Cl.[7] ............................................. G06F 17/30
(52) U.S. Cl. ............................. 707/1; 715/530; 715/517
(58) Field of Search ............................. 707/1, 530, 517

(56) References Cited

U.S. PATENT DOCUMENTS 6,304,886 B1 * 10/2001 Bernardo et al. ........... 707/517
6,308,188 B1 * 10/2001 Bernardo et al. ........ 707/501.1

* cited by examiner

Primary Examiner—Joseph H. Feild
Assistant Examiner—Rachna Singh
(74) Attorney, Agent, or Firm—Frommer, Lawrence & Haug LLP; Gordon Kessler; Dexter Chang

(57) ABSTRACT

A technique for modifying a web site generated in accordance with received data entry by: determining at least one characteristic of at least one web site dimension of the web site based on the data entry; generating a multi-dimensional description of the web site based on the determined characteristics; retrieving web site data according to the generated multi-dimensional description of the web site; generating the web site based upon the generated multi-dimensional description of the web site and the retrieved web site data; receiving modification data modifying at least one of the determined characteristics; and regenerating the description of the web site based upon the modified characteristics.

50 Claims, 87 Drawing Sheets

Definer Publishing Products Cycle

```
http://snook.us.hs.net - Microsoft Internet Explorer                        _ □ X
                          SITE-DEFINER ○
                              [Go Back]
                            Copy a site
         From Site       To New          Industry
         Name   ▭        Site Name ▭     Type    [general ▼] [Copy]

Create a site
         Select Your                     Site
         Industry Type [general ▼]       Name (SIS) ▭        [Create]

Display sites              ╱ 615
   1010           Display sites from [All ▼] [Display]
       ╲
        ┌─────────────────────────────────────────────────────────────┐
        │ Acts Arts and Entertainment          │edit│edit 800x600│edit 1010x680│delete│export│test│
        ├─────────────────────────────────────────────────────────────┤
        │ Amusement Park Arts and Entertainment│edit│edit 800x600│edit 1010x680│delete│export│test│
   1005 ├─────────────────────────────────────────────────────────────┤
        │ Artists Arts and Entertainment       │edit│edit 800x600│edit 1010x680│delete│export│test│
        ├─────────────────────────────────────────────────────────────┤
        │ Galleries Arts and Entertainment     │edit│edit 800x600│edit 1010x680│delete│export│test│
        ├─────────────────────────────────────────────────────────────┤
        │ Independent Movie House Arts and Entertainment│edit│edit 800x600│edit 1010x680│delete│export│test│
        └─────────────────────────────────────────────────────────────┘
```

| http://snook.us.hs.net/servlet/MainservletCore | | □⊡☒ |
|---|---|---|
| Insert Table | | OK Cancel |

Size

Number of Rows [1 ▼] — 2705　　Number of Columns [　▼] — 2710

Layout

| Alignment | [Default ▼] — 2715 | Border On | □ — 2730 |
| Cell Spacing | [　] — 2720 | Cell Padding | [　] — 2735 |
| Background Color | ⟨Colors⟩ — 2725 | | |

2745

| Width | 2740 [Default ▼] [Default] | Percentage □ (Pixels if not checked) |
| Height | [Default ▼] [Default] | Percentage □ (Pixels if not checked) — 2755 |

2750

2700

FIG. 27 http://www.clickthings.com/servlet/MainServletCore?v=EditPage ....

Add Page                                    OK   CANCEL

Page Name [                    ]——3205
Based on Page [Layouts1_Column_Picture_Left  ▼]

3255 http://www.clickthings.com/servlet/MainServletCore?v=EditPage ....

Choose Page Layout                           OK   CANCEL

Choose Page Layout [AE Empty         ▼]

Site Definer - Microsoft Internet Explorer

DEFINER — Site Definer (Actors) Test Exit

Who_We_Are | Add Page | Page Details | Add Questions | Edit Content | Delete | Exit Home
- Who We Are
- Articles
- Calendar
- Reviews
- The shop
- Contact us
- Fan club
- Prices
- News
- Faq
- Links
- Search

Edit Questions

Click on a red arrow to add optional questions to *who_we_are* page

— 3810
— 3905

Insert Heading
Content Question
Text Question
Text area question
Drop Down question
Paste Component Default value is: No.

Background
Entertainment in our blood. Literally.

Art Simon and Doug Zimmer grew up in show business families

Sandra Dorobas, entertainment career began in junior high school.

Is your history or background an important selling tool?

Default value is: No.

Awards  1993 finalist

Would you like to mention any awards you 1405    3805    1410

FIG. 39

| http://snook.us.hs.net/servlet/MainservletCore | |
|---|---|
| Content Question | OK Cancel |

Question [_____] 4005
Name [_____] 4010
Default Answer Yes⊙ No○ — 4020
          4015
Answer [_____▲]
       [_____▼] Edit
              4025

| http://www.clickthings/servlet/MainServletCore?v=EditLook | □ 🗗 ☒ |
|---|---|
| Edit Table | Apply  OK  Cancel |

Specifications for current (highlighted) cell

| 1.1 | (5%) (65%) |

Width    25    25    Percent ☑ (Pixels if not checked)
Background color    Colors
Horizontal Alignment    center
Vertical Alignment    top

---

Cell Operations    Clear Cells
Row Operations    Insert Above    Insert Below    Delete
Column Operations    Copy Left    Copy Right    Delete
Table Operations    Delete Table    Edit Table    Cut    Copy

```
http://www.clickthings/servlet/MainServletCore?v=EditLook          _ 🗗 ☒
Table Options                                                  ⬭OK⬭ ⬭Cancel⬭

Horizontal Alignment:  [ Default ▾ ]
              Width:  [ 100  ▾ ] [ 100      ] Percent ☑ (Pixels if not checked)
             Height:  [ Default ▾ ] [ Default  ] Percentage ☐ (Pixels if not checked)
   Background Color:  [ Default ▾ ] [ Default  ]
          Border On:  ☐
        Cell Spacing:  [        ] (in Pixels)
        Cell Padding:  [        ] (in Pixels)
```

ClickThingsIcom — Publish Your Website

Publishing Tips

Please complete all the information

Once you have published you will receive an email confirming your:
User name
Web site address When you have completed publishing your web site you can maintain and update your site via the ClickThingsIcom Member Control Console.

Just a few more details needed to publish your web site

Enter the following information to publish your Web site to be live on the Internet. When you have filled in all the information and click the 'OK' button

Personal Information

First Name
Last Name
Email Address

Company Information

Company Name
Phone
Fax (optional)

FIG. 64A

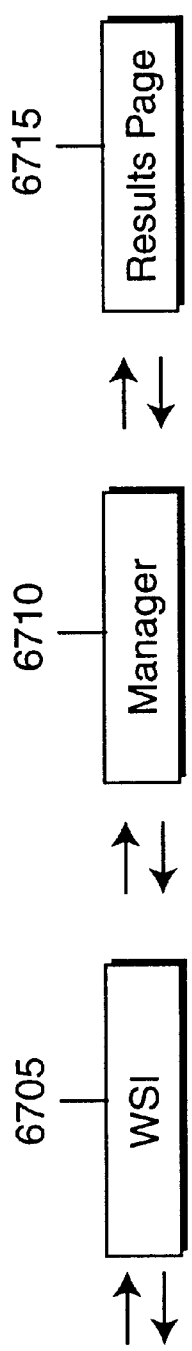
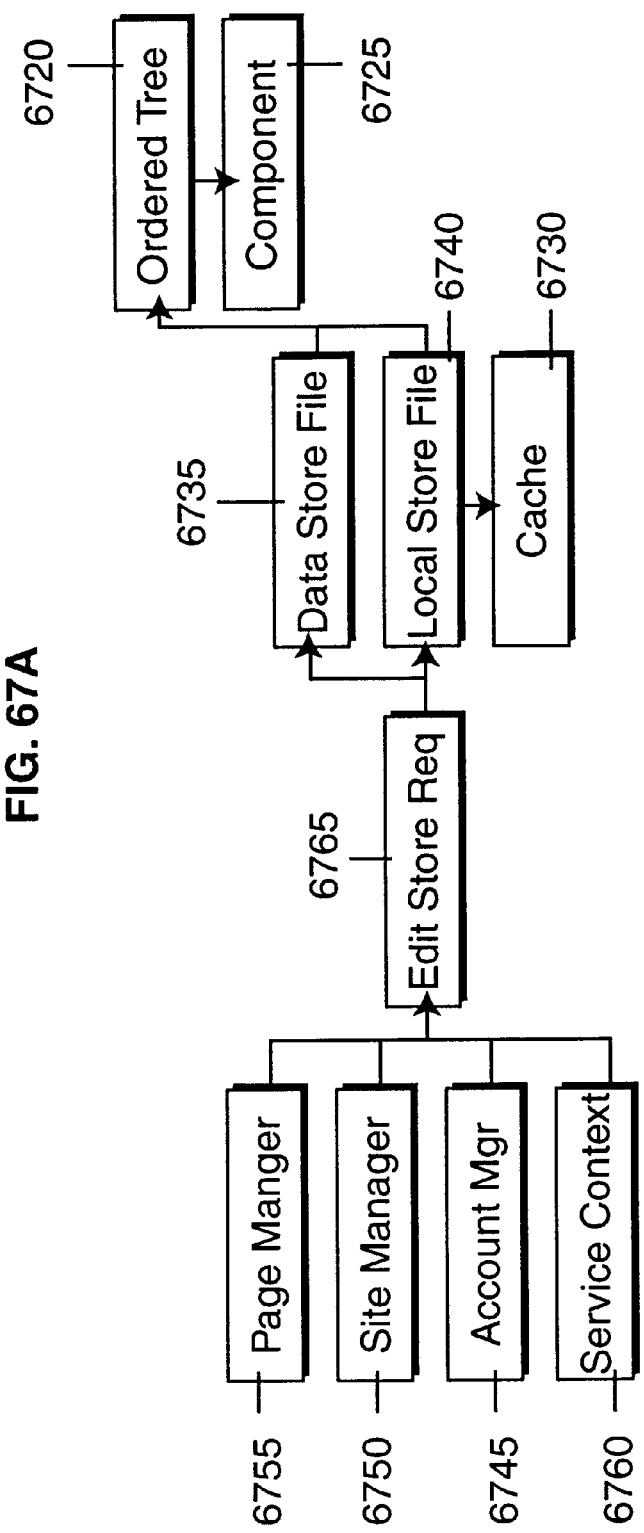
FIG. 67A
FIG. 67B

Frequently Asked Questions
Q:    Click to Edit Question
A:    Click to Edit Answer
Edit Answer
Delete Question and Answer
Copy Question and Answer
Cut Question and Answer
FIG. 72

```
<HTML>
<HEAD><TITLE>Simple DXC Callback</TITLE></HEAD>
<BODY>
{%dxc_init}
<a href="DXCCallback_{%id}('UserClickedNotify')">Notify</a>
</BODY>
</HTML>
```

FIGURE 73

```
<HTML>
<HEAD><TITLE>DXC Text Editor Example</TITLE></HEAD>
<BODY>
{%dxc_init}
<a href="DXCTextEdit_{%id}('This is some text', 'NewTextData=%t')">This is some text</a>
</BODY>
</HTML>
```

FIGURE 74

```
<HTML>
<HEAD><TITLE>DXC Popup Example</TITLE></HEAD>
<BODY>
{%dxc_init}
{%dxc_menu pop1 'Option 1|Option 2|Option 3'}
<SCRIPT language="JavaScript">
<!--
DXCSetMenuItem_{%id}("pop1", "Option 1", "javascript:DXCCallback_{%id}('Pop1.Option1')");
DXCSetMenuItem_{%id}("pop1", "Option 2", "javascript:DXCCallback_{%id}('Pop1.Option2')");
DXCSetMenuItem_{%id}("pop1", "Option 3", "javascript:DXCCallback_{%id}('Pop1.Option3')");
// -->
</SCRIPT>
<a href="javascript:DXCShowMenu_{%id}('pop1')">Click here for menu</a>
</BODY>
</HTML>
```

FIG. 75

METHOD AND APPARATUS FOR GENERATING AND MODIFYING MULTIPLE INSTANCES OF AN ELEMENT OF A WEB SITE

RELATED APPLICATIONS

This is a Divisional of application Ser. No. 09/651,874 filed Aug. 30, 2000 now pending.

This application is based upon and claims priority from U.S. Provisional Application No. 60/163,782, filed Nov. 5, 1999, and No. 60/184,300, filed Feb. 23, 2000, which are incorporated herein by reference. Reference is made to the concurrently filed applications of Underwood et al.: "Method and Apparatus for Generating a Web Site Using a Multi-Dimensional Description of the Web Site", Ser. No. 09/651,906; "Method and Apparatus for Storing Web Site Data by Web Site Dimensions and Generating a Web Site having Complementary Elements", Ser. No. 09/651,907; "Method and Apparatus for Providing Conditional Customization for Generating a Web Site", Ser No. 09/625,612; "Method and Apparatus for Generating a Link to a Presented Web Page", Ser. No. 09/651,875; "Method and Apparatus for Generating a Web Site with Dynamic Content Data from an External Data Source Integrated Therein", Ser. No. 09/651,796; incorporated herein by reference.

BACKGROUND OF THE INVENTION

This invention relates generally to a method and apparatus for providing a universal interface for managing content on large computer networks and other devices.

In recent times, the World Wide Web maintained on the Internet, as well as other large networks of computers and other devices, has become a prevalent communications medium for wide-ranging purposes from information gathering and exchange to commercial transactions. As personal devices, such as computers, personal digital assistants ("PDA"s), cellular phones, etc., are becoming increasingly integrated with this medium, individuals are becoming more reliant on the content and services offered. As a result, it has become an important marketing and sales tool for various businesses.

For example, a business can advertise its products or services, accept orders for its products and services, receive various inquiries and other information from the general public, and in many other ways increase the ability to provide information to the public through the Web.

To take advantage of this new media outlet, it is necessary for a business to design and maintain a web site that users can visit, and to permit the desired interaction with the users. The procedure for designing a web site has historically taken one of two paths. First, it is possible for a business to purchase a software package that aids in generating such a web site. However, the look and feel of the web site would typically be similar to all other web sites generated with the same software package because the number of choices of design or "templates" is limited. Additionally, it may be difficult to coordinate and pool a wide range of skills from various personnel required to create such a web site. Furthermore, web sites created with such a software product typically do not have the level of complexity desired by businesses.

To overcome these drawbacks, a business may hire an outside consulting firm to generate its web site. Such a consulting firm may be an expert in web site generation, and may include personnel able to generate a high quality, complex web site in accordance with the business owner's desires. However, use of an outside firm includes various drawbacks. There is typically a long delay in generating a web site because the outside service is busy with many clients. Additionally, the business owner who has the most in-depth understanding of the business is not directly involved with the generation of the web site, and therefore must relate this information to the web site designers, who then use this information to generate the web site. It may take a number of iterations for the business owner to have his or her ideas about the business properly included in the web site. Additionally, because an outside consultant is designing the web site, artistic control for the web site must be given from the business owner to the web site designer. While the business owner may have the opportunity to make comments during design of the site, it is not possible for the business owner to be involved on a day to day basis in every aspect of the design of the site. Indeed this is why outside designers are hired, but at a cost. The resulting site may not be precisely what the business owner desires, and may be very expensive to implement.

Further, once the design of the web site is completed and the site is up and running on the World Wide Web, the maintenance costs for maintaining and updating a site may be substantial. Any additions to the site, such as adding new pages or new sections, may be very expensive. Furthermore, such added pages may not fit in with the overall scheme of the web site, thereby resulting in an unwieldy site. Additionally, while a web site may provide links to other web sites, it is typically difficult for an individual user to incorporate various complementary programs within its web site, such as calculators, or other business or scientific related information that perform a function.

Therefore, in general, the use of an outside firm to provide a web site isolates the business owners from the finished product in a way that the web site may become unwieldy to update, and therefore less useful for a business owner.

One of the current trends in web site development products is the ability to drag objects and position them anywhere on the screen. While this ability would seem to be beneficial, the process of dragging objects around a screen may result in the user drastically affecting the compatibility of their web site with their visitors. This problem is a result of the user possibly placing objects outside of the visibility of the visitors' web browser. Such a problem may arise if the user is developing a web site at say 1024×768 resolution, but the visitor is viewing the web site at 800×600 resolution. A user may place an object in a location that is unviewable by the visitor. Another example of incompatibility is when a user is developing a web site in a 800×600 resolution, but the visitor is viewing the web site at say 1024×768, the visitor will see a large area of "space" that does not fill the browser because of "fixed width" development of the web site. This development trend is seen as limiting as it does not cater for future screen and browser resolution compatibility.

The barriers to completing a usable and impressive web site noted above arise as a result of the division that exists between a business that wishes to advertise through a web site and the resources required to create and maintain that site. The skills required include hardware and software maintenance, business analysis, authoring of the web site with various page layout features, graphic design, generation of the web site content, actual computer programming and maintaining of a required data base. These skills require specialized knowledge of various tools by a user, including flow charting tools, various programming language knowledge, such as in HyperText Markup Language ("HTML"), JAVA™, JAVASCRIP™, etc., graphic design using Photo Shop™, Paint Shop Pro™ or other graphics design program, use of a word processor, and use of various database programs.

As is obvious, these skills and products require people having widely differing backgrounds to work together as a team to create a quality product that exists in what many naturally feel to be both a new and alien environment, the Internet. These people who collectively possess the skills to create a particular web site are not likely to be the owners of the business that is requesting the web site, and indeed in many cases are not in any way connected to the business owners who wish to generate the web site, or to each other. For this reason, maintenance of a quality web site in-house is very costly, and may be nearly impossible for many small businesses. Any web site that cannot be properly maintained soon fails in its goal of being an inexpensive, efficient, accurate and flattering representation of the company. As the information included in the web site becomes out-of-date, and unprofessional graphics and layouts are incorporated by unskilled personnel during maintenance, the entire look and feel of the web site deteriorates.

In general, these methods of web site generation may be categorized as "one-to-one"—that is, each individual web site requires the participation of a programming and design team to implement and maintain the site. Moreover, it has also recently become desirable to have an outside company host the web site to absorb the costs of maintaining the server hardware and software up-to-date and to flexibly handle variations and unexpected changes in traffic and volume of visitors and transactions on the web site. Such an outside company may be colloquially referred to as a "server farm". In general, a server farm seeks to create economies of scale by having a single company that is expert in the maintenance of the web server maintain and update the hardware and software necessary for the operation of a number of web sites. As web traffic and business grows, each company having a web site with the server farm will in theory not have to individually maintain personnel capable of scaling the servers to handle the traffic and business.

But to date, the server farm theory has suffered from the problem that control of the web site is further disconnected from the operators of the business. Changes to the content, structure and design of the web site are complex and expensive. Because the design and implementation are "one-to-one" there has been no means available for rapid proliferation of sites hosted by an outside server host, i.e., a method that does not require involvement of an experienced design and/or programmer for each site that is to be hosted.

Therefore, it would be beneficial to provide a web site generation method and apparatus that overcomes these drawbacks.

OBJECTS OF THE INVENTION

Accordingly, it is an object of this invention to provide an improved method and apparatus for web site generation that harnesses and coordinates all the resources required for creating, updating and maintaining a quality web site.

A further object of the invention is to provide an improved method and apparatus for web site generation that allows a user to make various selections regarding design of a web site and for the web site to maintain an overall consistency, regardless of these choices.

Another object of the invention is to provide an improved method and apparatus for web site generation that allows for the collection of various information from an external database to be used in making automatic selections regarding the design of a web site.

An additional object of the invention is to provide an improved method and apparatus in which a user may change the look and feel of a web site easily and throughout the web site, but the content and navigation of the web site is maintained.

Yet another object of the invention is to provide an improved method and apparatus for web site generation that allows various applications to be launched from within the generated web site while maintaining a user at the web site.

A still further object of the invention is to allow those who are responsible to a particular business, individual or other party to control,.manage, and easily modify both the content and the presentation style of the information in the web site.

It is an additional object of the invention to provide a method and apparatus for web site generation and maintenance that allows for centralized hosting of a number of web sites through a method that allows for rapid proliferation of the hosted sites without the need for experienced design and programming personnel to be involved on a site-by-site basis.

It is yet a further object of the invention to provide a method and apparatus for generating a functional web site that allows for the taking and fulfillment of purchase orders.

Yet another object of the invention is to capture differing skills of individual people necessary to generate a web site so that these skills can be combined in a "1-to-many" format, thereby insuring that a single person or skill is not restricted to a single web user but becomes available to all users.

Yet another object of the invention is to provide a method and apparatus where each graphical image can be stored as images and yet have textual content rendered and delivered as part of the graphical image, thus providing a dynamic method of providing a combination of content and graphical information.

Still other objects and advantages of the invention will impart the obvious and will impart the apparent from the specification and the drawings.

SUMMARY OF THE INVENTION

In accordance with one embodiment of the invention, a Universal Content Manager ("UCM") is provided by integrating, within one Internet navigation interface: a complete business web site solution; extranet/private Network, enabling companies to safely and efficiently deal with partners, vendors and suppliers; LifeSite, providing individuals and families with fully-realized and powerful personal Internet capabilities; comprehensive e-mail management; and storing and retrieving business financial and/or personal information.

In accordance with one aspect of the invention, there is provided an improved method and apparatus for generating and maintaining a customized web site, and more particularly to a method and apparatus for allowing an inexperienced user to make various design and content selections for generation of a customized web site. Regardless of the selections made by a user, correspondence between these selections is maintained by the apparatus such that each web site appears as a customized individual web site. A user may be prohibited or discouraged from making design choices that might detract from the overall look and feel of the site.

The user portion of the system includes a web site provider (hereinafter Definer) which acts as an assembly line for an end-user to generate a customized web site. The Definer references a large amount of diverse resources and presents them to a user for easy and intuitive assembly into a polished, complete web site. All of these resources can be provided to the end-user without the need for any specialized knowledge on the part of the user, and without the necessity for the user to be in direct contact with any skilled contributors to the web site generation process. The Definer is the user interface, or front end of a suite of complementary products designed to create a cohesive environment allowing various people with the numerous skills noted above that are required to build a web site to perform in harmony, thereby generating an environment that facilitates teamwork between web creators and web or business owners.

The Definer in accordance with the invention includes various modules, including a site provider (Site Definer) for defining the structure, content and embedded applications of a web site, a framework provider (Framework Definer) which provides various layout variations for a web site, an image provider (Image Definer) which allows for the selection and maintenance of various images on a web site, a Project Manager which coordinates the three prior Definer Publishing products to produce a professional multi-dimensional web site solution, and a web provider (Web Definer) which is the end-user tool that allows a user to select various combinations and to edit the web site. Through the use of such a system, technicians not related to the business owner can contribute essential elements to the production of a web site, including business analyses, graphics, page layout, and copyrighted content that may be used in a business owner's web site, and various applications that may also be incorporated into the web site. Because the provision of all of these features are provided independent of a business owner designing a web site, the end result of the work of each of the designers providing the above information will be available for all users during generation of each of their web sites.

A business owner, therefore, need only interact with the Web Definer to create and maintain a finished, polished web site. The Web Definer allows the owners of a web site to choose both the image, including look and feel, and the content information that their web site will present even though in most cases the owners of the business do not have the technical skills required to achieve this objective from scratch. Thus, the Web Definer brings all of the elements created by skilled personnel using various tools and skills, together in a powerful and intuitive interface that can be easily used by non-technical end-users to create and maintain unique web sites of a professional quality. The Web Definer performs this function by collecting all essential elements of a web site and then simply allows the business owner to arrange, color, and combine these essential elements in an almost infinite number of ways. Thus, the Web Definer acts as a "web kaleidoscope" wherein by a user simply pressing various buttons or making other simple choices, the elements of a user's web site rearrange themselves in accordance with various parameters until a desired effect is obtained. Additionally, maintenance can be performed at any time, and the look and feel of a particular web site can be changed in a matter of minutes. This is because the Web Definer, while allowing a user to change the look and feel of a web site, maintains the content and navigation of the web site, if the user desires, without making any changes thereto. In this way, rather than tediously redefining and recording new areas of a web site to see how changes would be incorporated, it is simple for a user to simply select a new look and feel, colors, or any one of the other number of almost infinite combinations to re-present its web site in a different light. In the preferred embodiment, the process of rearranging or regenerating selected features of the web site while keeping others constant is so simple that the user can create, view, and save for future consideration, a large number of different versions by "trial and error"—all within a matter of minutes.

The web site designing method and apparatus of the present invention are unique in that the method and apparatus provide great functionality traditionally provided by a diverse range of products and services into one cohesive environment launched from a globally accessible platform through the Internet or other computer network. The product includes a shared proprietary repository of finite, interchangeable, independent resources that can be easily combined to create an almost infinite number of web sites and allows for all human resources to contribute and be accessed at a single location.

Further, the invention preferably allows for the alteration of the structure of the web site by allowing pages or sections to be moved, added or deleted with all referencing and referenced portions to be updated automatically. Accordingly, a page can be added simply by specifying the referencing page(s) and links will be automatically provided on the referencing pages. This change to the navigation is performed automatically. There is no need for a designer to reprogram the links on every referencing page.

An additional feature of the invention permits rapid proliferation of web sites hosted by a central server system. The web sites generated by the invention may themselves reference a central hosting system containing the necessary software and hardware for carrying out the invention. Thus, each web site generated provides access for additional users to generate their own web sites, which in turn provides additional points of access. Each site so generated may be hosted on the same centralized system, eliminating the need for the business owner (or other site generating person or entity) to host and maintain the necessary equipment, and personnel. Thus, the invention enables for the first time a true one-to-many method and apparatus allowing for rapid proliferation of sites hosted on a central server form.

By providing a self-replicating method for generating a multitude of vastly different, unique web sites the invention provides a "one-to-many" method for generating and hosting web sites, overcoming a major obstacle present in current web generation methods and devices. In other words, in the preferred embodiment, a single web site generator according to the invention can be used to generate a vast number of unique, professional web sites, hosted by a single host, which may be comprised of whatever hardware and software is necessary to host the business and traffic created by the sites hosted.

It should be noted that although the invention is herein generally described in the context of business applications, it is equally useful for non-business applications, such as individual or family web sites, and may be used by non-profit businesses, government agencies or bureaus or almost any individual, group or organization desiring a web site for any legal purposes.

The method and apparatus in accordance with the invention ease the web site design process by providing various features. These include navigation, variation and presentation, separation, business-driven content, colors and What-You-See-Is-What-You-Get ("WYSIWYG") editing. These features will each now be described.

The method and apparatus in accordance with the invention provide a unique navigation model to protect users from one of the main maintenance obstacles faced by those using traditional authoring tools—maintaining navigation through the web site when the web site is edited. In accordance with the invention, the navigational links that provide access to all pages of a user's web site are maintained no matter how the user changes or manipulates the underlying structure of the site, such as the look and feel or the content. This is achieved in accordance with the invention by an algorithm that governs the most efficient way to maintain links between pages of the web site based upon their structural relationship with one another. Thus, the presentation of the site remains consistent no matter what changes the user makes. With the time-consuming, error-prone task of maintaining navigation out of a user's way, the user is free to organize and present their web site in any way they like without worrying about maintaining the navigation.

In accordance with the invention, each user can present a unique web presence to the marketplace with very little effort. In accordance with the invention, a large collection of images called "image sets" are available. Each image set is diverse in nature, but conforms loosely to a theme. Once a user chooses a particular image set, he or she can select from among the pictures in the set and combine these images in any way to create a unique web site, with any combination assured to appear professionally designed. This is referred to in the invention as a "multidimensional presentation." Almost an infinite number of combinations are available so that a user's web site not only looks professional, but also unique.

In accordance with one aspect of the invention, while the features of the web site are all intertwined, the invention allows a user to change one or more of most of the attributes of the invention without affecting the other attributes of the web site. The presentation, structure, navigation, content, target resolution, etc., of each web site are maintained independently from each other. Any of these major attributes may be changed at any time without affecting the others. Thus, a user may change the content, navigation, or even the entire look and feel of the site, and the other attributes are maintained, and automatically updated to incorporate the user's change. This ability allows for more frequent, less expensive updates of the user's web site.

The invention insures: (1) that users are able to publish a quality web site with a minimum amount of work, (2) that the content of the web site is customized for a user's business, and (3) that a user's web site can include all of the most up-to-date features for a particular industry (pre-created industry content may be provided to a user). In accordance with a preferred embodiment of the invention, pre-created industry content ("dynamic content") is provided to a user in one of over 200 industry groups. This content is then customized to each user based upon answers to various questions. The answers to these questions generate site-wide variables that set the look and feel of the site. Changing of any of the variables affects the entire site in a cohesive manner, including the addition or removal of industry-based content. A user can therefore generate a customized web site including individual and industry-based content. In addition, the user can edit the textual and graphic content, and can import its own content, including logos and/or graphics and text that the user has previously created. The user's various information could also be obtained from an external database.

While a user can change many attributes of the web site, these changes may be maintained within a predetermined range in accordance with the method and apparatus invention. Thus, for example, when a user wishes to change a color, the user may be limited to only colors that have been determined to be "safe" in regard to the other colors employed for the site. Re-coloring of images may be limited to aesthetically-pleasing colors and may also prevent certain colors, such as black or white from changing. Users can recolor images and be sure that the selected colors will aesthetically blend with the colors on the remainder of the web site.

The method and apparatus of the invention may also provide a user with WYSIWYG editing so that any change requested by a user is immediately implemented for viewing by the user.

The present invention is particularly suited for electronic commerce applications, including both business-to-consumer and business-to-business applications. In one preferred embodiment the web site generated is configured so that all aspects of an electronic business can be maintained on a single web site.

The web site may be maintained so that there are a variety of passwords or other identification method (including "cookies"), each of which may allow specialized access to various portions of the site. For example, a potential customer may have a general-user password, or may require no password. Such a user would preferably have access to all informational and purchasing areas of the web site. The customer could place orders for various items offered for sale and could obtain all of the information on the products and the business offered throughout the web site. A different user, for example, in the warehousing segment of the electronic business, would preferably have access to a running inventory list of all items purchased by the on-line customers with all appropriate routing, delivery and other information which could be used either directly from the web site to fulfill the customer's orders or downloaded onto the user's own computer system for further processing. Other users could have further different types of access. For example, the accounting personnel could have access to a segment of the web site that maintained data on all sales, profitability, payments, etc. Marketing personnel could have access to various types of information that could be collected during the purchasing process such as personal profile data on the various types of consumers who purchase different types of goods, the origination of business as "click throughs" from other web pages or from other sources, projections, etc. One particularly beneficial aspect of this feature is that it allows for efficient use of outsourcing, i.e., the accounting or marketing user can be an outside firm who has full access to all necessary information without having to physically visit the premises of the business. A large accounting or other professional firm can provide a standard interface to all of their customers so that all data is provided in a uniform and efficient manner.

The web site can be configured to include all of the necessary software to perform accounting, marketing, routing, delivery, and other functions, such that the entire electronic business is hosted at the centralized web site server system. Alternatively, portions of the business may be hosted at the various physical locations where the business operates.

The web site may be formatted so that it presents a different appearance depending on a number of factors including: the access password or other identification provided by the user (e.g., user profile, navigation history, etc.), or the capabilities of the device used to access the web site. For example, accounting personnel who log on may be presented only with the relevant accounting data in a format to which they are accustomed. Likewise, a customer or sales person who accesses the site through a reduced-capacity device such as a personal digital assistant (such as those currently marketed under the tradename Palm Pilot), a cellular telephone, or other communication device including those that have not yet been developed, would preferably be presented with the web site in a format useable by the accessing device. The web site can be configured so that it recognizes the format of the accessing device and presents a format that can be transmitted and used by the accessing device.

The web site may include content in any of a number of formats, including text, graphics, audio, video, audio-video, or other media that may be developed. The web site may also be generated to HTML that re-scales dynamically. In other words, the web sites that the product generates may dynamically automatically resize down to a resolution of 800×600 pixels which is usually the lowest level of most people currently using on PCs. This resolution is increased depending on the visitor's equipment. The site can also be formatted during editing to depict the look of the site on a reduced capacity device, such as a palm computer, cellular telephone or the like. Thus, a user can design and view a web site for a variety of preview devices of differing capabilities.

The invention also provides for an area in the customer control panel, where a user can get a list of all the different sections available for use in a web site with a description of what each does and the ability to preview the pages in the sections. These sections can be generated by third party developers, and may include external components developed using a software development kit ("SDK"). If the user likes a particular component, the user would enter a credit card number, click a button and that section would appear in the user's site and be paid for by the user.

Therefore, in accordance with one aspect of the invention, an easy to use method and apparatus is provided that removes many of the complexities of designing and maintaining a web site. A user is provided with suggested content, based upon an industry of the business, that can be modified as desired. Navigation is maintained independent of the designer. A graphical representation of this navigation is shown. The removal or addition of a page automatically generates an updated navigation. The style, colors, or art employed can each be modified without concern for the others, the content or the navigation. The inventions allow a designer to choose what he or she wants, and for direct implementation. No intermediaries are necessary.

In accordance with another aspect of the invention, an easy to use method and apparatus is provided for designing a targeted publishing/marketing web site that provides the method and apparatus (tools) for building and maintaining web sites of the invention to users and/or businesses of a certain category. For example, a designer may integrate new suggested content, navigation, styles, colors, art, etc. into a targeted publishing/marketing web site where new users of a certain category may create new web sites by choosing from the suggested content, navigation, styles, colors, art, etc., provided by the designer.

In accordance with yet another aspect of the UCM of the invention, a web environment may be provided for personalized content to an end user. In addition to creating a "virtual storefront" web site on the web, the Definer may be used to design a web site that provides a single URL access for site management of the "storefront" web site and all other aspects of web surfing, including personal content of individual end users. The population of content in a UCM web site may be based on a web site owner's business, interests indicated by an individual user, or suggested by the UCM based on the user's profile. The UCM web site provides a venue for businesses to provide targeted goods and/or services and to provide a flexible "one-stop" web experience for end users. Its features include: user profile orientation; natural web site navigation for content organization; navigation driven, context sensitive "billboard content"; complete "communication" services (including email management, chat, group calendar); web site creation and publishing; and Integrated business services.

The invention accordingly comprises the several steps and the relation of one or more of such steps with respect to each of the others, and the apparatus embodying features of construction, combinations of elements and arrangement of parts that are adapted to effect such steps, all as exemplified in this disclosure.

BRIEF DESCRIPTION OF THE DRAWINGS

For a more complete understanding of the invention, reference is made to the following description and accompanying drawing(s), in which:

FIGS. 6 to 11 illustrate the interface and functionality for creating, managing, and saving web site templates provided by the Site Definer module according to an embodiment of the invention;

FIGS. 12 to 40 illustrate the interface and functionality of creating and editing the default structure and content of a web site template provided by the Site Definer module according to an embodiment of the invention;

FIGS. 48 to 63 illustrate the interface and functionality of creating and editing a new web site provided by the Web Definer module according to an embodiment of the invention;

FIGS. 64A and 64B depict a registration web page for publishing a web site created using the Web Definer module according to an embodiment of the invention;

FIGS. 66 to 68 illustrate the program/data structure for providing Universal Content Management according to an embodiment of the invention;

FIGS. 71 to 82 show the processes for creating, editing, and selling external components according to an embodiment of the invention.

DETAILED DESCRIPTION OF THE PREFERRED EMBODIMENTS

Figure 1:
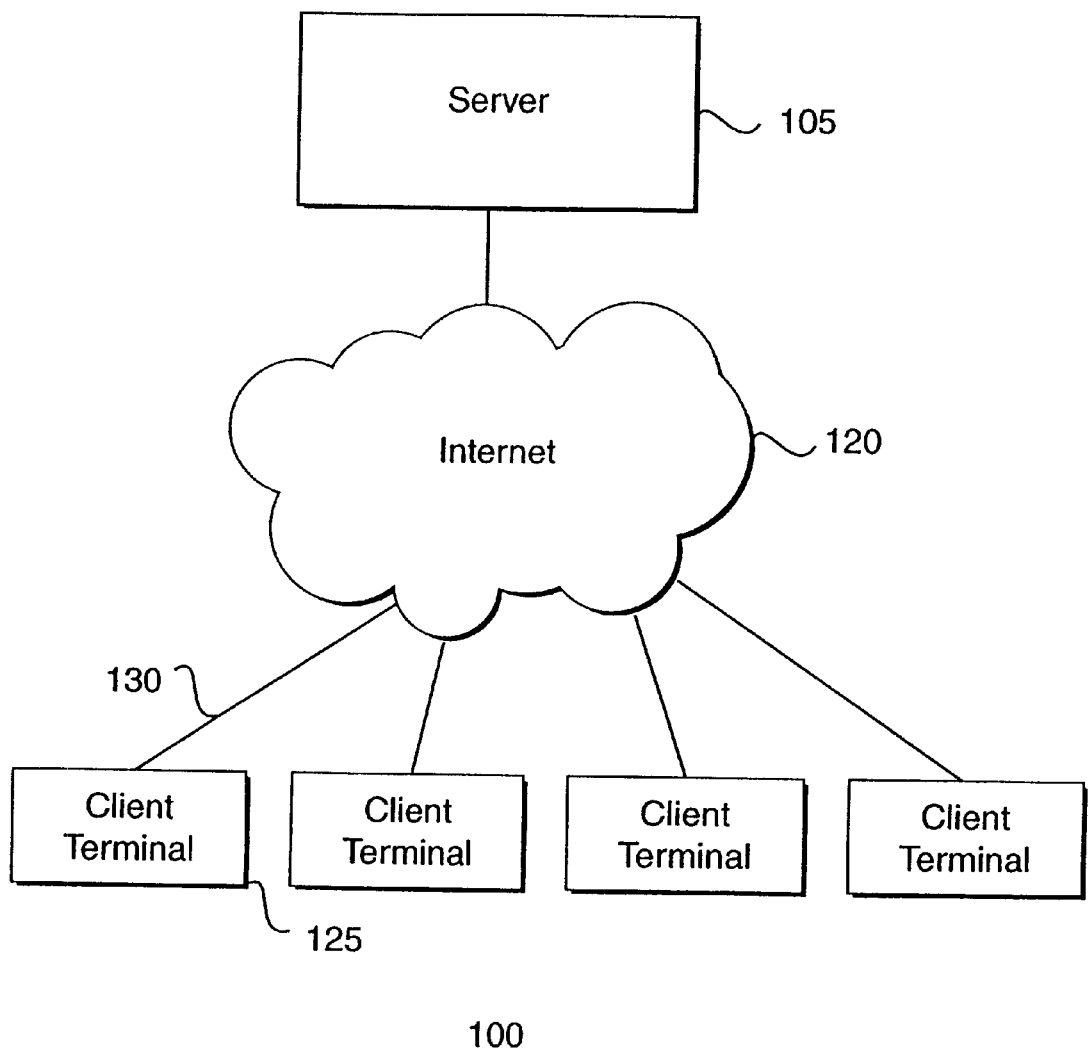
FIG. 1 depicts an overall-system configuration for providing Universal Content Management in accordance with an embodiment of the present invention.

FIG. 1 illustrates an arrangement 100 in accordance with an embodiment of the present invention for communicating information. In this illustrative embodiment, a server 105 in arrangement 100 is coupled to one or more client terminals through Internet 120. One such client terminal is numerically denoted 125, which may be a personal computer ("PC") or the like. Internet 120 is a packet switched network for transporting information and packets in accordance with the standard transmission control protocol/Internet protocol ("TCP/IP"). Other networks may also be used, including those not yet developed. Server 105 provides the Definer interface of the present invention for web site generation to each client terminal 125 via Internet 120.

Communication software including browser software, e.g., NETSCAPE NAVIGATOR™ or MICROSOFT EXPLORER™ is installed at each client terminal 125 for communicating information with server 105 via the Hyper-Text Transfer Protocol ("HTTP"). Server 105 is identified by a predetermined Uniform Resource Locator ("URL") on Internet 120. Therefore, to access the UCM in accordance with the invention, including the Definer interface for web site generation, provided by server 105, a modem (not shown) or other communication means in client terminal 125 is used to first establish a communication connection 130 with Internet 120. In addition to a plain old telephone service ("POTS") connection using a conventional modem, it is well-known that client terminals may establish connections to Internet 120 through different high-speed connections, such as an integrated services digital network ("ISDN"), a digital subscriber line ("DSL"), a fiber-optic cable, a T1 line, or the like. Wireless connections may also be used.

After the establishment of communication connection 130, client terminal 125 is assigned an IP address for identification on Internet 120. The user at client terminal 125 may then communicate with server 105 by accessing the aforementioned identifying URL through Internet 120. In accordance with the invention, the user at client terminal 125 is able to access the Universal Content Manager in accordance with the invention.

One aspect of the Universal Content Manager is a Definer software for generating a complete quality web site by communicating with server 105.

Figure 2:
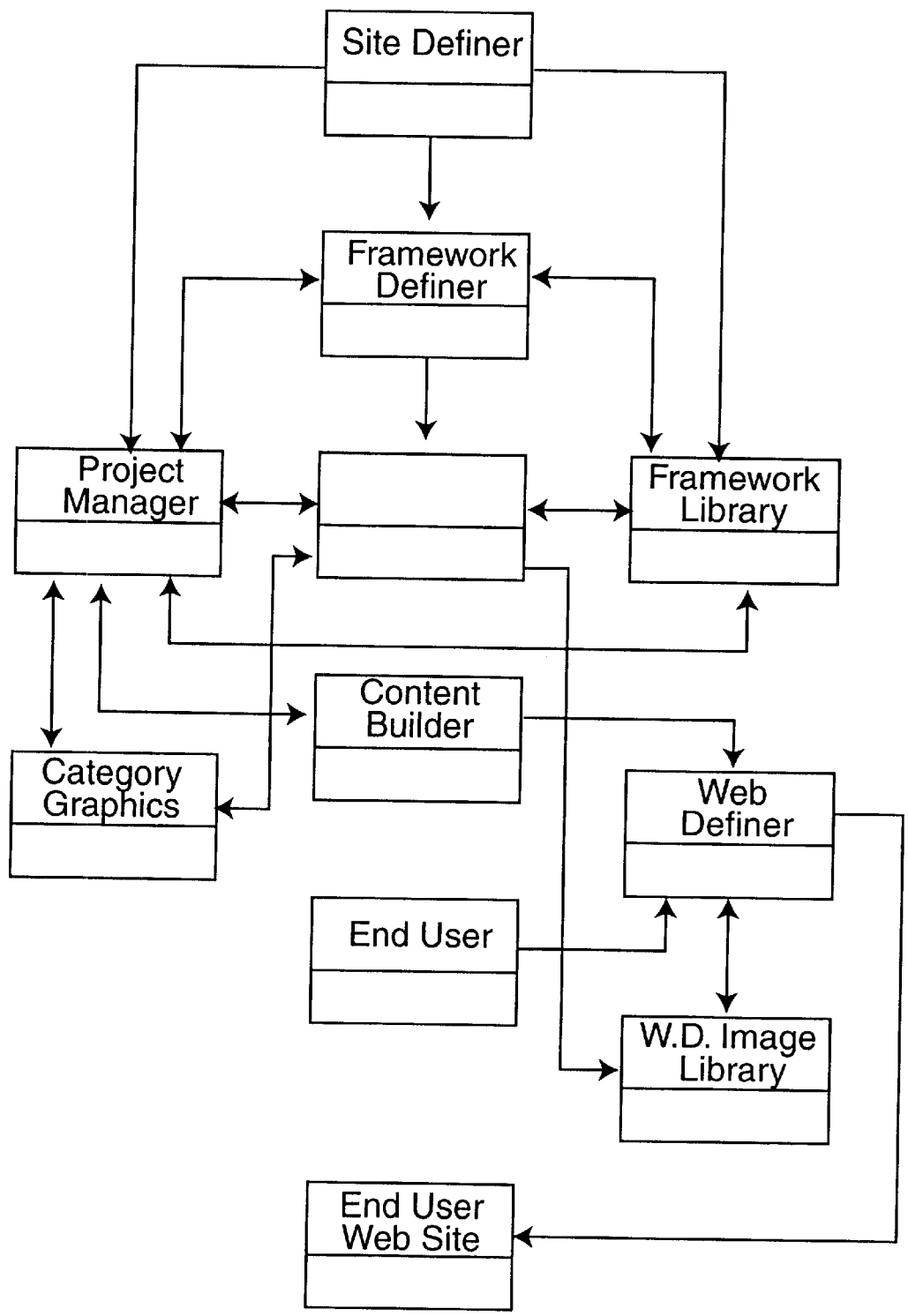
FIG. 2 illustrates the interaction between a number of software modules according to an embodiment of the invention.

Referring now to FIG. 2, a structure of Definer in accordance with an embodiment of the invention is illustrated and described. As shown in FIG. 2, the Definer comprises a Site Definer, a Framework Definer, an Image Definer, a Project Manager, and a Web Definer.

Site Definer provides an interface for designing web site navigation models and content types, known as vertical market solutions, with the simple interface usable by a vertical market analyst.

Framework Definer provides an interface for producing creative web site frameworks that are separate from the content ("userspace") of a web site. The designs may be HTML table layouts.

Image Definer provides an interface for a Graphic Designer to create images to match a specific Framework layout and are designed by theme type. The design is based on an image brief provided by the Project Manager, which includes the theme and the quantity of images needed. Preferably, all the image sets are developed with a minimum of 5 image sets per theme and a minimum of 5 Frameworks.

Content Definer provides content for a vertical market solution created using Site Definer. It includes site navigations most suited for specific industries. Content Definer also provides for industry specific questions that allow a user to customize a web site. The questions may be automatically generated as a customized questionnaire of multiple choice questions, multi-selectable answer and variable entry boxes. The content and navigation of a web site may be generated based on the answers to a questionnaire. Content Definer also provides industry specific components and text descriptions to be included in a web site. It includes a feature for developing a specification request for developing a component to a development partner. This information about a business may also be collected from a database.

Project Manager coordinates a number of the Definer Publishing products to produce a professional multi-dimensional web site solution. It receives the requirements from the Site Definer, sends an image brief to an Image Definer, sends a site definition to Content Definer for specific industry content, determines the number of available frameworks and corresponding image sets, and coordinates the completion of a web site generation project for Web Definer.

Web Definer provides a template web site, which is generated using the other Definer modules, to an end user according to the characteristics of the end user's business and/or the end user's preferences; provides an interface for editing the provided template web site into a unique web site; and publishes the web site created by the end user onto the World Wide Web.

Figure 3:
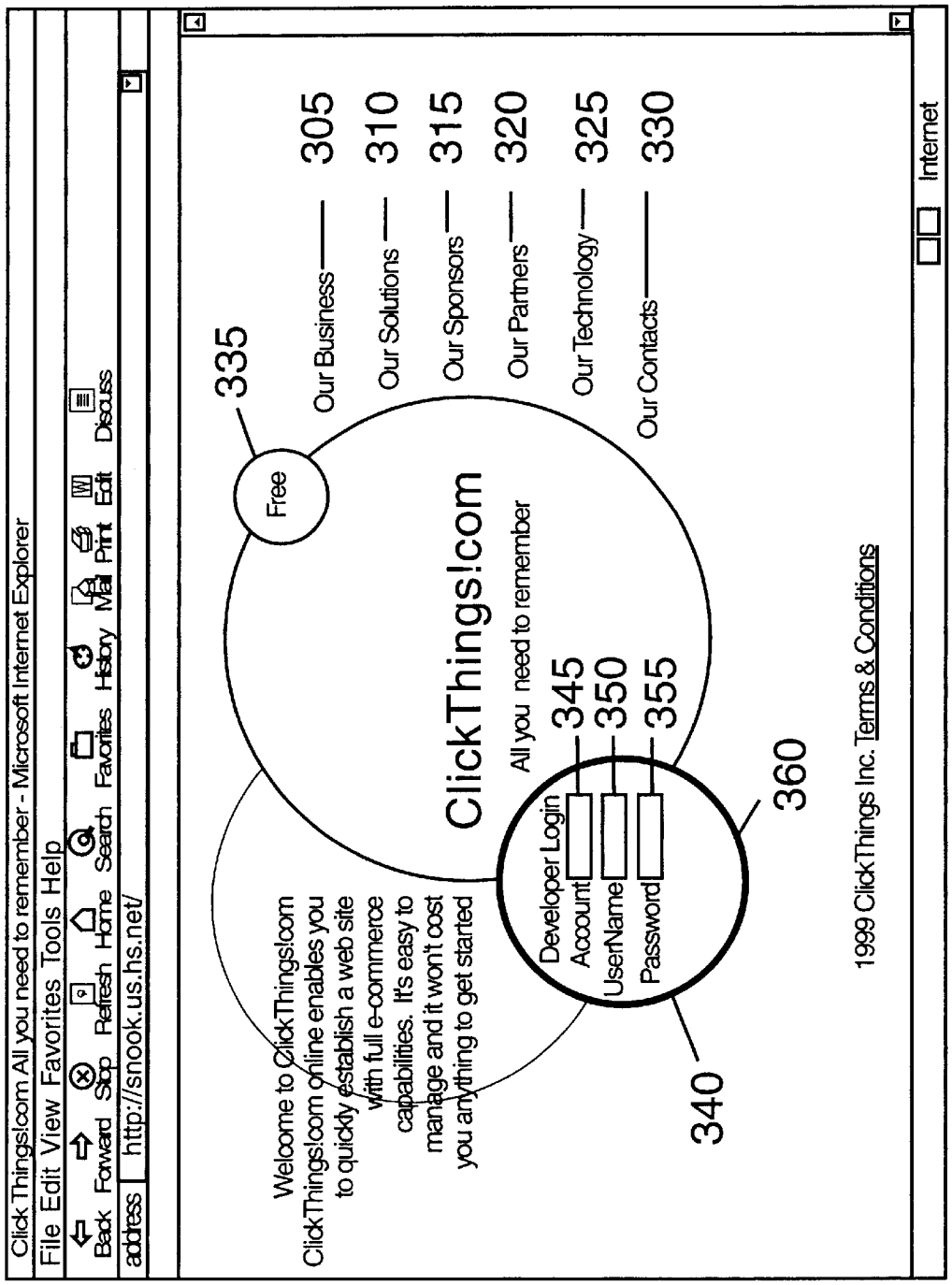
FIG. 3 shows an initial welcome web page according to an embodiment of the invention.

FIG. 3 illustrates an example of an initial welcome page 300 that is displayed on client terminal 125 after accessing the aforementioned predetermined URL identifying server 105. As shown in FIG. 3, page 300 includes a plurality of links 305, 310, 315, 320, 325, and 330 for accessing various additional information and services within the URL identifying server 105. A Join button 335 directs client terminal 125 to a web page for registering a new user. A box 340 comprises one or more text entry spaces 345, 350 and 355 and button 360 for logging in an existing, registered user to the Definer interface. Links 305 through 335, if selected by a user, would direct client terminal 125 to web pages directly linked to initial page 300 at server 105 where introductory information on the Definer software and its provider is displayed on client terminal 125.

As noted above, box 340 provides text-entry spaces 345, 350, and 355 for entering a previously-defined account name, a user name under the account name, and the corresponding password, respectively. Server 105 authenticates the entered information after a click on OK button 360. If the information from spaces 345, 350, and 355 correspond to a valid, previously-defined, existing user under a valid account, then client terminal 125 is directed to a web page comprising services and links designed for the existing user, as will be described in detail below.

Figure 4:
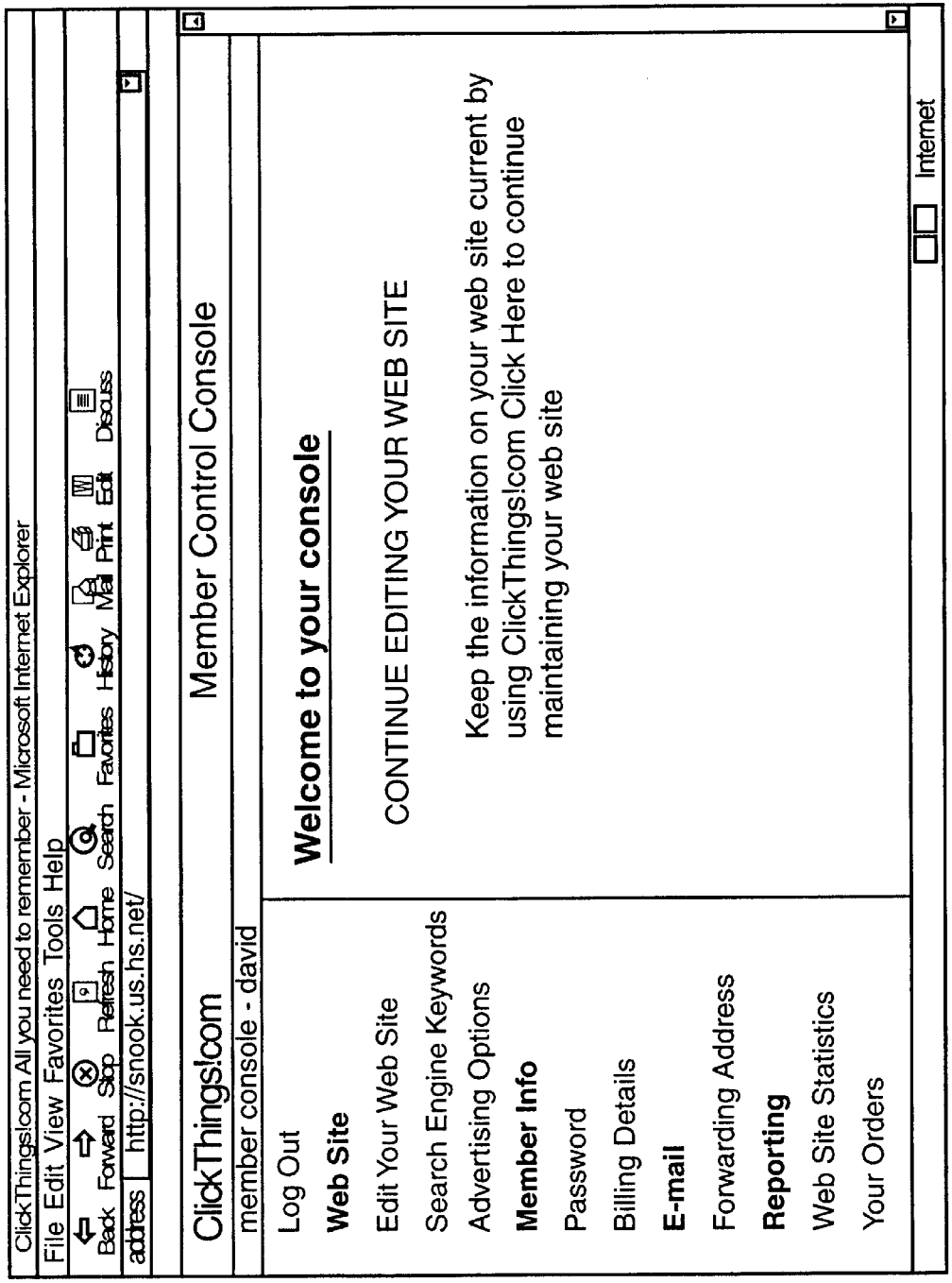
FIG. 4 depicts a member control console web page according to an embodiment of the invention.

FIG. 4 illustrates control console page 400 for accessing the services and links of the Definer Publishing modules for an existing user. An Edit your Web site link 405, if selected, directs terminal 125 to a Definer page 500, as illustrated by FIG. 5.

Figure 5:
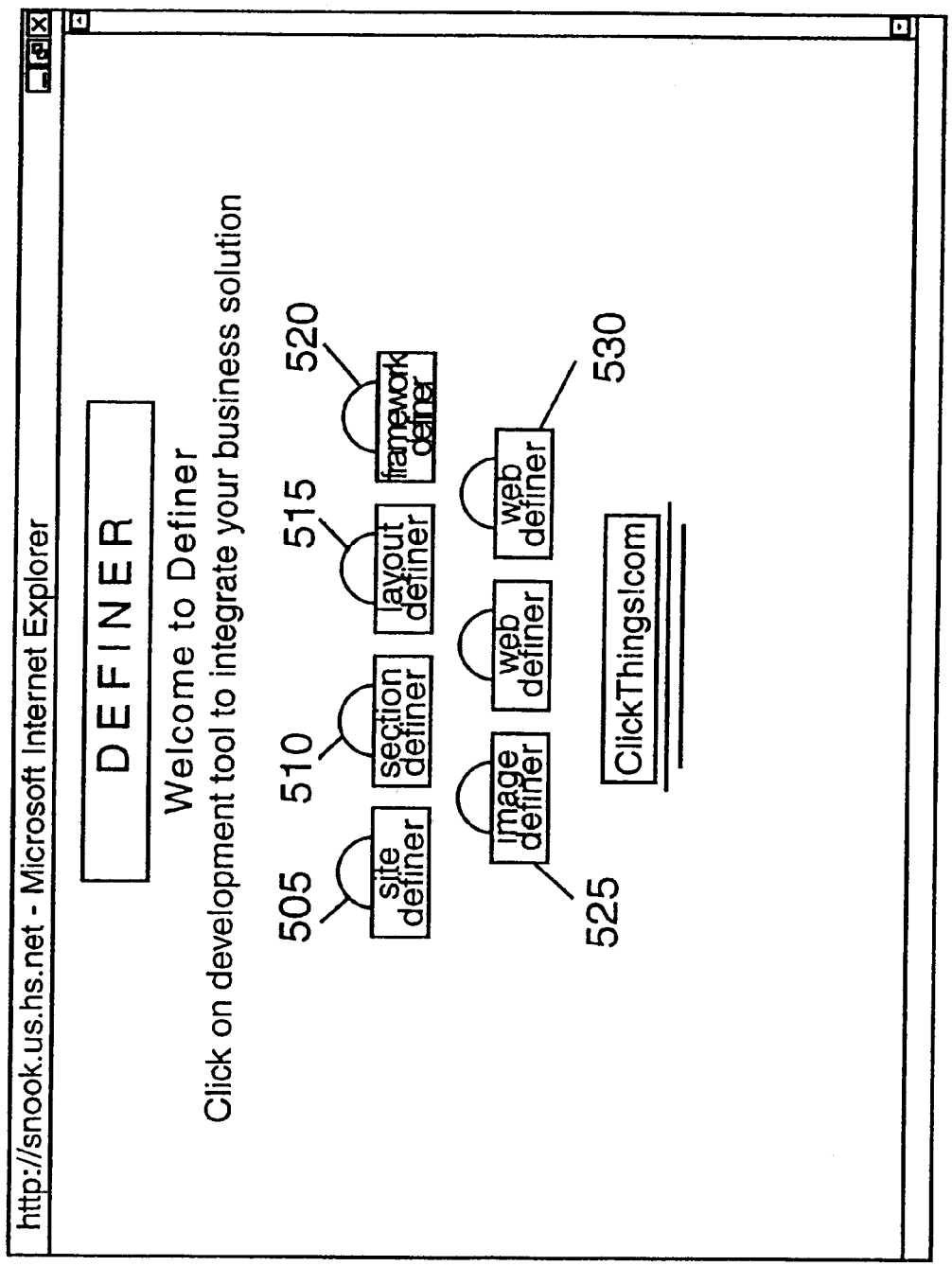
FIG. 5 shows a module selection web page for selecting a program module according to an embodiment of the invention.

As shown in FIG. 5, Definer page 500 comprises links to individual modules for designing, editing, and publishing a web site, such as a Site Definer link 505, a Section Definer link 510, a Layout Definer link 515, a Framework Definer link 520, an Image Definer link 525, and a Web Definer link 530.

As described above, Site Definer is a design module for creating the generic structures, content, and embedded applications for web site templates. Framework Definer provides tools for defining various layout variations for a web site or template based on layouts created using Layout Definer. Image Definer provides for creating and importing images to be incorporated on a template in the context of layout defined using Framework Definer or a new web site created using. Web Definer. Section Definer provides tools for creating generic sections to be incorporated to a template or web site. Web Definer is the end-user tool that allows a user to design, edit, and publish a web site using the templates, layouts, and images.

In summary the core concept of the Definer is the separation of the content, layout, structure, and appearance of a web site and its presentation. Advantageously, a user can change the one characteristic without affecting the others. For example, Definer allows a user to change the presentation of a web site without affecting the content of the web site, and vice versa.

It is noted that an embodiment of the invention includes a URL for identifying a separate initial welcome page at server 105, or a separate server, wherein membership access is limited to Web Definer. The operations of end-user service providing access to Web Definer will be described in further detail below. In addition, the individual Definer modules include tools for different aspects of creating a complete web site that may be published on the World Wide Web. Therefore, different personnel with specific expertise (such as graphic designers, business analyst, etc.) may collaborate using the modules in completing the web site. Consequently, the separate URLs to each of the modules may require specified usernames and passwords for access thereto, similar to initial welcome page 300 shown in FIG. 3.

The interface, features, and operations of the individual Definer modules will now be described in detail.

Site Definer

Site Definer link 505 directs terminal 125 to a Site Definer page 600 (shown in FIG. 6) that provides an interface to the Site Definer module for creating a site template, including its structure of template web pages.

Site Definer is a design module that may include a plurality of predefined site definitions (or "templates"), also known as Industry Solutions, which are categorized by specific business type, or Specific Industry Solution ("SIS"), which in turn are organized by industry, or General Industry Solutions ("GIS"). These SIS's or templates comprise generic structures, content and embedded applications for generating a web site template to be customized by an end-user using the Web Definer.

For example, a user selects a site definition for generating the initial content of a template web site by selecting an industry, corresponding to a GIS, and a specific business, corresponding to an SIS, respectively. When a new user is created, a new template web site is created and linked to the newly created user. The SIS site definition corresponding to the specific business type selected by the new user is retrieved from Site Definer and copied into the new template web site, which the user may edit using the Web Definer to create a custom web site.

The Site Definer interface may also be used to generate: (a) modular content (pages or sections of pages with text and graphics) that allow users to create a Web page quickly by answering a series of questions; (b) questions that allow users to decide which modules that are being built that will be included in the site they are creating; (c) placeholders that will insert information globally throughout a site. For example, by including a (CompanyName) placeholder on several pages, a user's business name will appear on these pages automatically when he or she registers with the provider of the Definer service at server 105; (d) on-line stores for purchasing products on a site; and (e) on-line forms that allow customers to send their questions and comments about products and services offered on a site. The Site Definer also provides for testing a created template.

Figure 6:
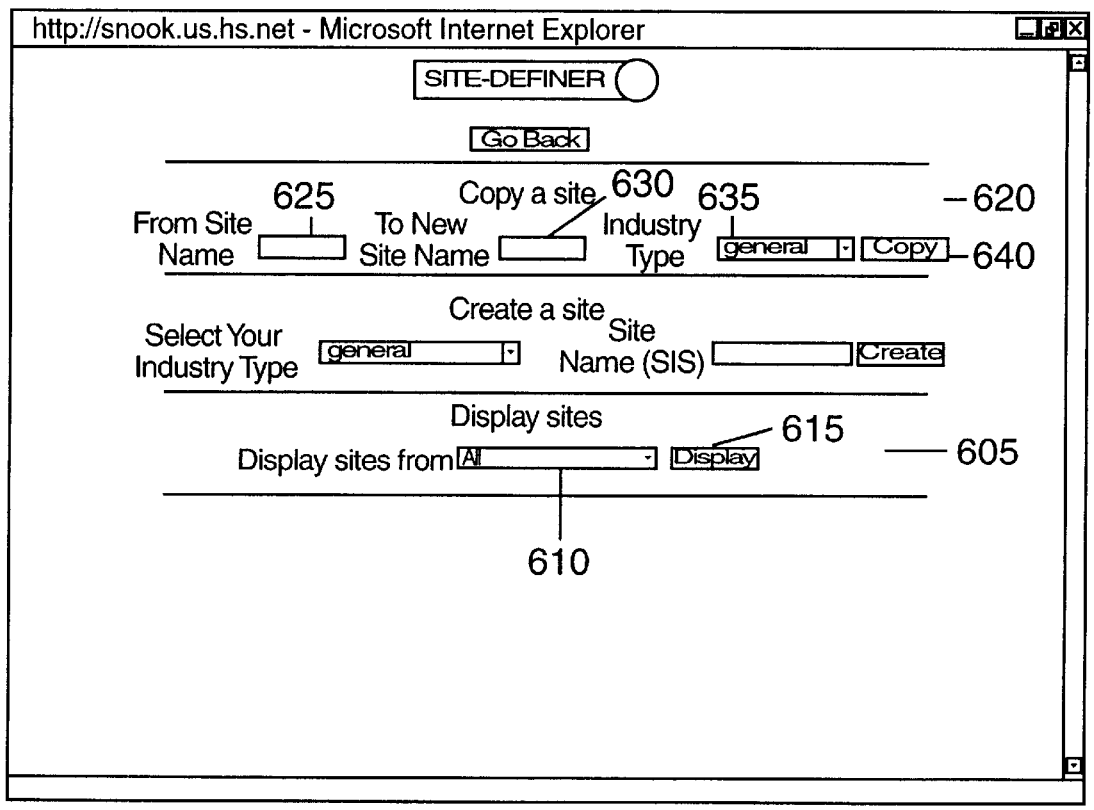
Figure 7:
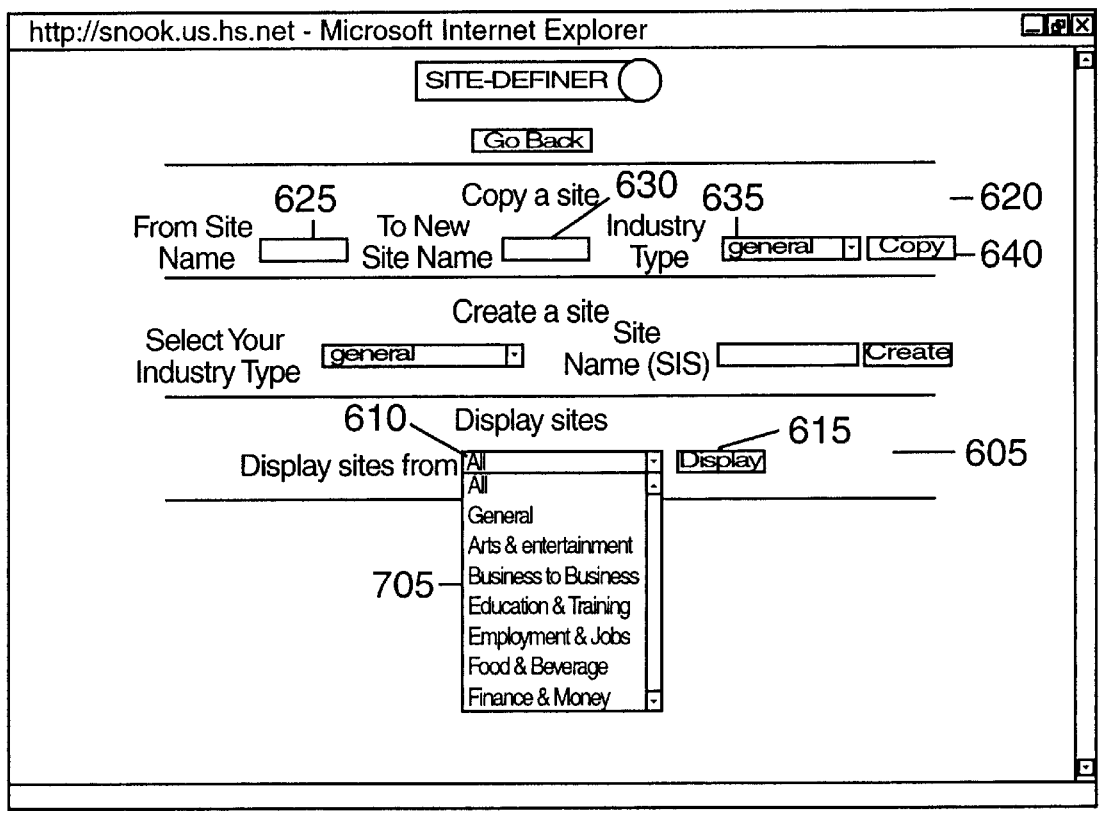
Figure 8:
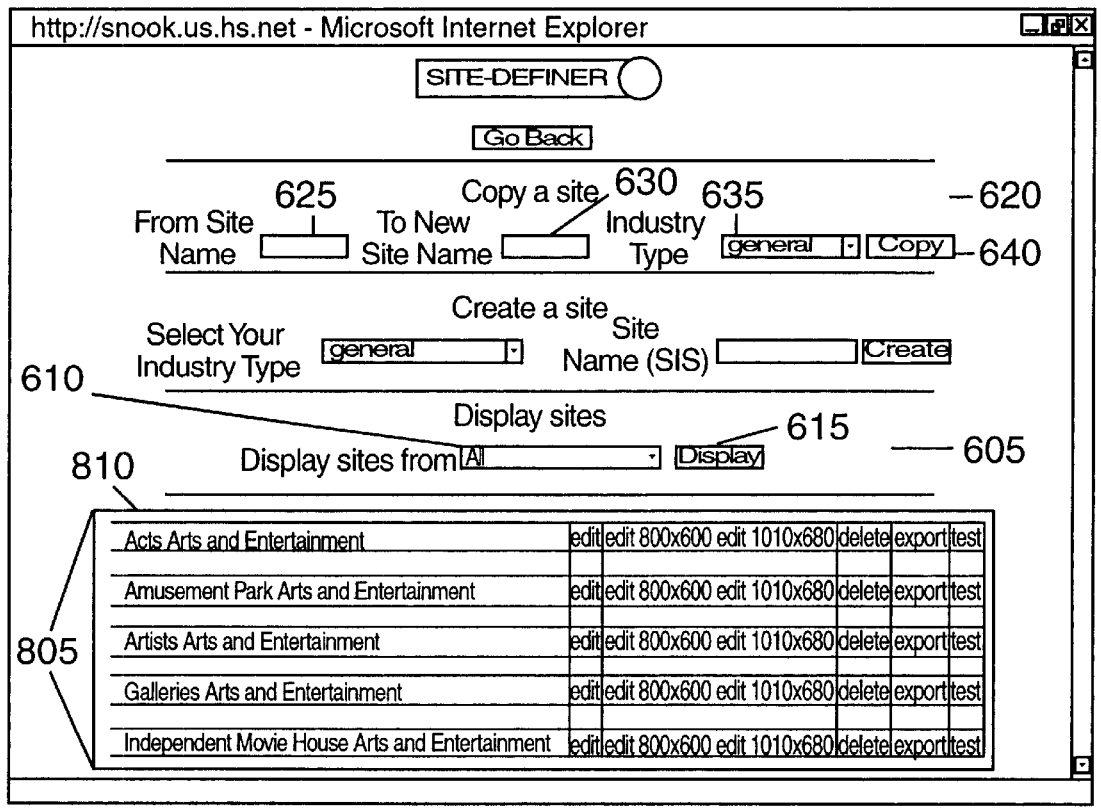

FIG. 6 illustrates Site Definer page 600 for creating and maintaining a web site template. In a Display Sites section 605, an Industry Type selection menu 610 includes a drop-down list for selecting an industry to display individual business type site templates thereunder. As illustrated by FIG. 7, an Industry Type drop-down list of 705 is displayed for selection after menu 610 is clicked. As shown in FIG. 8, a list of all site templates 805 stored under an industry category is displayed after the industry category is selected from Industry Type drop-down list 705 and Display button 615 is clicked. Each listed site template includes a Business type site template name and an industry type. For example, "Acts," is the site template name and "Arts and Entertainment" is the industry type for site template 810.

Figure 9:
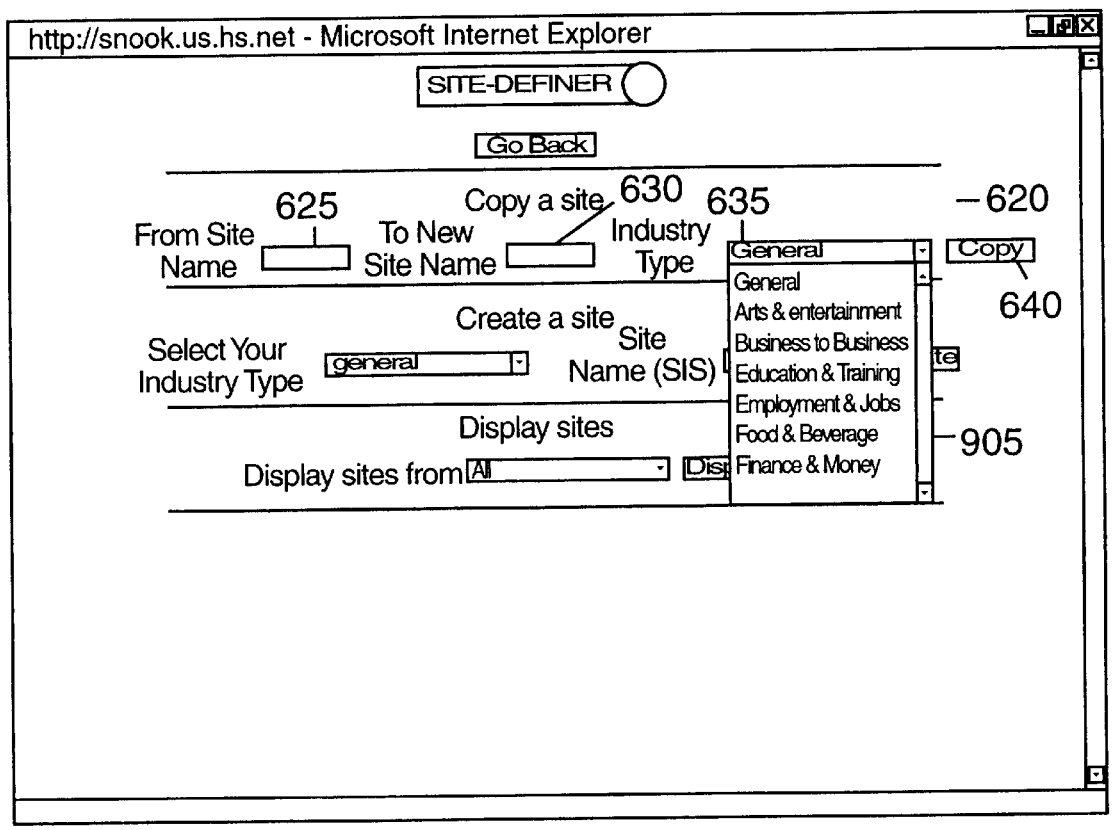

FIG. 9 illustrates the operation of copying an existing site template to create a new site template using a Copy a site section 620 of Site Definer page 600. A From Site Name text box 625 is provided for entry of the site name of the template to be copied. A To New Site Name text box 630 provides for naming a new site template that is generated by copying the site template named in text box 625 (e.g., from "Acts" to "Actors"). An Industry Type drop-down list 905 provides for selecting the industry that the new site template is stored under. By clicking Copy button 640, a copy of the site template named in text box 625 is saved in server 106 under the new site template name entered at text box 630 under the industry category selected at menu 905.

FIG. 10 illustrates a new list of site templates 1105 that comprises the new copied site template 1010, "Actors," after the copy operation of FIG. 9 has been performed and Display button 615 is clicked.

In addition to creating a new site template by copying an existing template, a new site template may be independently created in accordance with the present invention.

Figure 11:
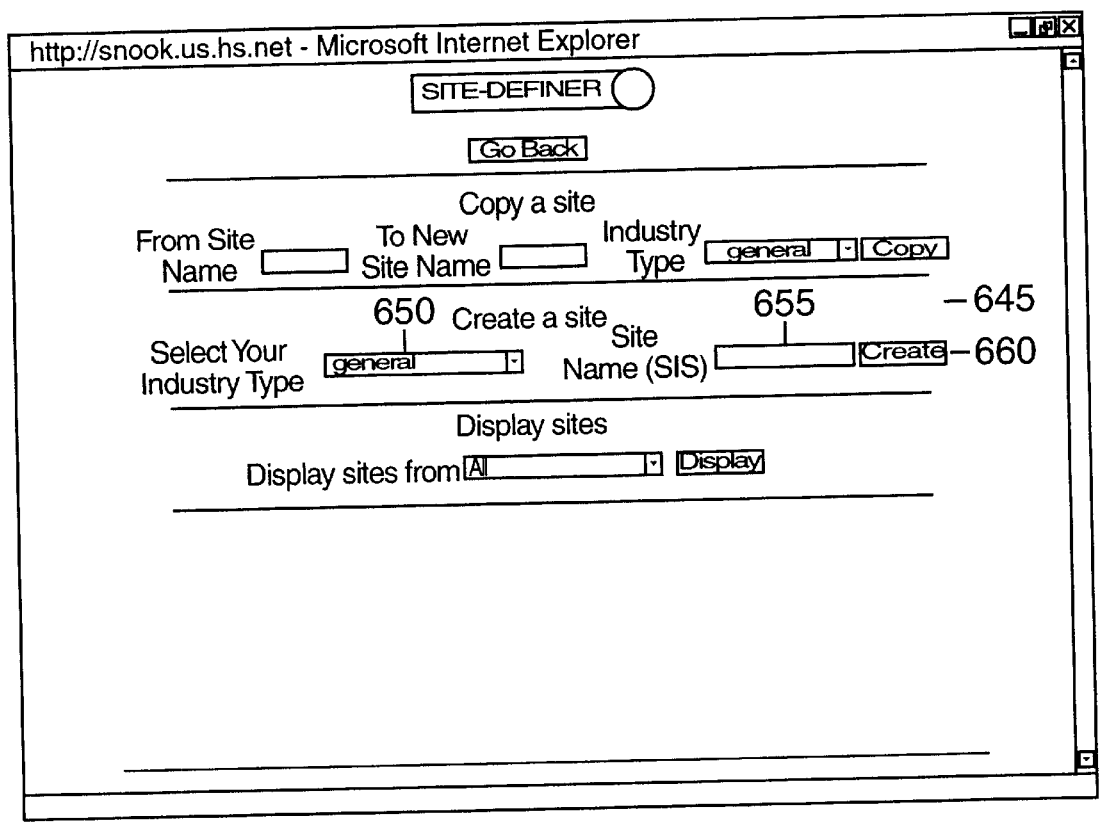
Figure 12:
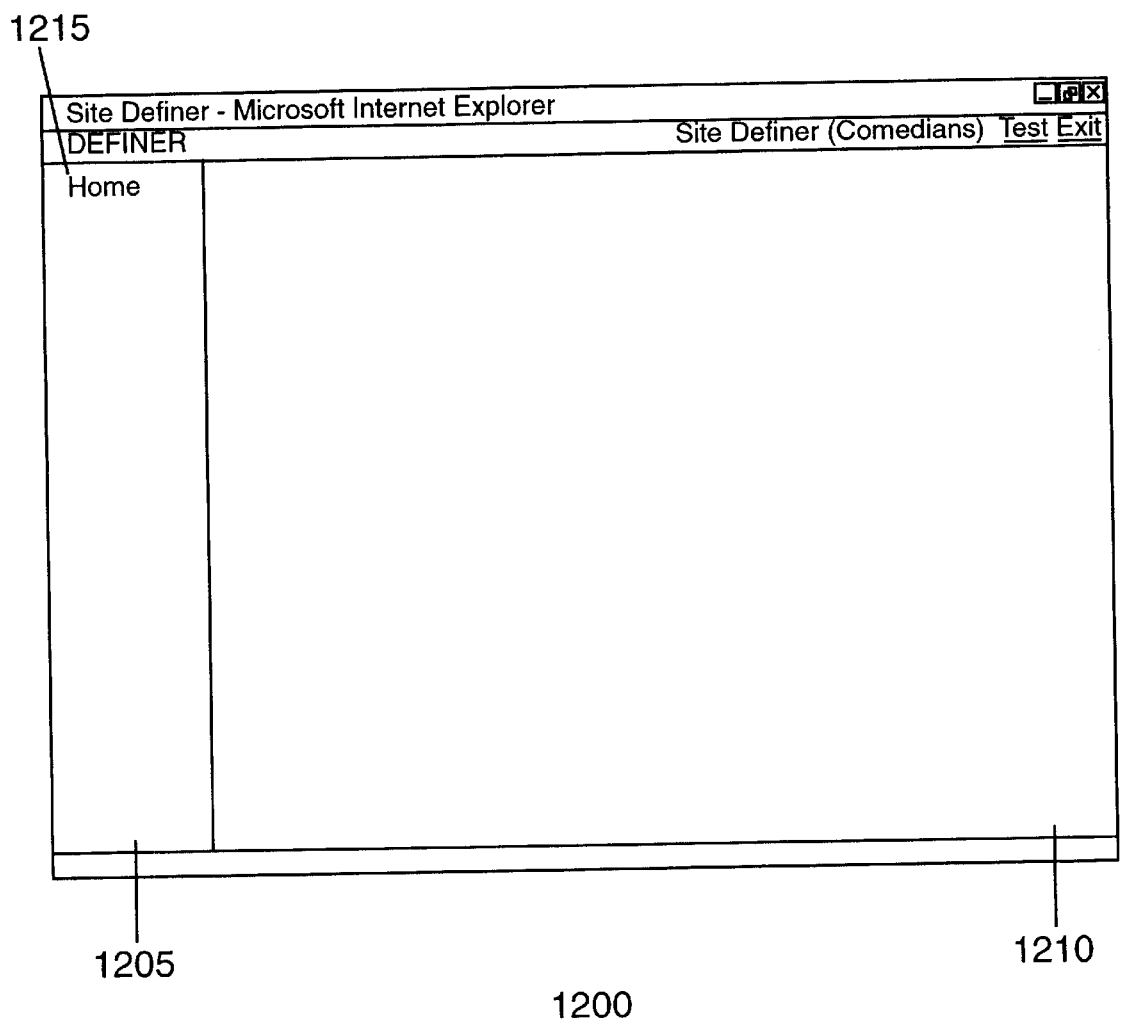
Figure 13:
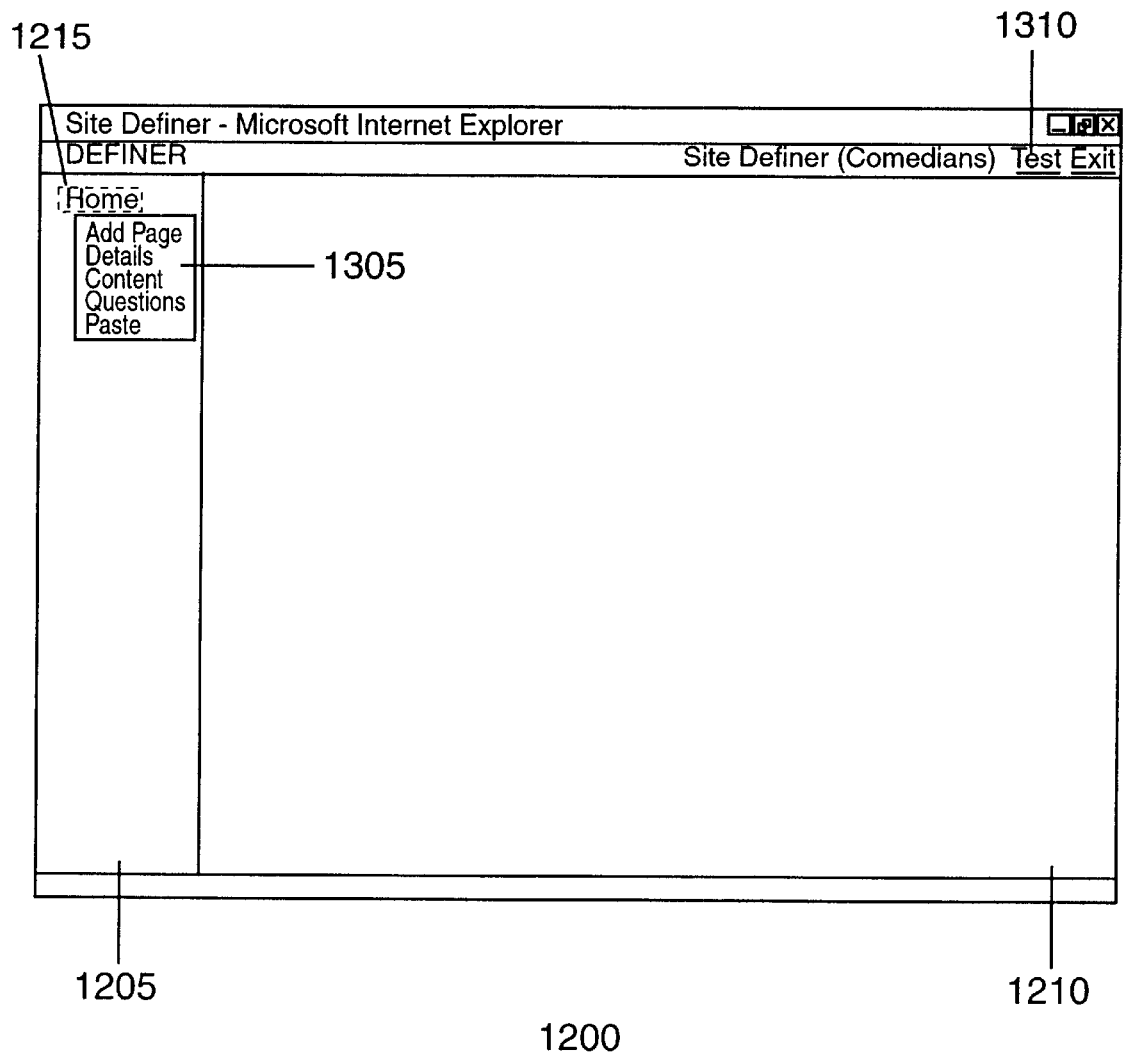

As illustrated by FIG. 11, a Create a site section 645 of Site Definer page 600 includes a Select Your Industry Type drop-down menu 650 which provides for selecting the industry category under which a site template is to be created. The name for the new site template is entered at a Site Name (SIS) text box 655. After Create button 660 is clicked, terminal 125 is directed to a site template creation split screen 1200, as shown in FIG. 12. FIG. 12 depicts site template creation screen 1200 for creating and editing a new site template. On the left is a site map 1205 that lists the pages included in the site; the right side includes a site display area 1210. A blank Home page 1215 is initially generated and displayed in site map 1205. The contents of blank Home page 1215 are displayed in display area 1210. As shown in FIG. 13, a command menu 1305 appears with a variety of commands when Home page 1215 is clicked. The commands, which will be described in further detail, include "Add Page" for adding a page to the site template; "Details" for defining the attributes of a page, such as search engine keywords, page title, emphasis, button text name, and questions users answer when they create sites according to the site template in the Web Definer; "Content" for displaying the layout (the placement of text and graphics) of a page; "Questions" for managing questions that users answer while creating their sites according to the site template in the Web Definer; and "Paste" for placing a cut page to a selected location in the site map hierarchy.

It is noted that when new pages are added to a site template, additional commands for rearranging the pages, such as Rename, Delete, Move Up, Move Down, and Cut, become available. These commands are not included in the menu for Home page 1215 because the name and position of Home page 1215 always remains the same.

A preview of the site template, as would be displayed on the Internet, can be displayed by clicking a Test link 1310 in the upper right corner of the screen. Details of the preview function will be described in further detail below.

Displaying and Maintaining Web Sites

Figure 14:
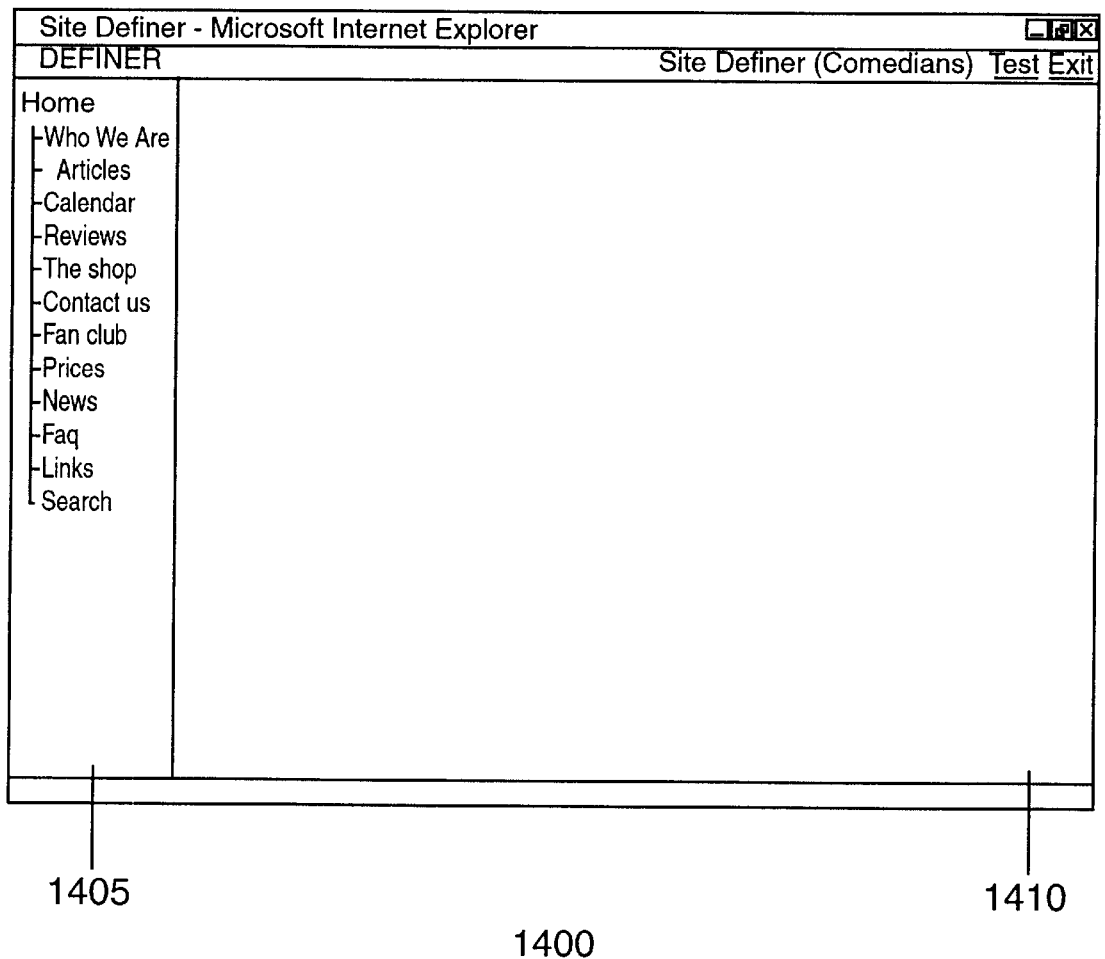
Figure 15:
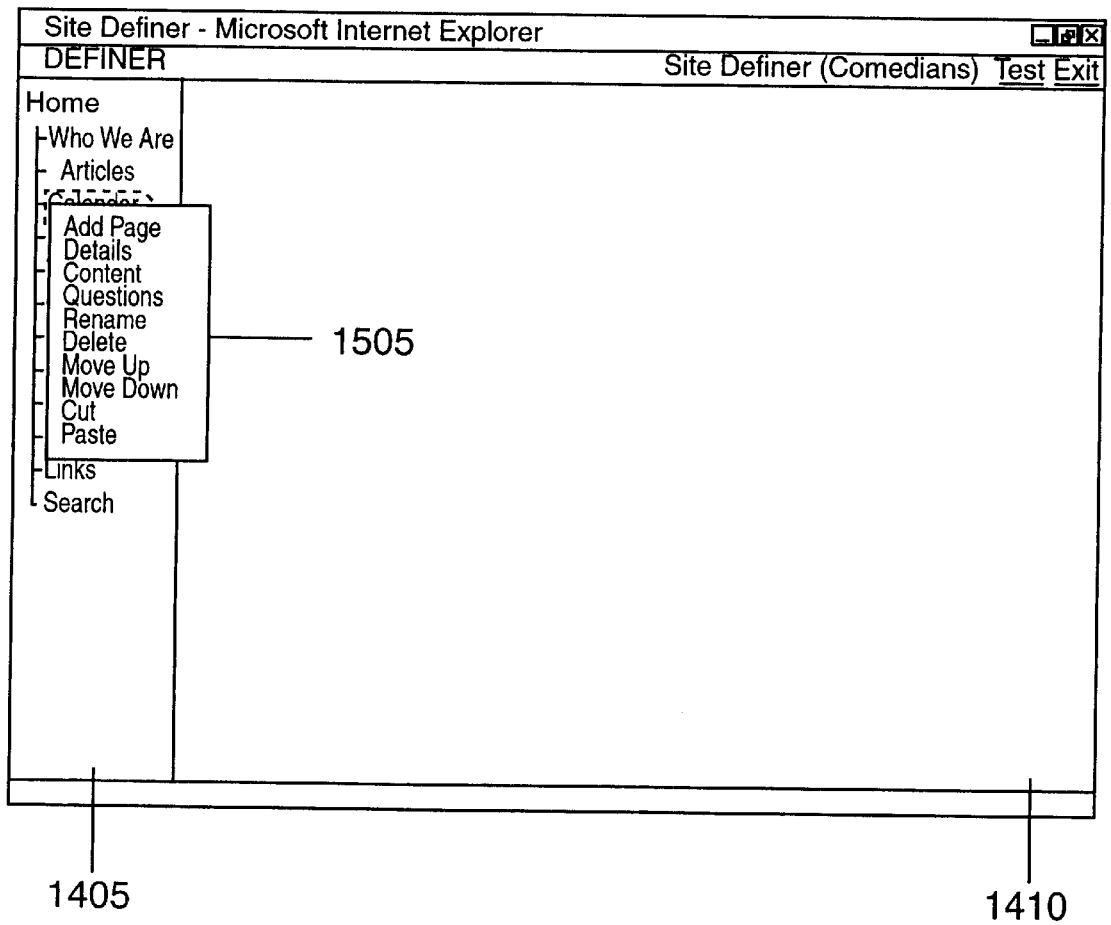

FIG. 14 illustrates a site template editing screen 1400 similar to screen 1200 shown in FIGS. 12 and 13. Site template editing screen 1400 provides for editing an existing site template or a new site template created by copying an existing template as above-described with reference to FIG. 13. As shown by FIG. 14, a site map 1405 that lists the pages included in the site template is displayed on the left side; and the right side includes a page content display area 1410. As illustrated by FIG. 15, a command menu 1505 appears with a variety of commands when a page designation on site map 1405 is selected. The listed commands include "Add Page" for adding a page to the site template; "Details" for defining the attributes of a page, such as search engine keywords, page title, emphasis, button text name, and questions users answer when they create sites according to the site template in the Web Definer; "Content" for displaying the layout (the placement of text and graphics) of a page; "Questions" for managing questions that users answer while creating their sites according to the site template in the Web Definer; "Rename" for renaming a page; "Delete" for removing a page; "Move Up" for moving a page one position higher in the hierarchy of site map 1405; "Move Down" for moving a page one position lower the hierarchy of site map 1405; "Cut" for moving a page to a Clipboard (not shown); and "Paste" for placing a cut page to a selected location in the hierarchy of site map 1405. It is, again, noted that the commands Rename, Delete, Move Up, Move Down, and Cut are not included in the command menu for the Home page of site map 1405 because its name and position always remains the same. The operation of each command will now be described in detail.

Adding Web Pages

Figure 16:
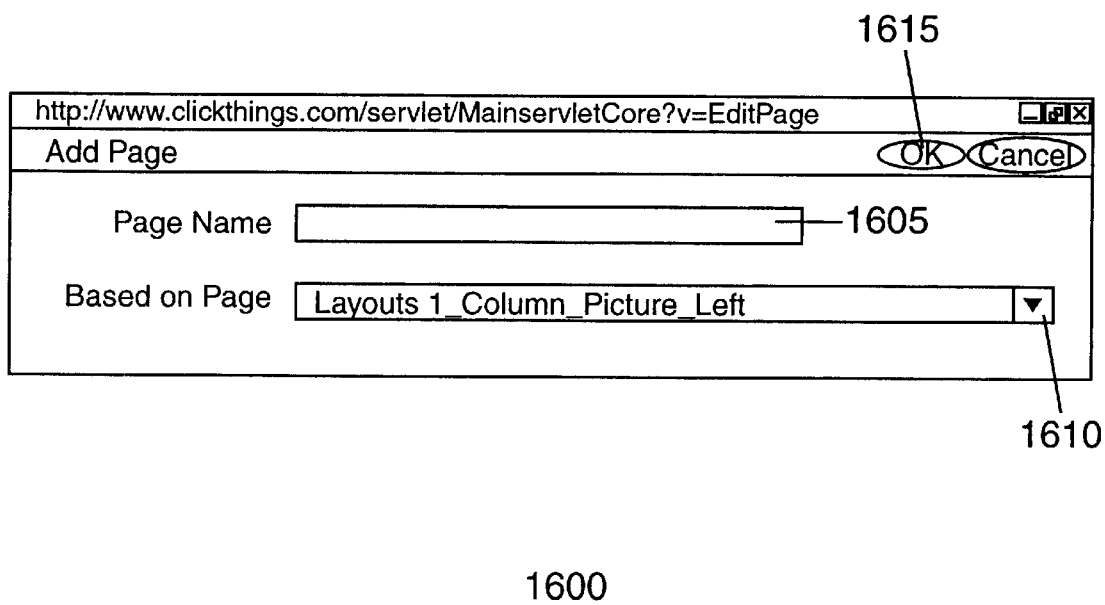

The Add Page command adds a new page under the selected page in the hierarchy of site map 1405, i.e. the new page branches from the selected page. By clicking the page designation above where the new page is to be added and selecting the Add Page command from the pop-up menu, an Add Page dialog box 1600, as shown in FIG. 16, is displayed in display area 1410. A Page Name text box 1605 is provided for entering a name for the new page to be added and a Based on Page drop-down menu 1610 provides for selecting a page format from previously stored template pages. The format from the template selected at menu 1610 is copied into the new page. The new page appears in the hierarchy of site map 1405 after OK button 1615 is clicked.

Defining Attributes for a Web Page

The Details command provides for defining default values for attributes that are displayed to an end-user who is using the Web Definer to create a new web site according to a site template.

Figure 17:
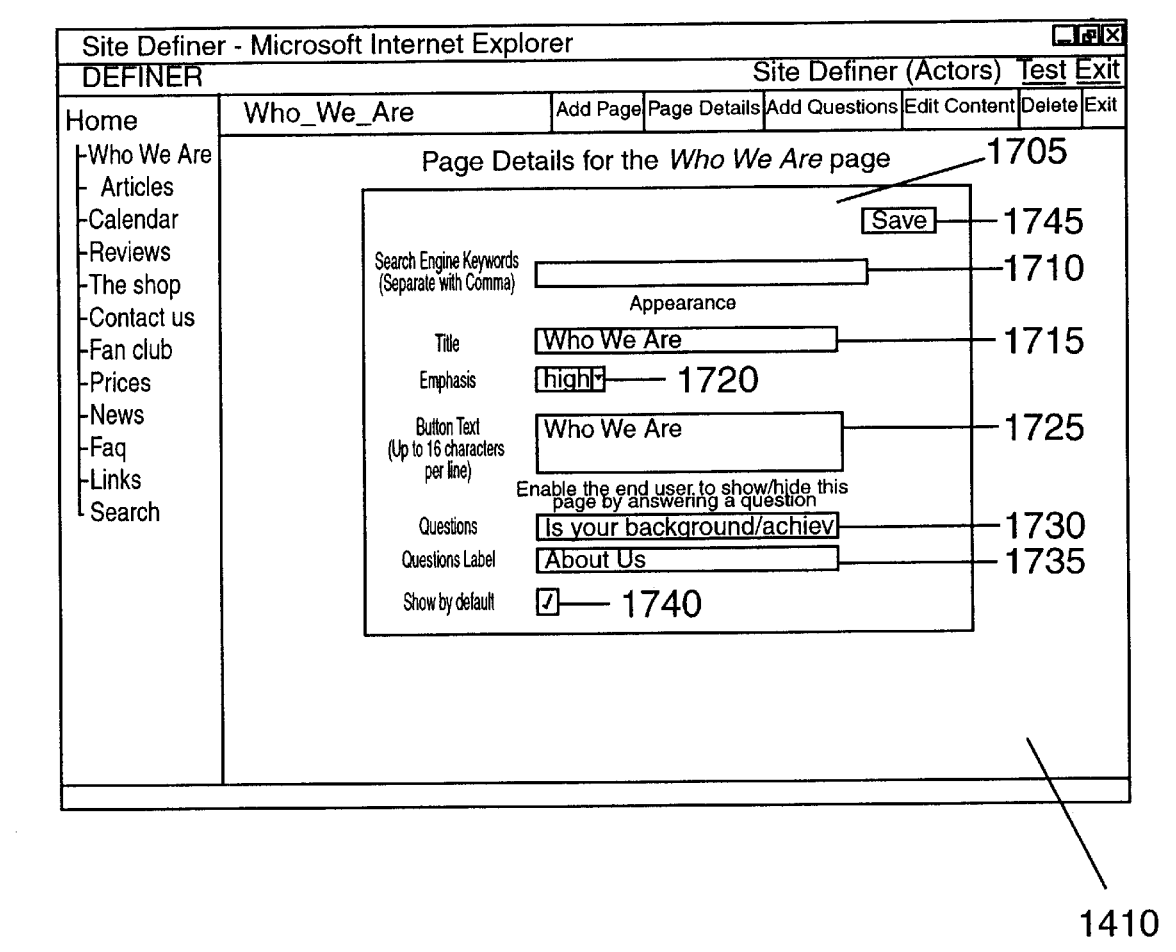

FIG. 17 illustrates a Page Details dialog box 1705 that displays a variety of options in display area 1410. A Search Engine Keywords text box 1710 is provided for entering keywords that will help users find the new page using a search engine; "Title" text box 1715 is provided for naming the new page. An Emphasis selection menu 1720 provides for selecting the effect of navigation for the new page. For each site template, there is a limit of six high-emphasis pages and the remaining pages are set at medium or low emphases. A Button Text text box 1725 provides for naming the buttons and/or hyperlinks that direct visitors to the new page. A Question text box 1730 is provided for entering a question to be linked to the new page. As described before, a user creating a web site using the Web Definer is shown a series of questions corresponding to a site template that determine the content to be included on a newly created web site-pages and/or sections are added based on the responses to these questions. Correspondingly, text box 1730 provides for adding one such question to the site template for determining whether to include the new page or section (i.e., if there are pages under the new page in the hierarchy) in a web site generated using the site template. A Question label text box 1735 is provided for entering a name for the question linked to the new page entered in text box 1730. A Show by default check box 1740 provides for selecting whether the new page or section is to be included by default in a web site created according to the site template. The attributes entered into dialog box 1705 are saved to the new page by clicking a Save button 1745.

Changing Content

Figure 18:
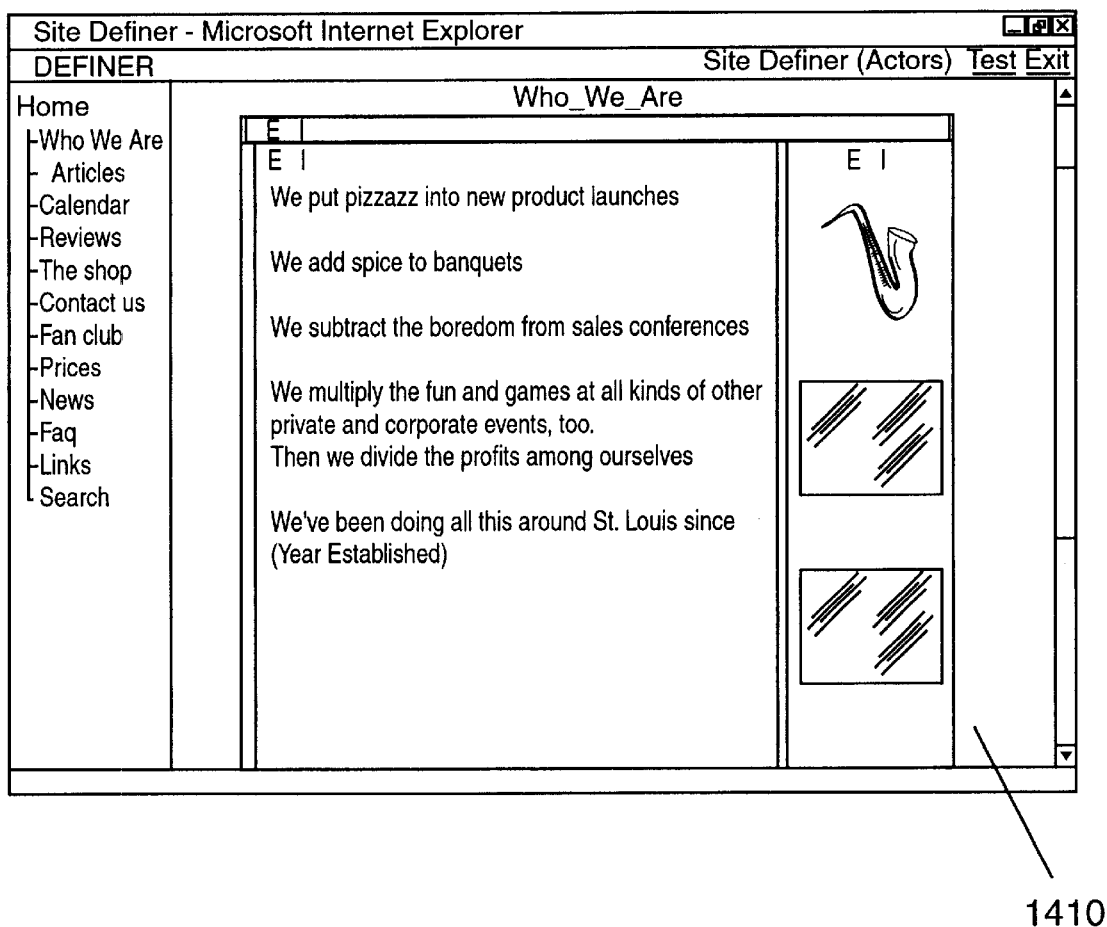

The Content command provides for changing the content (text and graphics) of a page in the site template. The existing content for the selected page is loaded and displayed in display area 1410 in the predetermined format, as shown in FIG. 18. For a new page, a blank page is displayed in display area 1410.

As illustrated in FIG. 18, E and ∎ icons are positioned in various locations throughout the page for activating pop-menus for a variety of commands for adding and changing the content of the selected page.

Figure 19:
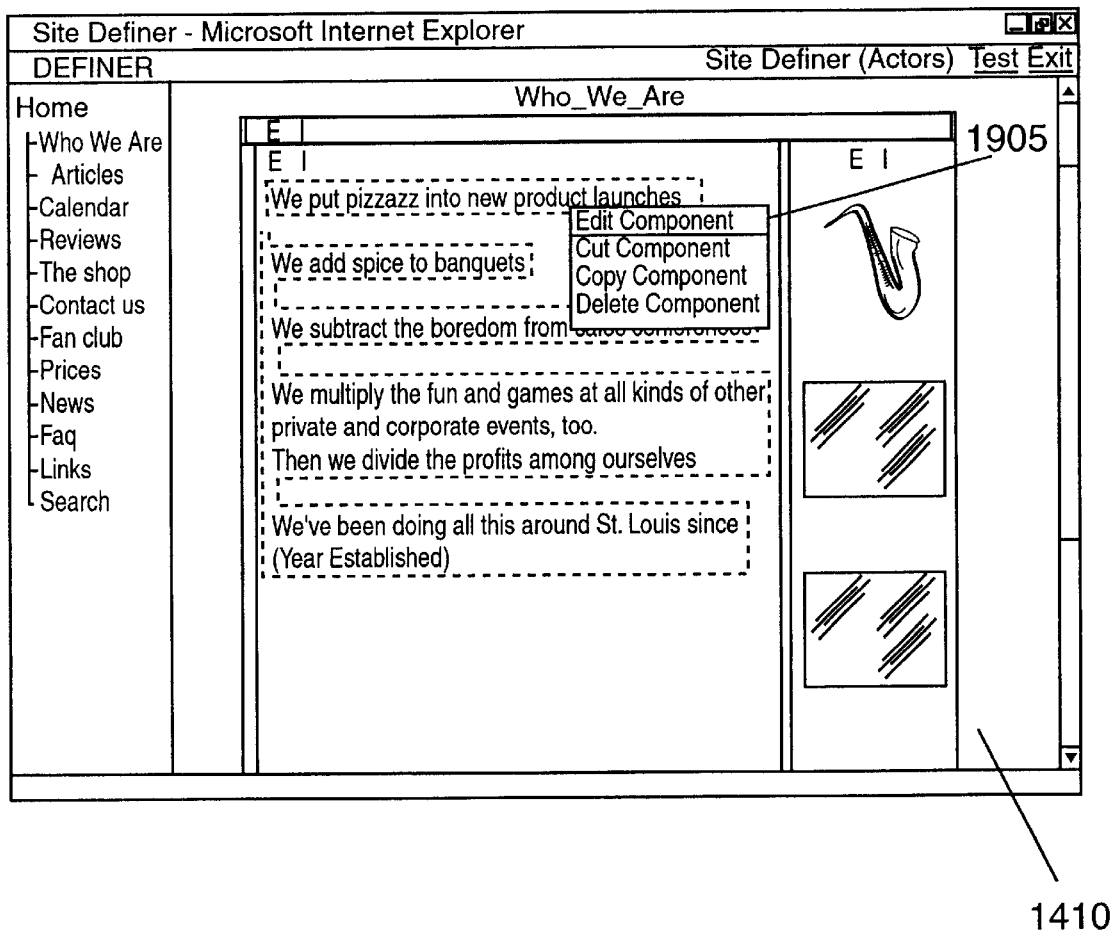

As shown in FIG. 19, the commands in pop-up menu 1905, which is displayed when an E icon or an existing component is clicked, provide for editing an existing component, which include: "Edit Component" for changing the attributes of the selected component; "Cut Component" for moving a component from the selected page to a Clipboard (not shown); "Copy Component" for copying a component to the Clipboard; and "Delete Component" for removing a component from the page. Correspondingly, a "Paste Component" command from a pop-up menu 2100 (shown in FIG. 21) displayed when an ∎ icon is clicked provides for placing a component from the Clipboard to the location of the selected ∎ icon, as will be described below.

Figure 20:
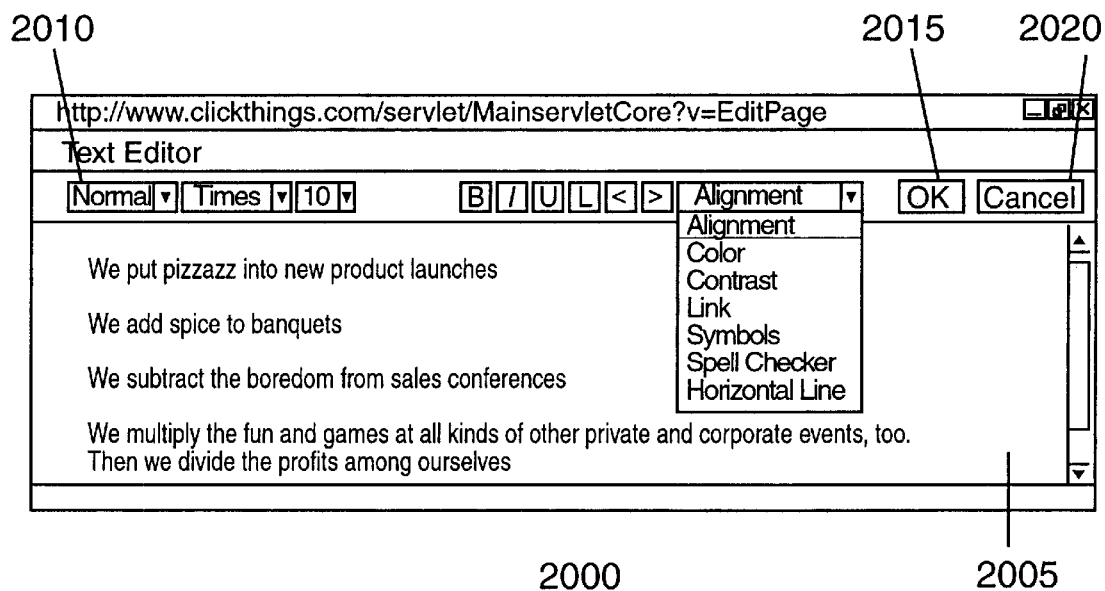

FIG. 20 shows text editor dialog box 2000 that is displayed when the aforementioned "Edit Component" command is selected for a text component, as illustrated in FIG. 19. As shown in FIG. 20, the existing text of a selected text component is displayed in text area 2005. Formatting features in toolbar 2010 provide for changing the format of the text component. Any changes made to the text component are saved to the page upon clicking OK button 2015. In the alternative, all changes are cancelled by clicking cancel button 2020.

Figure 21:
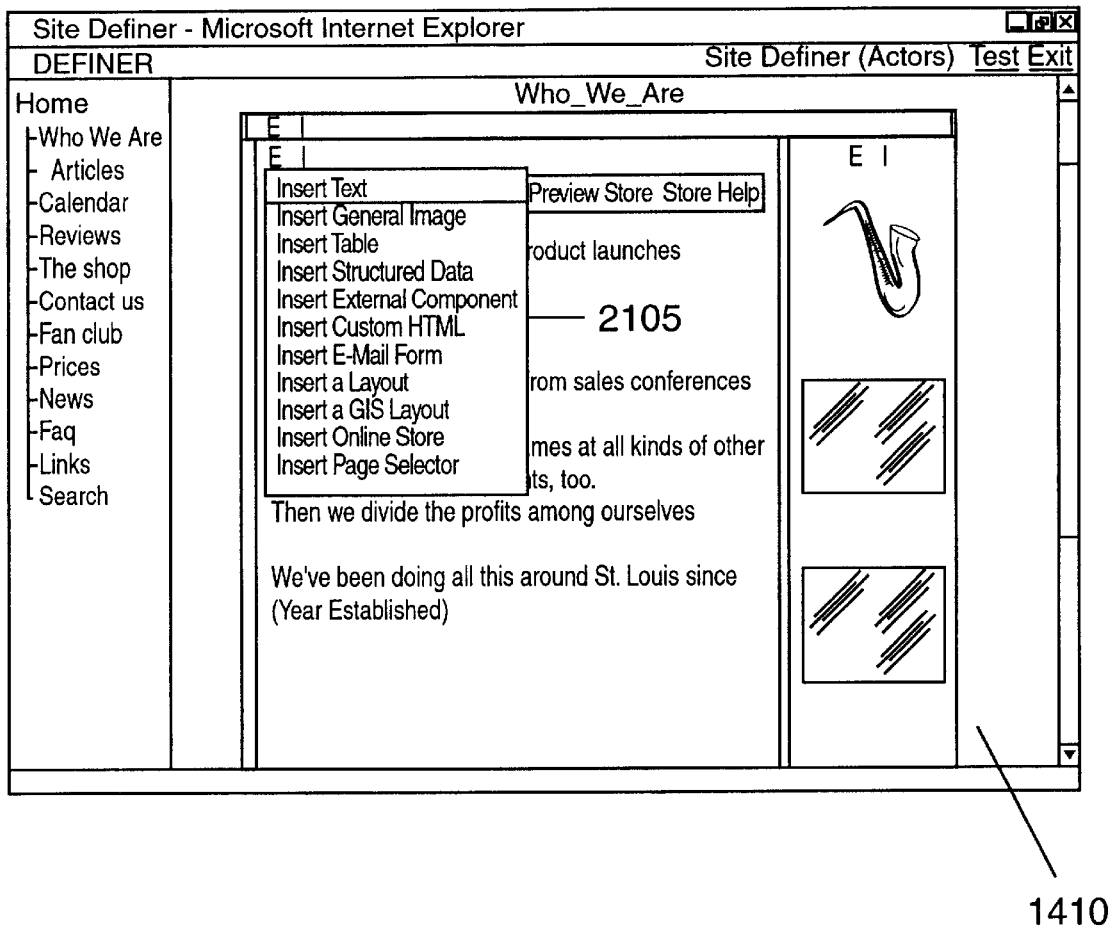

FIG. 21 illustrates pop-up menu 2105 that is displayed when an ▣ icon is selected. The commands in pop-up menu 2105 provide for inserting components, including the aforementioned "Paste Component" command. As shown in FIG. 21, pop-up menu 2105 includes: "Insert Text" for adding a new block of text to the page; "Insert General Image" for adding a new image to the page; "Insert Table" for adding a new table to the page; "Insert Structured Data" for inserting data created in another file, such as a table, in the page; "Insert External Component" for inserting an externally created component; "Insert Custom HTML" for adding HTML code saved in another file or Web site to the page; "Insert Email Form" for placing a form in the page. Form choices available are e-mail, booking, contract, generic application, credit application, membership application, quote request, review, update, and FAQ (for submitting questions); "Insert a Layout" for inserting a new page layout in your page; "Insert a GIS Layout" for adding a template related to a specific industry, such as a calendar, staff list, or fortune; "Insert Online Store" for placing an online store in the page; "Insert Page Selector" for adding the page to a drop-down list of pages on the site template; and "Paste Component" for placing a cut or copied component on the page.

Figure 22:
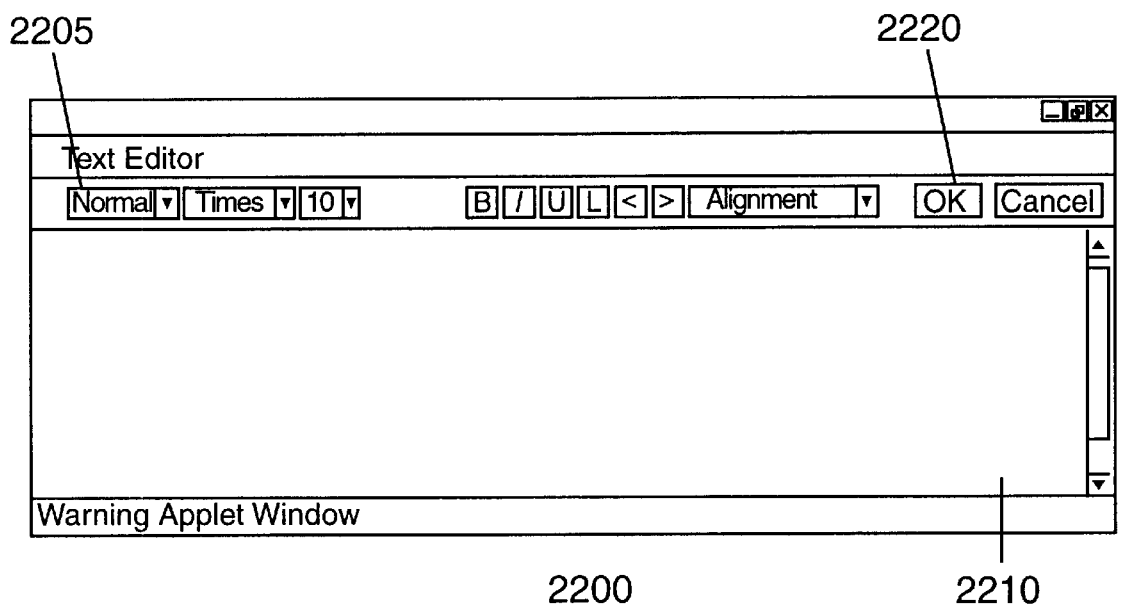

A new text component may be added to any location on a template page by clicking an ▣ icon next to the area where the text component is to be inserted, and selecting the insert text command in pop-up menu 2105. Insert text dialog box 2200, as shown in FIG. 22, appears upon such selection wherein the contents of the new text component may be entered. Formatting feature toolbar 2205 provides various text formatting functions. New text entered into text area 2210 is inserted into a page upon clicking OK button 2220. It is noted that text generated by other word processing programs such as Microsoft Word™ or WordPerfect™, may be inserted into a page as a new text component by copying or cutting a portion of the text from the file thereunder and pasting said text into text area 2210.

Figure 23:
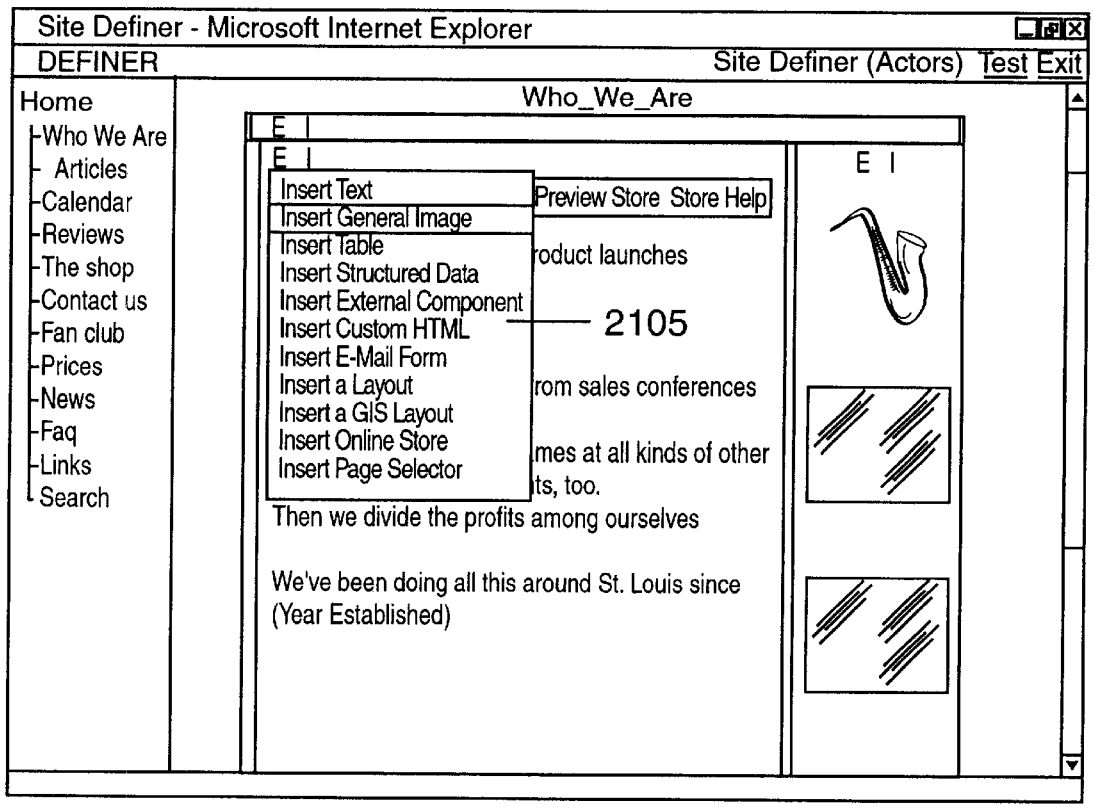
Figure 24:
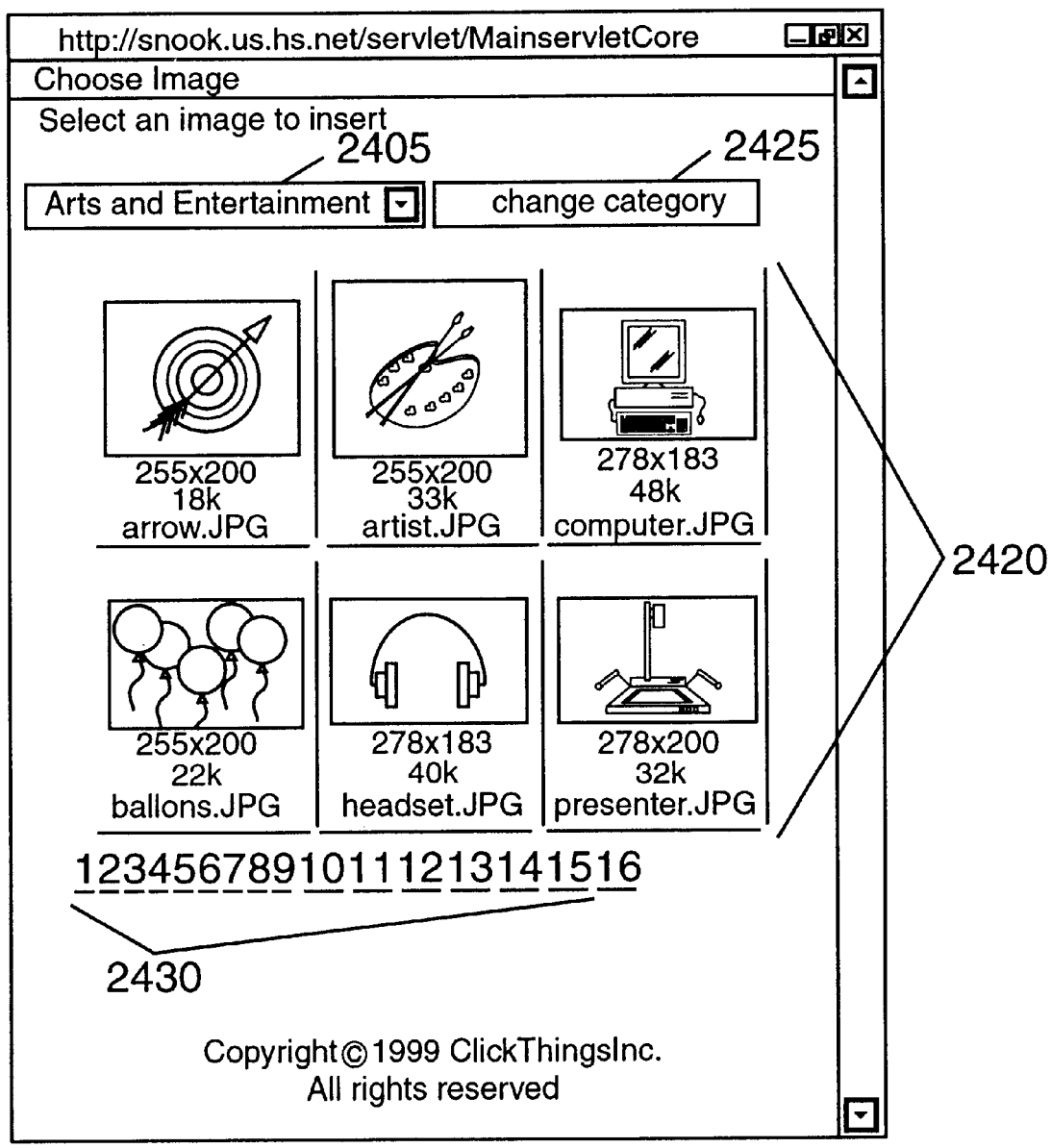
Figure 25:
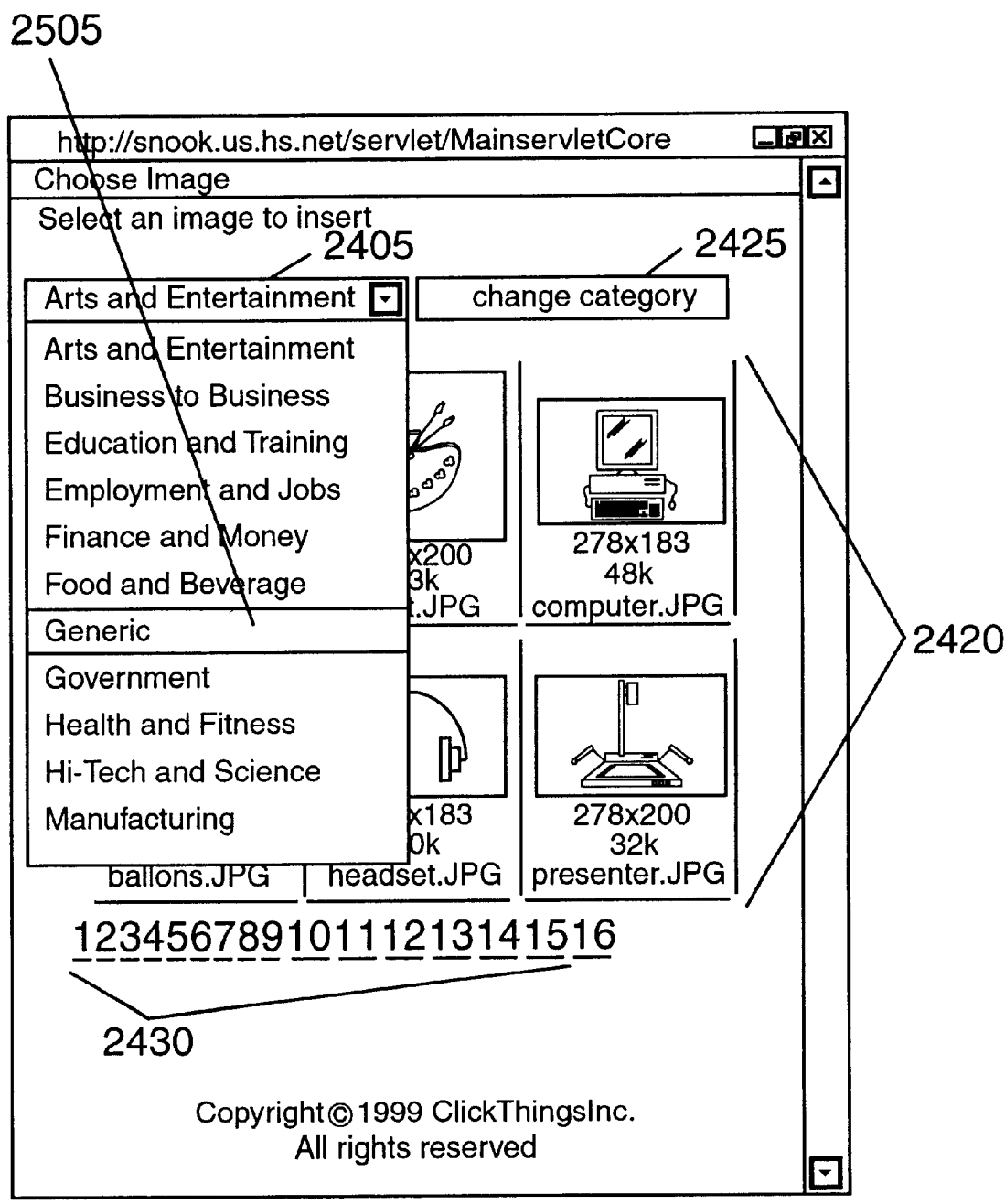

FIG. 23 illustrates the selection of the above-described insert general image command for inserting a graphic image at a selected location. Upon selection of the command, a choose image dialog box 2400, as shown in FIG. 24, is displayed. As shown in FIG. 25, drop down selection list 2505 appears upon clicking menu bar 2405. Each item listed in selection list 2505 is an industry category based upon which images are categorized. The images displayed in display area 2420 are changed by selecting an item in list 2505 and clicking the change category button 2425. Each category may comprise more than the six images displayed in display area 2420, in which case a page of up to six images is represented by each of links 2430. A click on one of links 2430 would cause the images stored thereunder to be displayed in display area 2420.

Figure 26:
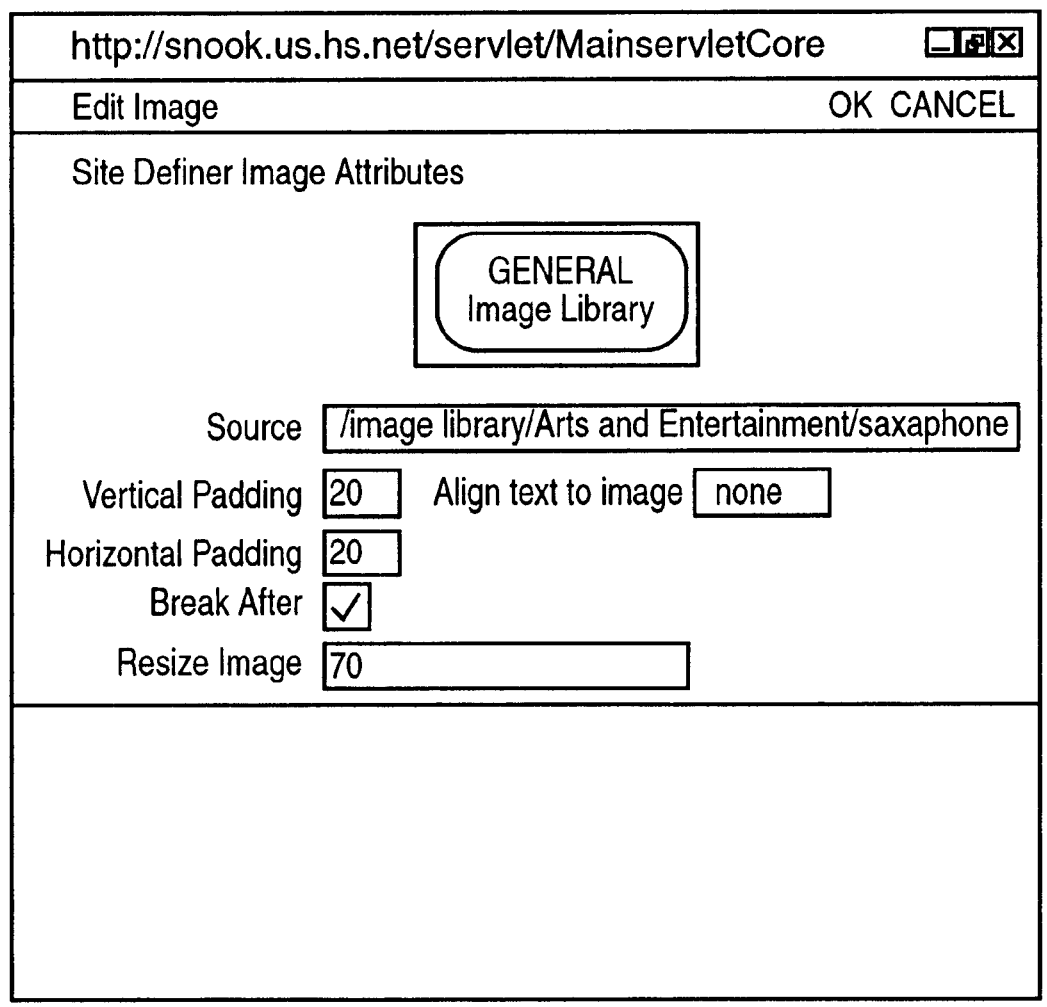

When an image in display area 2420 is selected, an "Edit Image" dialog box 2600, as shown in FIG. 26, is displayed. "Edit Image" dialog box 2600 is also displayed when the "Edit Component" command, as illustrated in FIG. 19, is selected for a graphic component (instead of a text component, as shown in FIG. 19). As shown in FIG. 26, "Edit Image" dialogue box 2600 provides various features for editing and changing the characteristics of an image component. A "General Image Library" button 2605, when clicked, causes a "Choose Image" dialog box 2400 to be displayed for displaying a catalog of pictures that may be inserted to the selected location of the page template. A "Source" text box 2610 displays and provides for the entry of the path name of a selected image. The "Vertical Padding" text box 2615 provides for the entry of an amount of space between the top and bottom of the graphic component and its adjacent components on a page template. Correspondingly, a "Horizontal Padding" text box 2620 provides for the entry of an amount of space between the left and right sides of the graphic component and its adjacent components on a page template. A "Break After" check box 2625 provides for the selection of whether the line break is placed between the graphic component and the subsequent component. In other words, if "Break After" check box 2625 is checked, the selected graphic component is placed directly above the subsequent component. If, however, box 2625 is not checked, then the selected graphic component is placed side by side with a subsequent component. A "Resize Image" text box 2630 provides for changing the size of the graphic component. A number entered at text box 2630 represents a percentage of the size of the original image as saved in an image file. In other words, as shown in FIG. 26, the selected image component is 70% the size of the original image file. A line text to image drop down menu 2635 provides for selecting whether to line up a text component to the right or left edge of the selected graphic component.

FIG. 27 illustrates "Insert Table" dialogue box 2700 that is displayed when the "Insert Table" command in the ▣ icon menu is selected. As shown in FIG. 27, various characteristics of a table component may be changed using dialogue box 2700. A "Number of Rows" drop down menu 2705 provides for determining the total number of rows in a table component. Correspondingly, a "Number of Columns" drop down menu 2710 provides for selecting the total number of columns in the table component. An "Alignment" drop down menu 2715 provides for selecting the alignment of the text in the cells of the table component. A "Cell Spacing" text box 2720 is provided for entering an amount of white space between the cells of the table component. A "Background Color" selection button 2725 provides for the selection of the color that will appear in the background of the table component. A "Border On" check box 2730 provides for determining whether each cell and table components will be surrounded by a border. A "Cell Padding" text box 2735 is provided for entering an amount of white space around the text in a cell (see similar to the margin in the document). A "Width" selection drop-down menu and text box 2740 provides for selecting the total width of the table component. A "Percentage" check box 2745 provides for selecting whether the width selected at drop-down menu and text box 2740 is measured by pixels or percentages. Correspondingly, a "Height" drop down selection menu and text box 2750 provides for selecting the total height of the table component. Similarly, a "Percentage" check box 2755 provides for selecting whether the height selected at 2750 is measured in pixels or in percentages.

Figure 28:
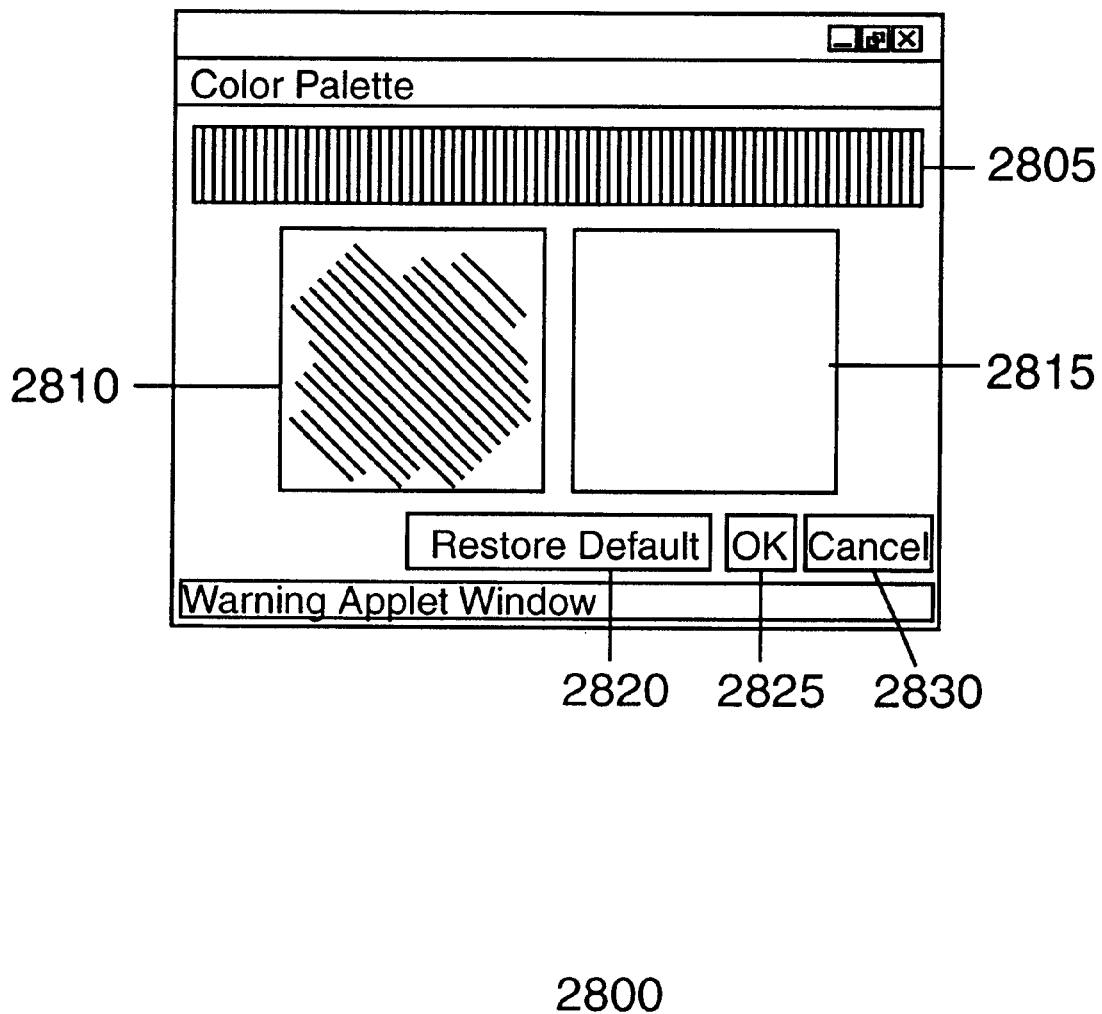

As described before, "Background Color" button 2725 provides for the selection of the background color of the table component. "Color Palette" dialog box 2800, as shown in FIG. 28, is displayed if button 2725 is clicked. "Color Slider" bar 2805 provides for selecting a color from a color pallete. "Shade Selection" area 2810 provides for selecting a shade of the color selected using color bar 2805. Display area 2815 displays the selected color and shade. A "Restore Default" button 2820 restores the selected color to the default setting. The selected background color is incorporated to the table component upon clicking on "OK" button 2825. No changes are made to the table component if "Cancel" button 2830 is clicked.

Figure 29:
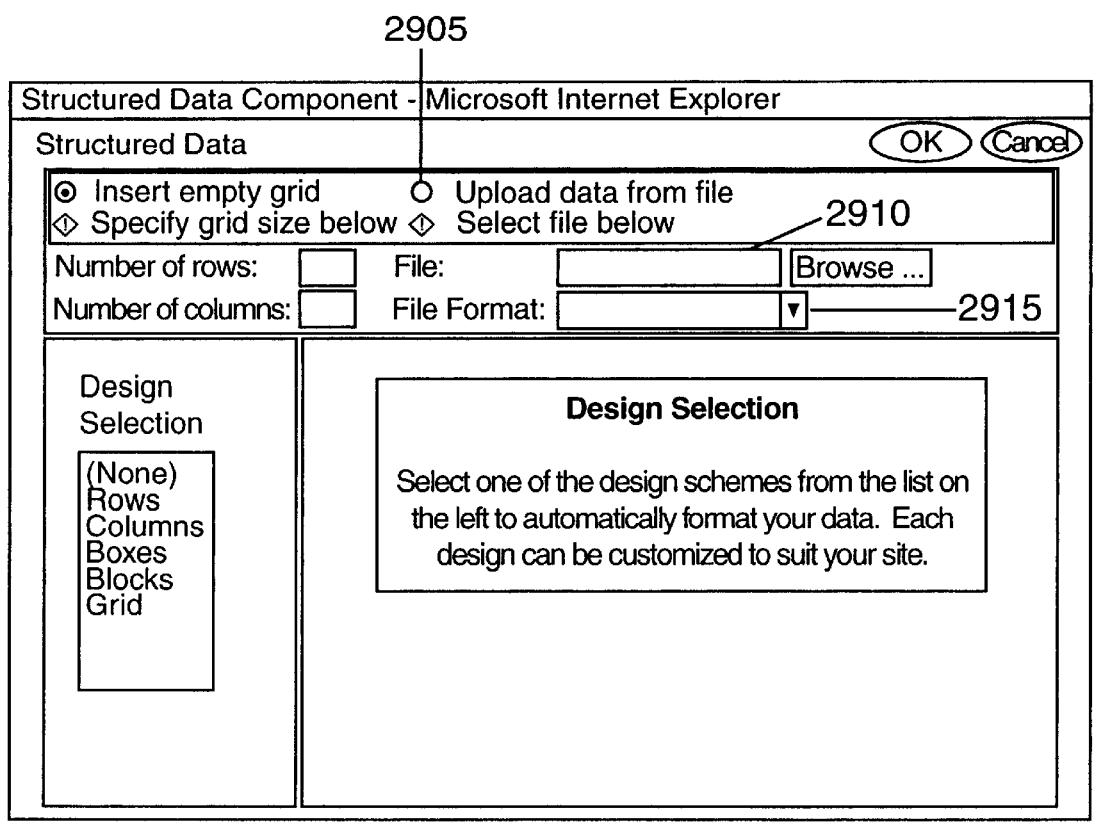

FIG. 29 depicts "Structure Data" dialogue box 2900 that is displayed upon selection of the insert structure data command mentioned before. An "Upload data from file" radio button 2905 provides the feature of uploading a table component from a file generated from an application separate from the Definer Publishing modules. A "File" text box 2910 and "File Format" drop-down selection menu 2915 provide for selecting the source file for the uploading.

Figure 30:
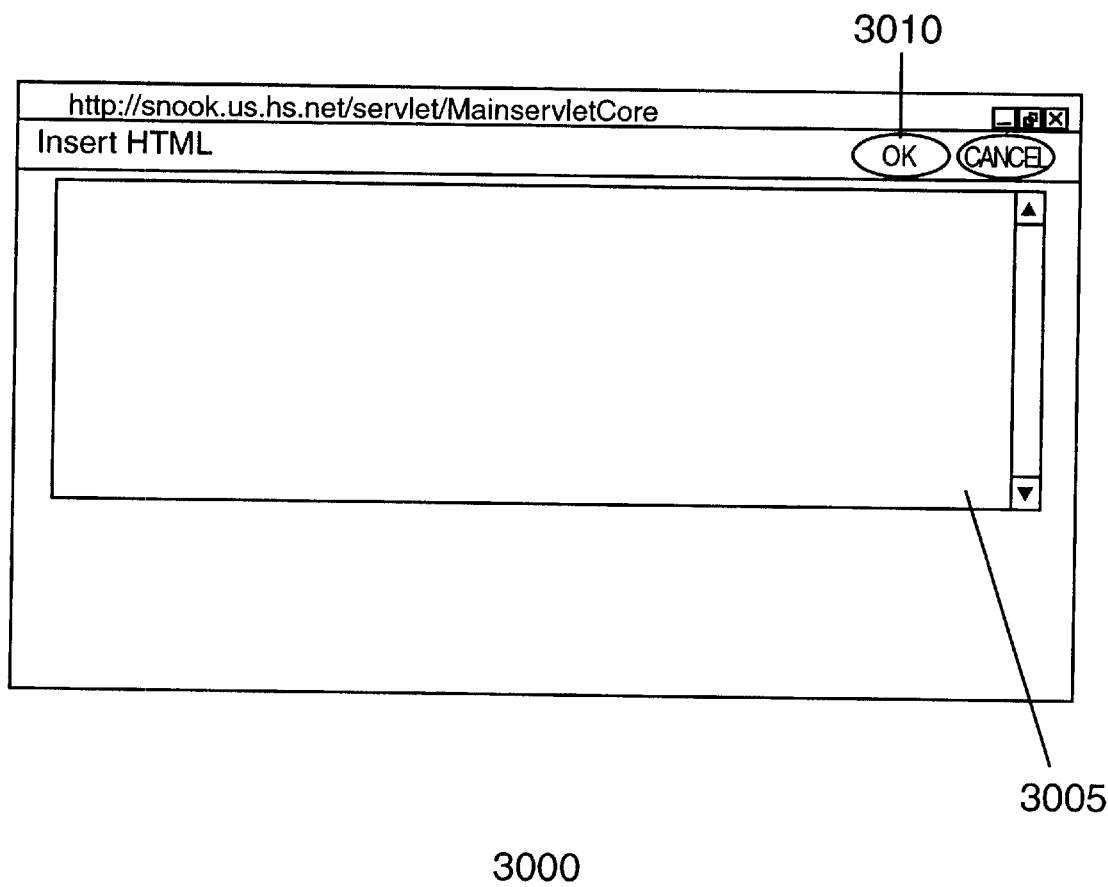

FIG. 30 illustrates an "Insert HTML" dialogue box 3000, which is displayed upon selecting the aforementioned "Insert Custom HTML" command. HTML code may be entered into text box 3005 and incorporated to a page template upon clicking "OK" button 3010.

Figure 31:
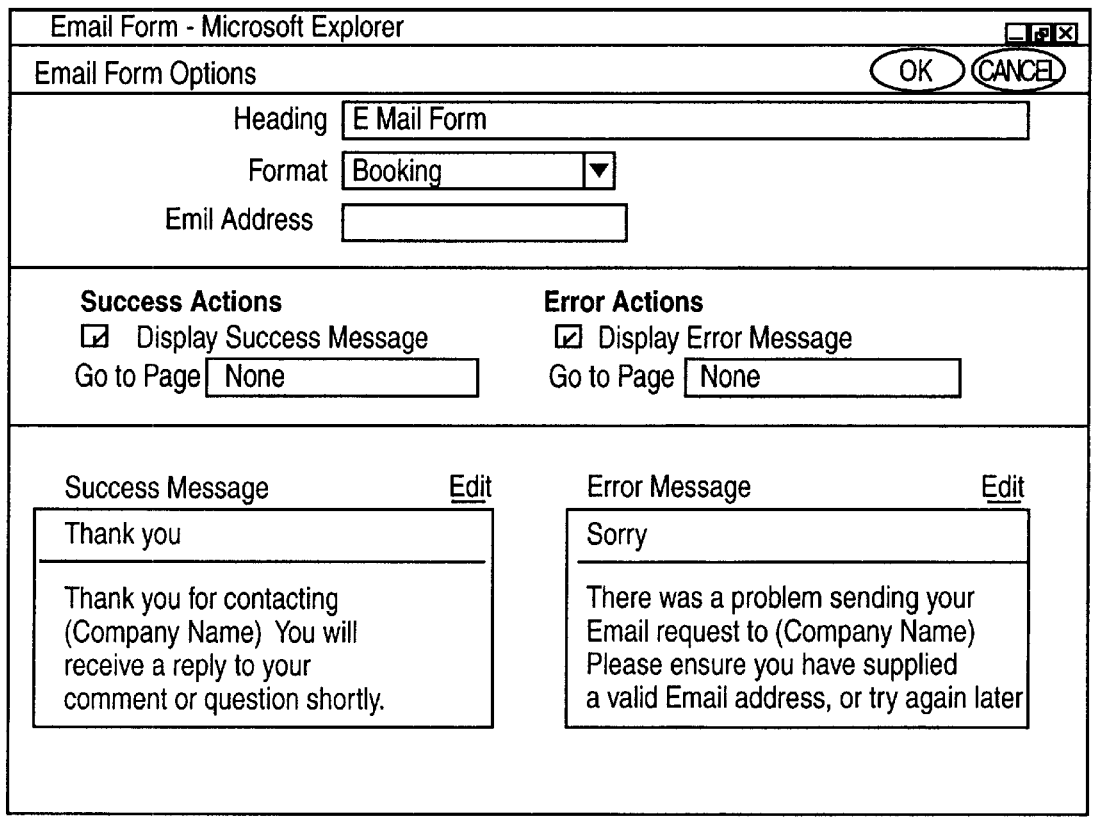

FIG. 31 illustrates an "E-mail Form Options" dialogue box 3100 that is displayed when the aforementioned "Insert E-mail Form" command is selected. A "Heading" text box 3105 is provided for entering the name of the heading for the form component. A "Format" drop-down list 3110 provides for selecting the type of form component to be added. "E-mail Address" text box 3120 is provided for entering the E-mail address to which completed forms are sent. A "Display Success Message" check box 3125 provides for selecting whether a successful transmission of a completed form is displayed to a user of a web site comprising the form component. A "Go to Page" drop-down list 3130 provides for the selection of a page that the terminal is automatically directed to after a complete form is sent. If "None" is selected as shown in FIG. 31, the page containing the form remains open after the completed form is sent.

FIG. 32A illustrates an "Add Page" dialogue box 3200 that is displayed when the "Insert a Layout" command, as shown in FIG. 23, is selected. A "Page Name" text box 3205 is provided for entering a name for the new inserted layout. A "Based on Page" drop-down menu 3210 provides for selecting an existing layout upon which the new layout is to be based.

FIG. 32B illustrates a "Choose Page Layout" dialogue box 3250 that is displayed upon the selection of the "Insert AGIS Layout" command, as shown in FIG. 23. A "Choose Page Layout" drop-down menu 3255 provides for selecting the name of an existing layout to be added to the selected location of the "Insert AGIS Layout" command.

Figure 33:
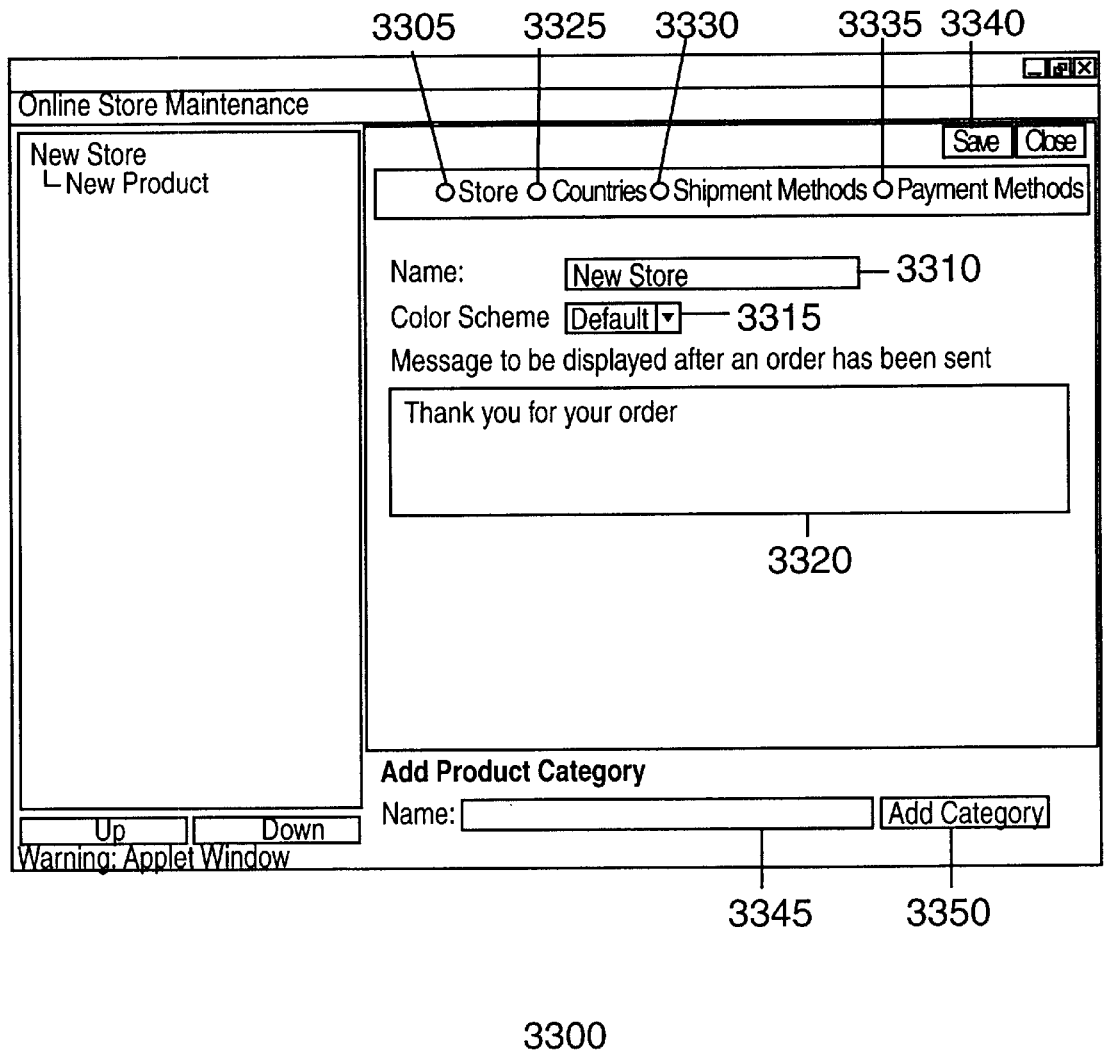

FIG. 33 illustrates an "Online Store Maintenance" dialogue box 3300 that is displayed when the aforementioned "Insert Online Store" command, shown in FIG. 23, is selected. As shown in FIG. 33, a "Store" radio button 3305 is selected, whereupon a "Name" text box 3310, a "Color Scheme" drop down selection menu 3315 and a "Message" text box 3320 are displayed. "Name" text box 3310 is provided for entering a name for the online store to be created. "Color scheme" drop down menu 3315 provides for selecting a color scheme for the online store. "Message" text box 3320 is provided for entering a text message to be displayed when an order is placed by a customer using a web site containing the online store. A "Countries" radio button 3325 provides for selecting countries in which the online store is to provide products or services. A "Shipping Methods" radio button 3330 provides for selecting shipping methods to be made available to a customer using a web site containing the online store. A "Payment Methods" radio button 3335 provides for selecting payment methods to be made available on the online store. A "Save" button 3340 saves the information and settings for the online store when clicked.

Figure 34:
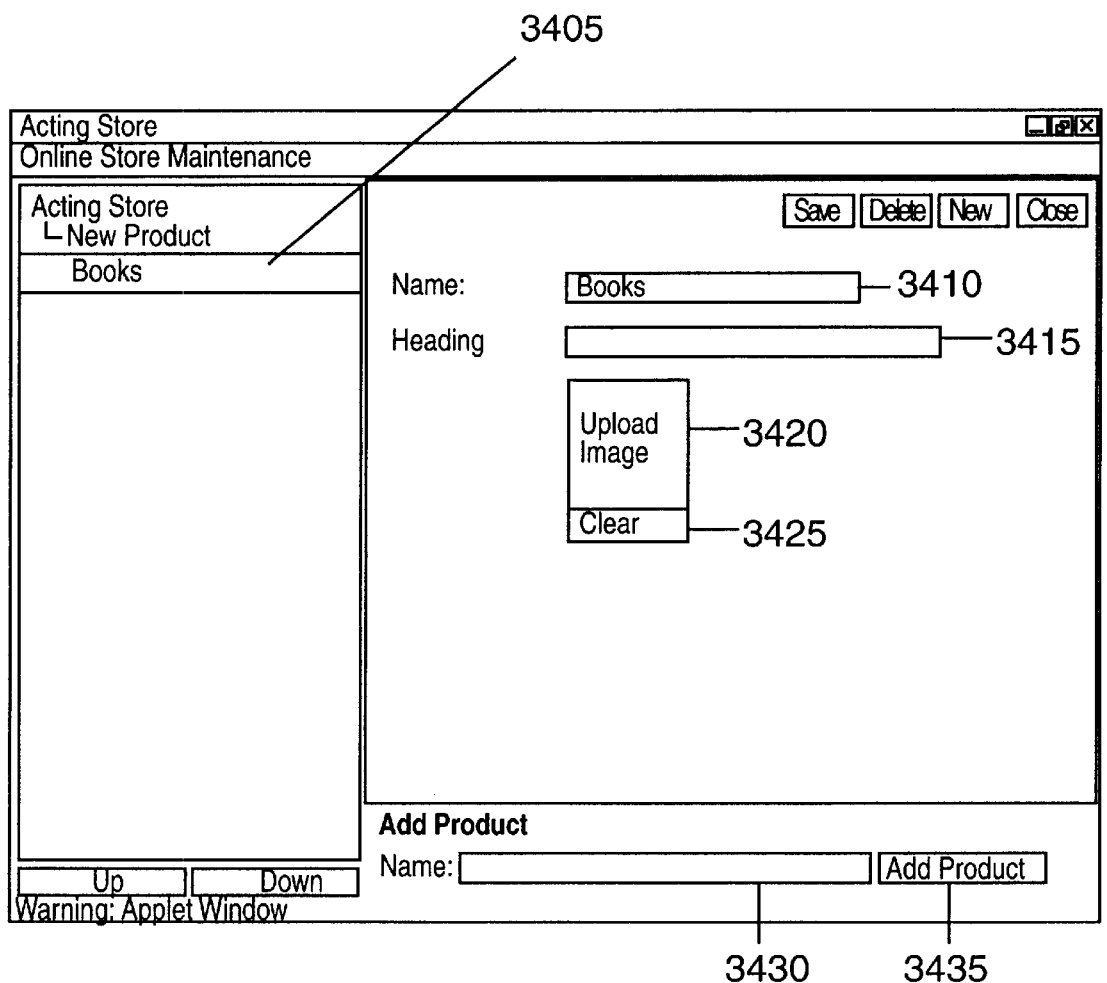

A "Name" text box 3345 is provided for entering a name for a new product category. After a name is entered into text box 3345, and after "Add Category" box 3350 is clicked, a new product category is added to the online store as shown in area 3405 of FIG. 34. A "Name" text box 3410 is provided for entering and editing the name of the product category, as previously entered at text box 3345. A "Heading" text box 3415 is provided for entering a heading for the product category to be displayed on the online store. An "Upload Image" button 3420 provides for uploading an image to be displayed on the online store for the product category. A "Clear" button 3425 provides for removing an uploaded image.

Figure 35:
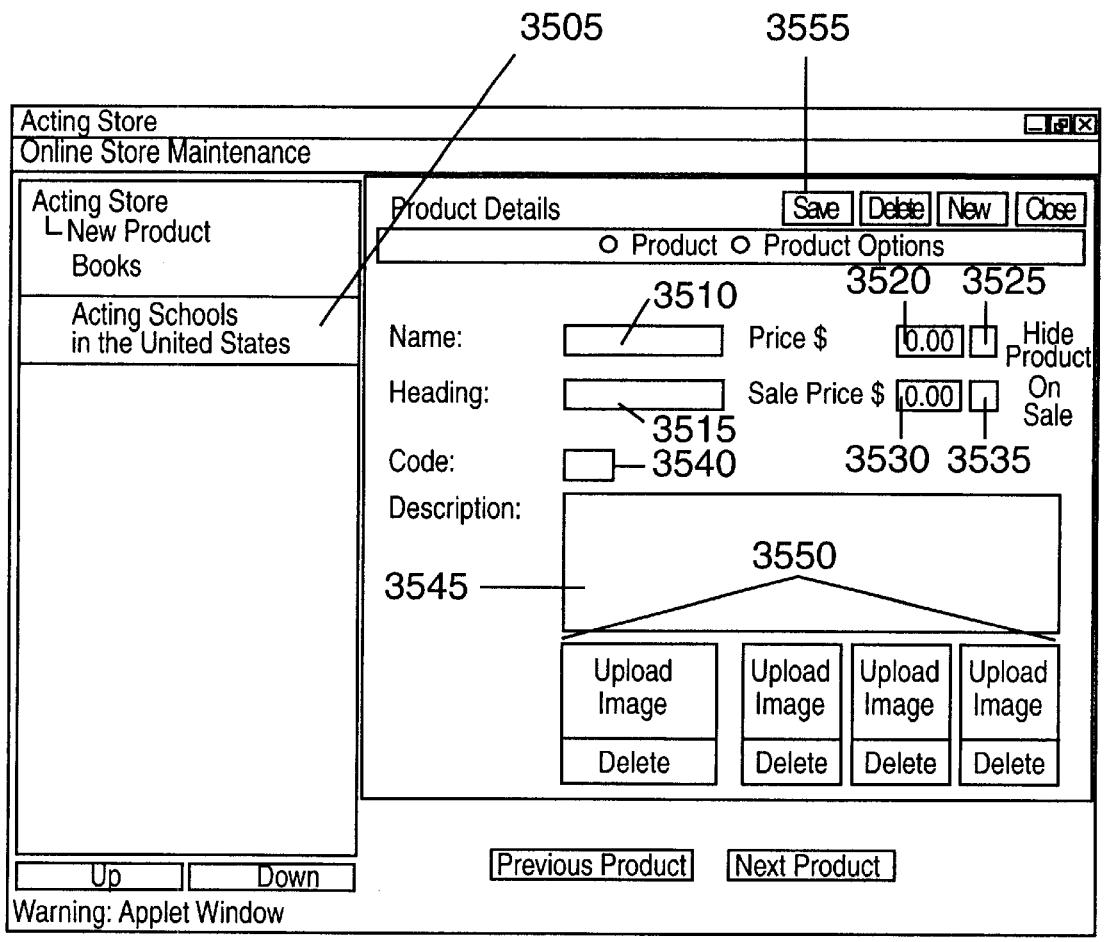

Upon entering a product name into "Name" text box 3430 and clicking "Add Product" button 3435, a new product is added to the product category as shown in area 3505 of FIG. 35. A "Name" text box 3510 is provided for entering and editing the name of the product, as previously entered at text box 3430. A "Heading" text box 3515 is provided for entering a heading for the product to be displayed on the online store. A "Price" entry box 3520 is provided for entering a unit price for the product. A "Hide Product" check box 3525 allows for selecting whether the product is to be hidden from display on the on-line store. A "Sale Price" entry box 3530 is provided for entering a sale price which would be the effective unit price for the product when "On Sale" check box 3535 is checked. A "Code" text box 3540 is provided for entering a product code for the product and a "Description" text box 3545 is provided for entering a text description of the product. Upload image buttons 3550 provide for uploading at least one image of the product for display on the on-line store. The aforementioned details and settings of the product is saved by clicking "Save" button 3555.

Figure 36:
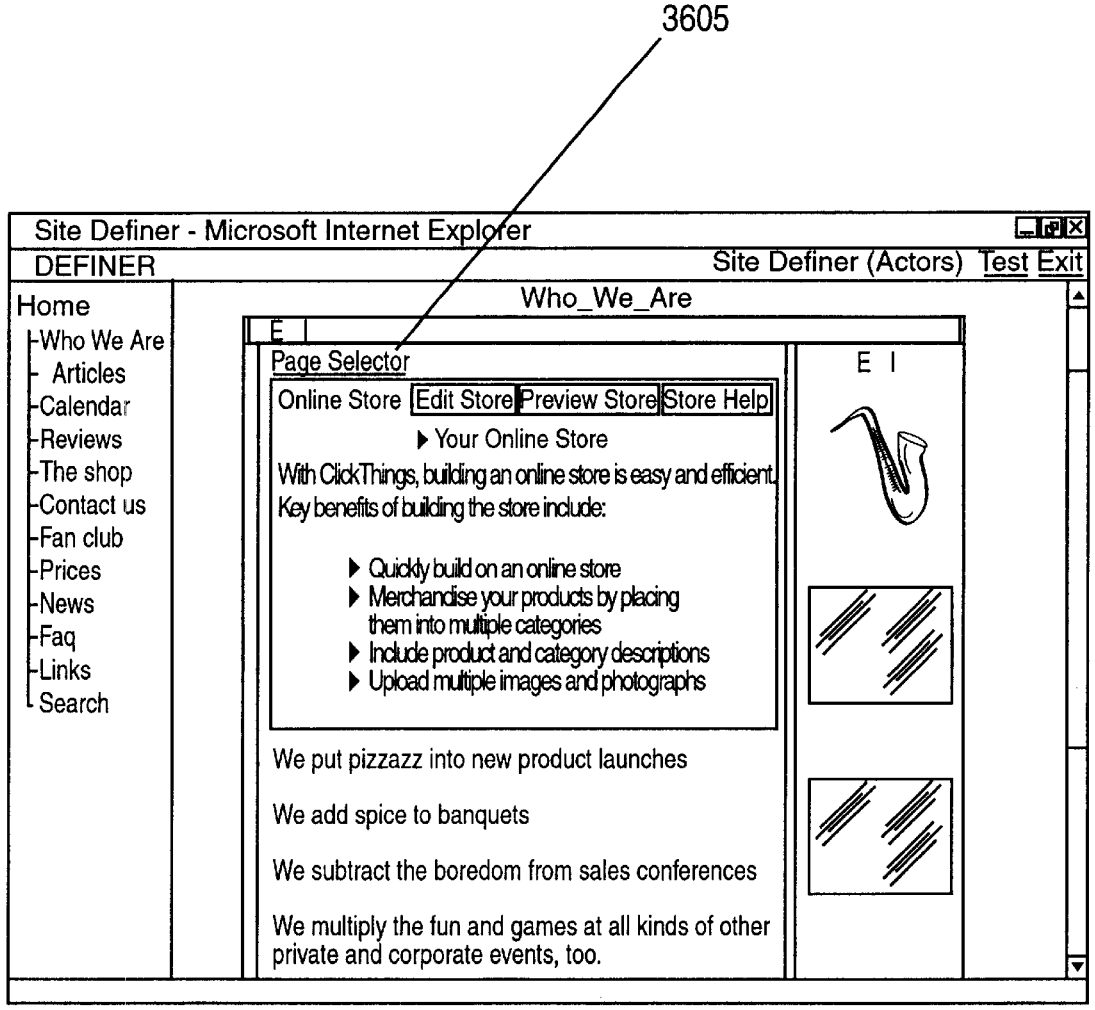

FIG. 36 illustrates a page selector link 3605 that is added to a page by selecting the "Insert Page Selector" command illustrated in FIG. 23.

Operations for designing and maintaining questions to be included in a web site template for generating new web sites will now be described in detail. In accordance with the invention, there are five types of questions. Include page questions are questions that prompt end-users on whether a certain page from the template is to be included in the generated web site. Content questions are questions that inquire end-users whether a specific section of content in one or more pages in the template is to be included in the generated web site. Text questions are questions that prompt users to provide short answers therefor wherein such answers are to be included in the generated web site. Text area questions are questions that require longer answers from users, wherein set answers are to be included to the generated web site. Finally, drop down questions are questions that require users to choose an answer from a custom drop down list.

Figure 37:
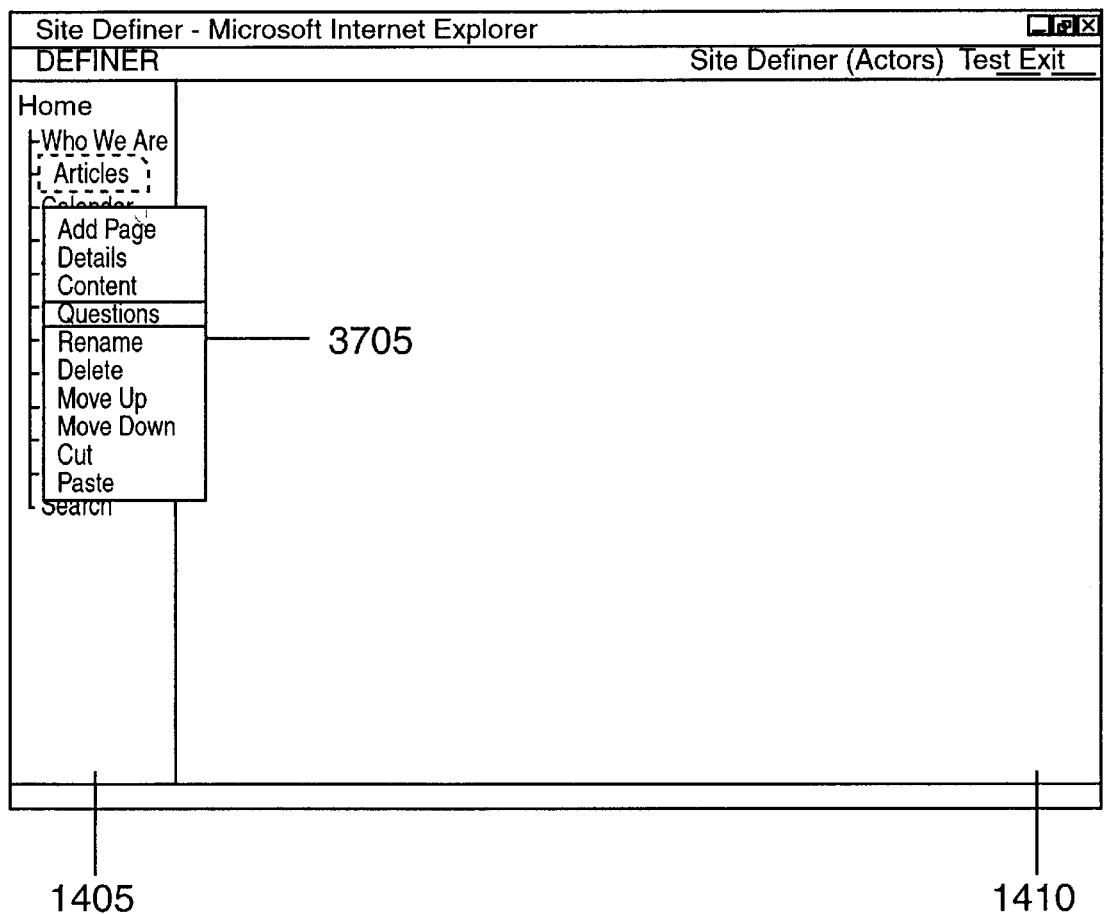
Figure 38:
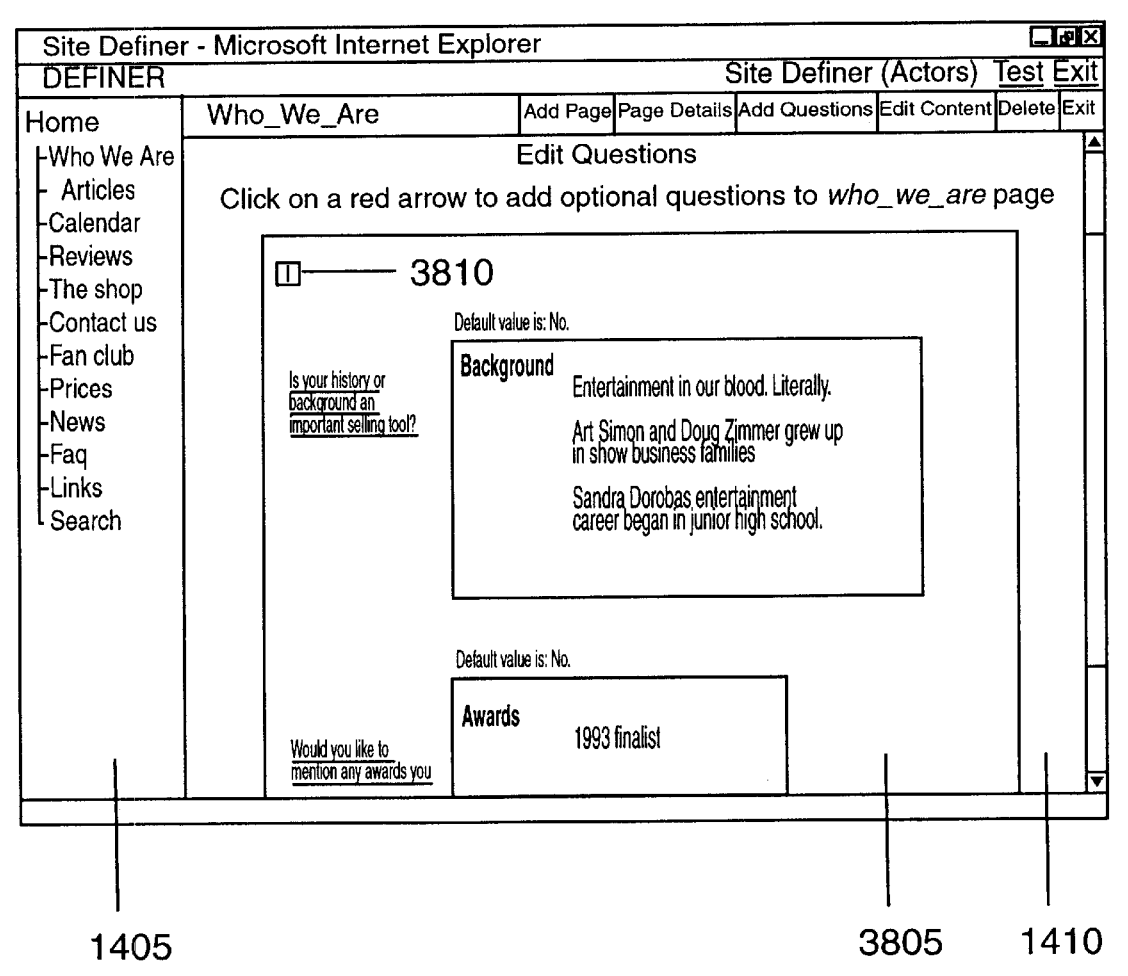

FIG. 37 illustrates selecting the "Questions" command from pop-up menu 3705, which is displayed by selecting an individual page template from site map area 1405. As shown in FIG. 38, an "Edit Questions" dialog box 3805 is displayed in page template detail area 1410 upon selection of the "Questions" command. When an  icon 3810 in "Edit Questions" dialog box 3805 is clicked, a menu of commands 3905 is displayed, as shown in FIG. 39. Menu 3905 includes commands such as a "Content Question" command, a "Text Question" command, a "Text Area Question" command, and a "Drop Down Question" command for inserting additional Questions of the various types to the page template.

FIG. 40 illustrates a "Content Question" dialogue box 4000, which is displayed upon selecting the "Content Question" command in menu 3905. A "Question" text box 4005 is provided for entering the question. A "Name" text box 4010 is provided for entering the name of the question. "Default Answer" radio buttons 4015 and 4020 provide for designating a default answer to the content question generated hereby. An "Answer" text box 4025 is provided for entering the text to be included in the contents of a generated web page if the content question is answered yes.

Layout Definer

Layout Definer creates tables for the various pages in layouts of the template web site. These tables are in a meta-data format so that they may be selected and/or edited using the Web Definer to suit a custom web site. The meta-data format will be described in further detail below.

Framework Definer

Framework Definer provides various layout variations for a web site. Framework Definer separates the "userspace" and "framework" to optimize a flexible solution for developing creative web site designs. The framework of the designs is maintained in various HTML table layouts. A framework is made up of components that define where one or more of a plurality of images from an image set, and where a content piece should be located in a web page layout. An image set defined by Image Definer (described below) contains images which are organized in an ordered tree of categories such horizontal, vertical, background, etc. As will be described below, Image Definer provides for defining additional image sets and categories of images.

A framework generated by Framework Definer defines the placement of each component of a web page. Content components of a site definition generated by Site Definer are placed according to the framework.

Functionally, Framework Definer provides for capturing and storing details of a web site, thus, enabling a user to quickly develop a unique table layout to develop image sets therefor. Typically, Layout Graphics for a web site include: Header, Footer, Background, and User Editable Content Space. Navigation Bar image data usually includes the image order, the number of navigational images, the navigational level (first, second, third level navigation etc). These parameters may be set and adjusted using Framework Definer.

Referring back to FIG. 5, "Framework Definer" link 520 directs client terminal 125 to a Framework Definer page. For a first time user, a tutorial pop up provides a 'wizard' style introduction. An experienced user may directly select one of the menu options: Specify Framework provides Framework Definer interface for specifying each layout object; Save—exports a framework to be saved in a framework library, and generates a thumbnail view of the framework for the library display; Previous Menu; Exit; and Help—small pop up window with tutorial type help with description of each button action.

To create a new Framework the user clicks on a red arrow in an edit area for a framework template and selects insert table. The user sets the attributes for the table layout; sets the table layout width to be fixed pixels or percentages; sets the table height in pixels or percentages; specifies the layout options—Header, title, horizontal navigation, vertical navigation, bottom navigation, userspace, and filler space.

A user may "Save" the Framework to a Framework Library (which is located at a content data store, and includes a collection of all created frameworks) without an Image Brief; or "Transfer Framework" to transfer the Image Brief to Project Manager to co-ordinate delivery to Image Definer. The operation of Image Definer for specifying images on a framework will be described in further detail below.

Project Manager adds a created framework to the Framework Library to enable a user to select an appropriate framework to fit their web site specification. List of modules the Framework Definer is authorized to use. Selecting the program leads the user to the 'Menu List' for that module. A list of tasks allocated to this user by the 'Project Manager', with the links to the correct module to perform this task. The 'Task List' also includes: Edit—edit existing 'Site'; Create—create new 'Site' using Definer with the correct task selected.

In the above-mentioned Framework Library, the number of navigational links and levels will determine the available Frameworks. The Project Manager co-ordinates the delivery of the Image Brief to Image Definer.

Image Definer

Figure 41:
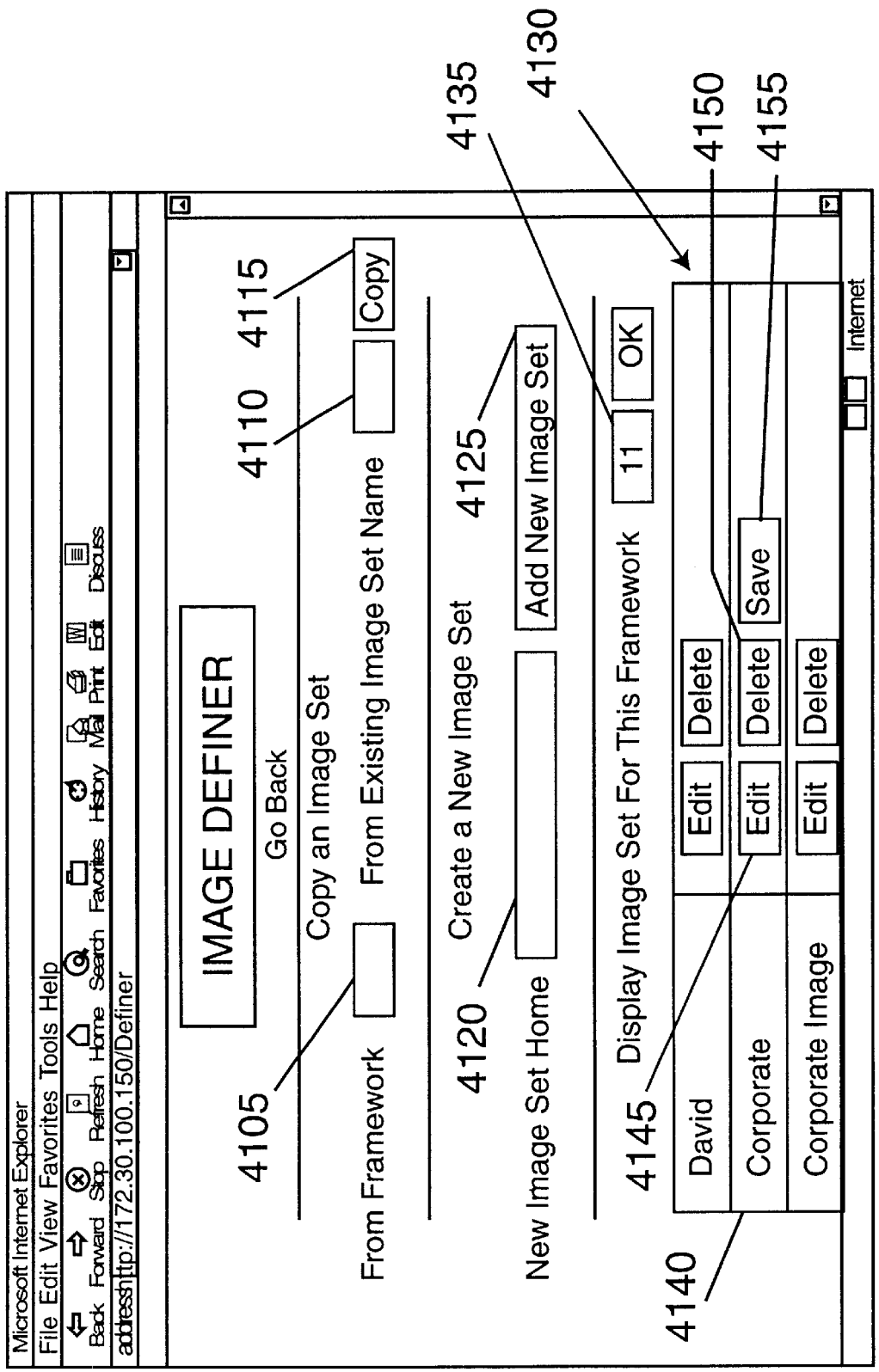
FIGS. 41 to 45 show the interface and functionality of creating, managing, editing, and saving image sets provided by the Image Definer module according to an embodiment of the invention.

Referring back to FIG. 5, "Image Definer" link 525 directs client terminal 125 to Image Definer screen 4100 shown in FIG. 41.

Image Definer allows for the selection and maintenance of various images on a web site. Image Definer contains a plurality of collections of image sets created by graphic designers that are matched with specific framework layouts and are designed by theme type. Each of the plurality of image sets is developed including related images. A minimum of 5 image sets are defined for a theme, thus allowing for a minimum of 5 frameworks for each theme. The Image Definer is provided with an image brief request by the Project Manager, which includes a requested theme and the quantity of images needed for the web site.

An image set is randomly selected from a requested theme and the images in the image set are broken down into separate categories. For each category, the images are broken down into variations. Image Definer replaces the image set of the template web site with the uploaded image set after selection and rescales the uploaded image set to conform to the framework to which it is applied, i.e., the framework of the template web site. Similar to the predefined image sets, the uploaded images may be re-colored in the Web Definer.

When displaying a page in the web site all images in a particular selected variation are retrieved and rendered. For a navigation object component, such as a navigation bar, navigation information generated for the page is used to determine how many actual images need to be rendered to form the component. Likewise, the text for each component image can be rendered instantaneously. Thus, the image and text rendering is based on navigation information for content, the structure of the content data, and the variation information for the look.

Image Definer also provides an interface for defining a new set of images for a framework. This new image set is constructed by adding images for every single category contained in the framework. And, as part of the Image Definer interface, the user, e.g., a graphic designer, is prompted to upload images. Using the Image Definer interface, the user is able to ensure that the uploaded image and all its variations fit properly no matter where they appear on a web page.

Definer also includes an image designer as an internal design tool that allows a designer to upload images and designs and conform them to the Definer environment, e.g., designate them to categories within a framework and modify them to conform to the requirements of the categories. As will be described in further detail below, Image Definer prompts a user/designer to choose a framework, whereupon a blank screen and a list of categories are presented. The user/designer then chooses one of the categories to work on, and can upload an image into the category.

As shown in FIG. 41, "Image Definer" screen 4100 comprises a "From Framework" drop-down selection menu 4105, an "Existing Image Set Name" text box 4110, a "Copy" button 4115, a "New Image Set Name" text box 4120, an "Add New Image Set" button 4125, and an image set display area 4130.

Image set display area 4130 includes a "Framework" selection drop-down menu 4135 for selecting a web page template framework, as created using Framework Definer, and displaying existing image sets stored thereunder, for example, "corporate 1" 4140.

"From Framework" menu 4105 provides for selecting a framework and retrieving an existing image set stored thereunder by entering the name thereof in text box 4110. The image set selected using menu 4105 and text box 4110 is copied as a new image set for the framework selected at drop-down menu 4135 upon clicking "Copy" button 4115.

"New Image Set Name" text box 4120 is provided for entering a name for a new image set to be created for the framework selected at drop-down menu 4135 by clicking "Add New Image Set" button 4125.

The image sets stored under the framework selected at drop-down menu 4135 are displayed in image set display area 4130 with "Edit" buttons 4145 and "Delete" buttons 4150. A "Save" button 4155 is also provided for each non-empty image set, for example, "corporate 1" 4140. "Delete" buttons 4150 provide for deleting an image set and "Save" button 4155 provides for saving the contents of image set "corporate 1" 4140. "Edit" buttons 4145 direct client terminal 125 to "Image Definer Editor" screen 4200, as shown in FIG. 42, for editing a corresponding image set.

Figure 42:
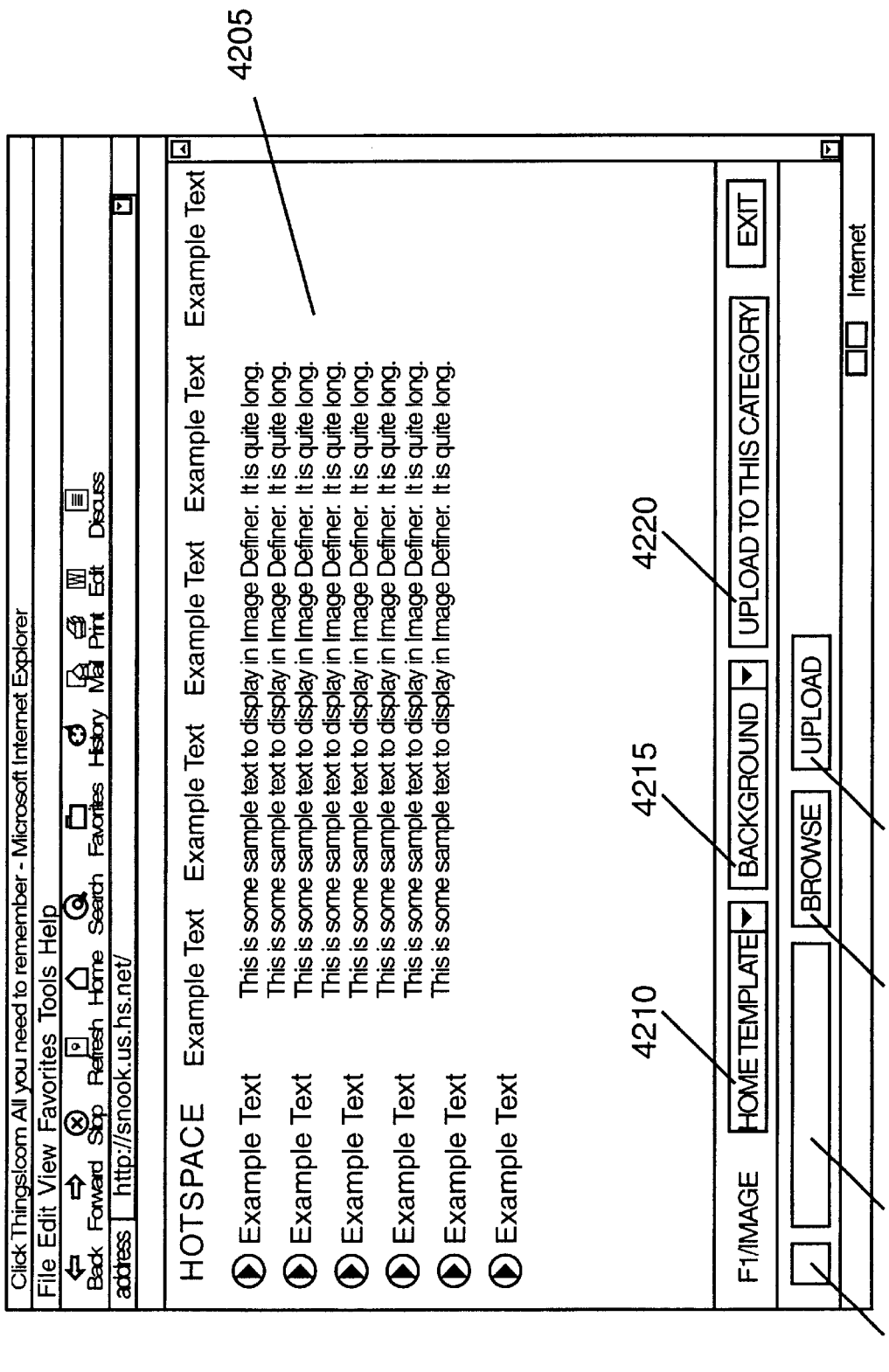

As shown in FIG. 42, "Image Definer Editor" screen 4200 comprises a WYSIWIG Panel area 4205 for displaying a combination of images from an image set on a framework as a complete Web page. A "Category" drop-down menu 4210 provides for switching between the "Home" page and the remaining pages of an image set, and an "Image Category" drop-down menu 4215 provides for selecting an image category, such as, Background, Header, Horizontal, Title, Vertical, and Footer. A "Category Display" window (not shown) displays the available image sets for a selected "Image Category." An image set selected in the "Category Display" window is displayed in WYSIWIG Panel area 4205. In addition, an "Image Type" may be entered for each image set at the "Category Display" window for specifying whether the images for the "Home" page and the remaining pages in the image set are the same. By clicking on the "Image Type" text, a pop-up menu (not shown) comprising the options "Delete this set", "Upload to this set", and "split into specific" is displayed. An "Upload to this category" button 4220 is provided for uploading the image set on display in panel area 4205 to the category selected at menus 4210 and 4215. A "Browse" button 4222 prompts the display of a menu (not shown) for browsing the local storage media at client terminal 125 for images stored therein. An "Upload" button 4225 is provided for uploading the image selected using the menu prompted by clicking "Browse" button 4222 or entered at entry box 4230. The uploaded image is displayed in a display panel 4235. If display panel 4235 is selected, the image therein is displayed in WYSIWIG Panel area 4205.

Figure 43:
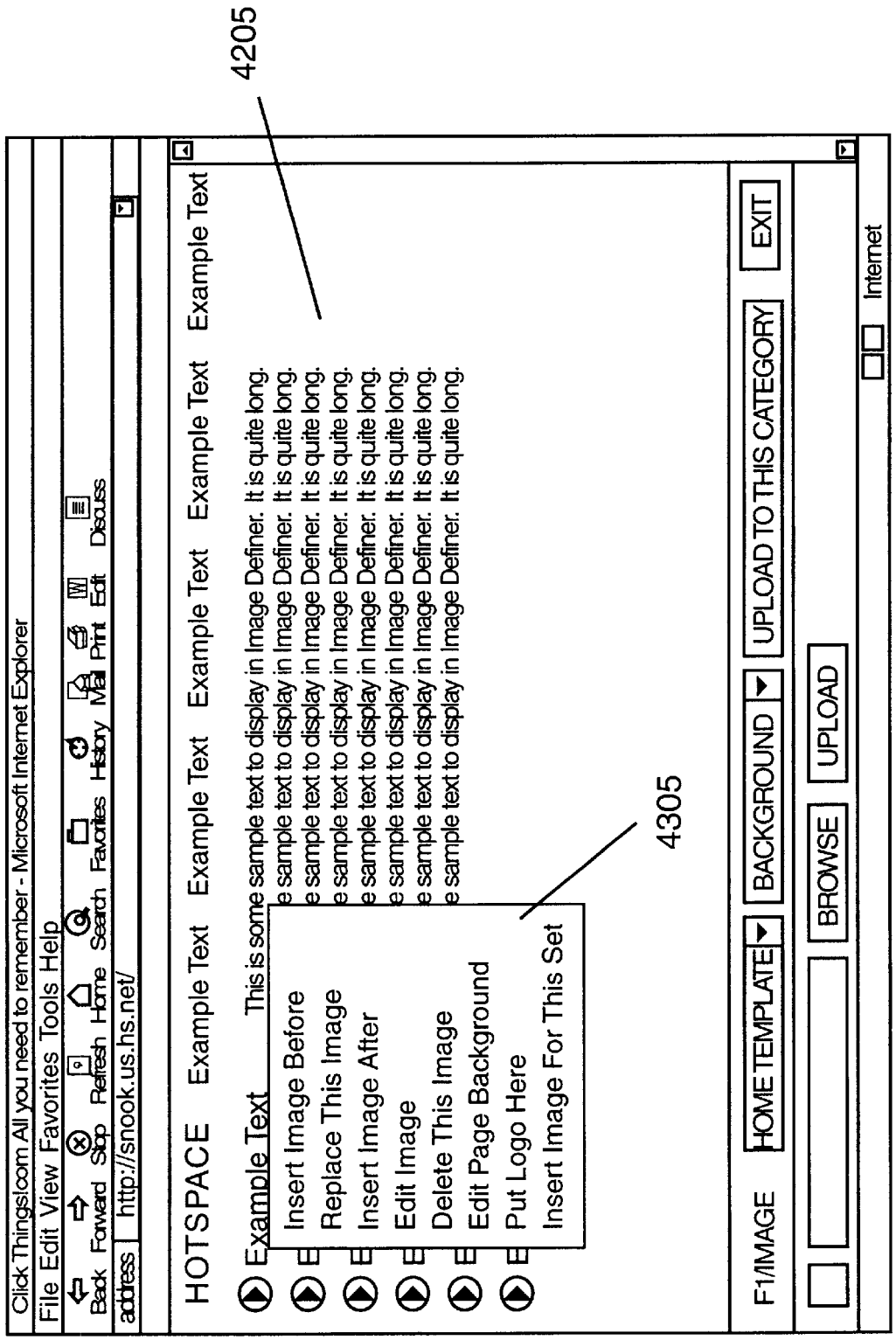

FIG. 43 illustrates an "Image Options" drop-down menu 4305 that is displayed when an image in WYSIWYG Panel area 4205 is clicked. As shown in FIG. 43, the "Image Options" include: "Insert Image Before" for inserting an image before the selected image (selecting this option prompts for uploading an image); "Replace This Image" for replacing the selected image (selecting this option prompts for uploading an image); "Insert Image After" for inserting an image before the selected image (selecting this option prompts for uploading an image); "Edit Image Attributes" for specifying the attributes for the selected image (a menu, which will be described in detail below, is displayed upon selection of this option); "Delete This Image" for deleting the selected image; "Edit Page Background" for editing an existing background image; "Put Logo Here" for including a logo uploaded by a user and specifying restrictions for displaying the logo with the selected image (a menu, which will be described in detail below, is displayed upon selection of this option); and "Insert Background For T his Set" for inserting a background image for the table cell comprising the selected image (this is important because a background image for the table cell completes the ability for a Web site to scale when viewed in various resolutions)(selecting this option prompts for uploading an image).

Figure 44:
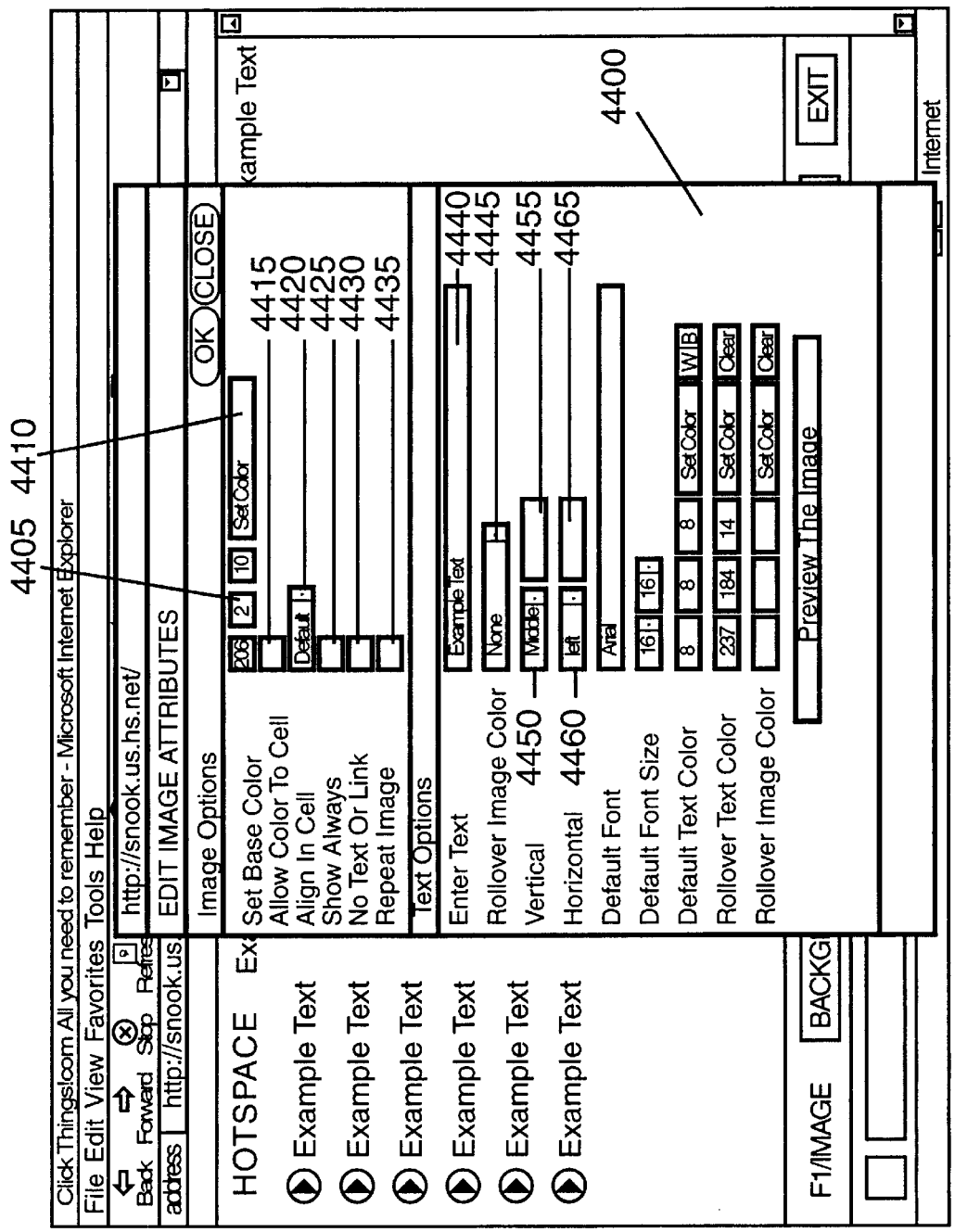

FIG. 44 depicts an "Edit Image Attributes" menu 4400 that is displayed when the "Edit Image Attributes" option from "Image Options" drop-down menu 4305 is selected. As shown in FIG. 44, menu 4400 comprises a number of "Image Options" and "Text Options."

Image Options

"Set Base Color" entry boxes 4405 and "Set Color" button 4410 provide for entering the Red-Green-Blue (RGB) base color of the selected image. An "Allow Color to Cell" check box 4415 provides for designating whether a base color is set in the table cell comprising the selected image. An "Align in Cell" drop-down selection menu 4420 provides for selecting the alignment (Default, Left, Right, Center) of the selected image in the table cell. A "Show Always" check box 4425 provides for designating whether the selected image is always displayed. A "No Text or Link" check box 4430 provides for designating whether or not text or a link is to be applied to the selected image. A "Repeat Image" check box 4435 provides for designating whether the selected image is to be repeated.

Text Options

An "Enter Text" text entry box 4440 is provided for entering text that is to be applied to the selected image. An "Effects" drop-down selection menu 4445 provides for selecting an effect (for example, Drop Shadow) to be applied to the text entered in box 4440 for display with the selected image. A "Vertical" alignment drop-down selection menu 4450 and entry box 4455 provides for designating the vertical alignment of the text entered in box 4440 to the selected image when displayed. Similarly, a "Horizontal" alignment drop-down selection menu 4450 and entry box 4455 provides for designating the vertical alignment of the text entered in box 4440 to the selected image when displayed. A "Default Font" drop-down selection menu 4460 provides for selecting the default font for displaying the text entered in box 4440. A "Default Font Size" drop-down selection menu 4465 and entry box 4470 provide for designating the default font size for displaying the text entered in box 4440. "Default Text Color" entry boxes 4475 and "Set Color" button 4480 provide for entering the RGB color for displaying the text entered in box 4440. "W" and "B" buttons 4485 provide for designating the text color to be white and black, respectively. The designations of "Rollover Text Color" and "Rollover Image Color" are done in the same fashion as for "Default Text Color," which will not be described again. A "Preview This Image" button 4490 provides for previewing the selected image and entered text as specified using "Edit Image Attributes" menu 4400.

Figure 45:
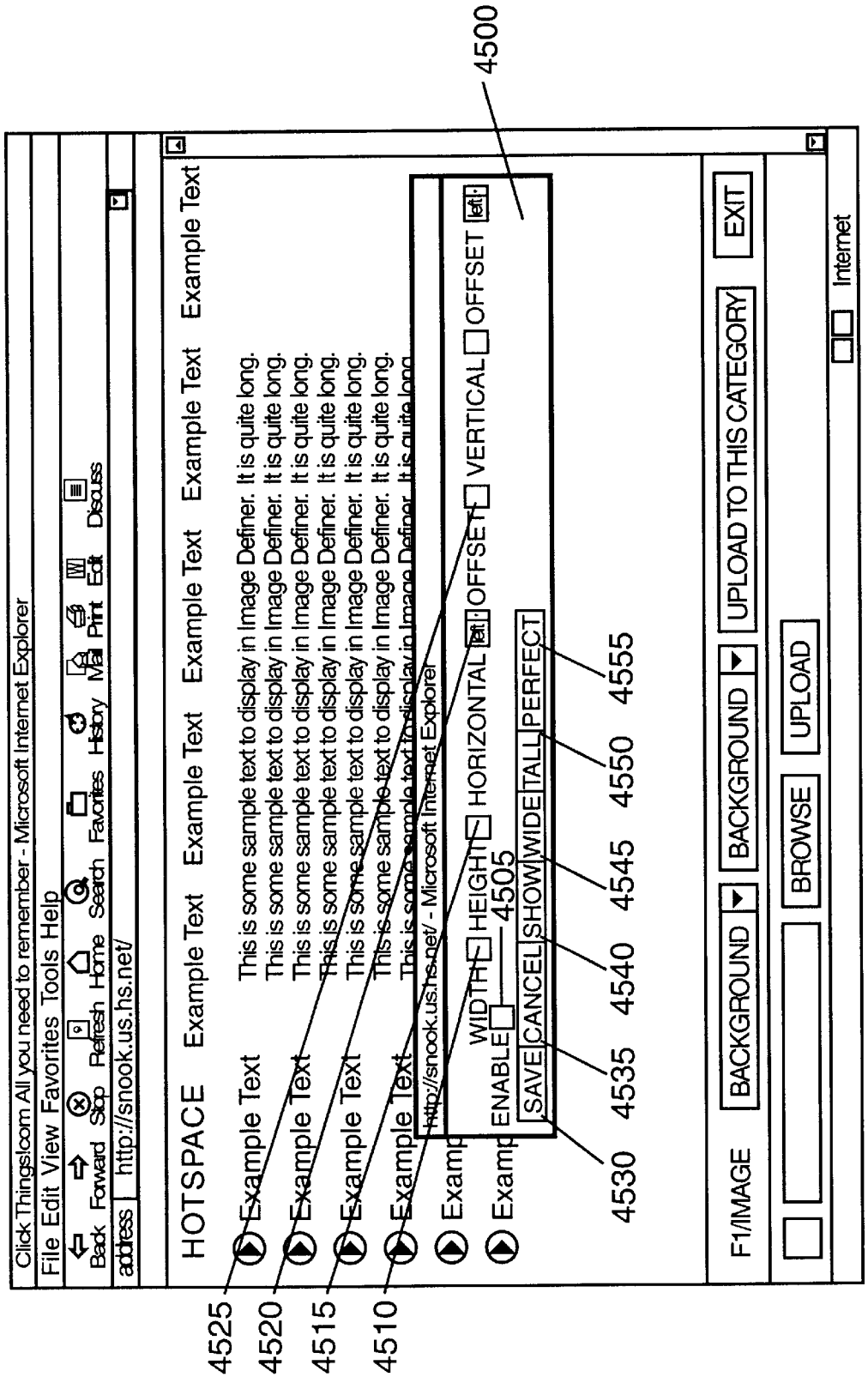

FIG. 45 depicts a "Put Logo Here" menu 4500 that is displayed when the "Put Logo Here" option from "Image Options" drop-down menu 4305 is selected. As shown in FIG. 45, an "Enable" text box 4505 for entering "Y" or "N"

provides for designating whether a logo uploaded by a user is to be displayed with the selected image. A "Width" entry box 4510 is provided for entering a maximum width for the logo (in pixels). A "Height" entry box 4515 is provided for entering a maximum height for the logo (in pixels). A "Horizontal" drop-down selection menu 4520 provides for selecting an alignment of the logo (Left, Right, Center) to the selected image. An "Offset" entry box 4525 is provided for entering an offset position (Left, Right, Center and number of pixels) for displaying the logo with the selected image. A "Save" button 4530 provides for saving the specifications entered at menu 4500. A "Cancel" button 4535 provides for cancelling any changes to the selected image brought about by changes to the specifications at menu 4500. A "Show" button 4540 provides for previewing a sample of the selected image according to the specifications entered at menu 4500. A "Wide" button 4545 is provided for previewing a wide version of the sample image. A "Tall" button 4550 is provided for previewing a tall version of the sample image. A "Perfect" button 4555 is provided for previewing the sample image as specified exactly by the specifications entered at menu 4500.

The above-described text rendering system ("text options") under Image Definer provides, say, a Graphic Designer the tools that are both flexible and easy to use when rendering text onto high quality professional images. The options that are available, as mentioned above, will now be described in further detail.

Depth Effects

A Graphics Designer may set an effect for the text on an image, the menu options for setting such effect include: drop shadow; select color of drop shadow; select by pull down list the 'blur' type; set the X and Y offset of effect (in pixels); enter the Transparency level (in percentages); embossed text; set the X and Y offset of effect; and apply effect.

Blank Setting

A Graphic Designer may also preset a number of settings to be applied to a blank image before entering text, including: 'Head Length' (in pixels); Body Length' (in pixels); Tail Length' (in pixels); and RGB base color of image.

Text Position

A user may set the text position on the image, including: horizontal justification on left, center, and right; vertical justification on top, middle, and bottom; and offsets on vertical (in pixels) and horizontal (in pixels).

Button Text

A user may enter the text to render onto an image by entering text in a text entry box, as described above, whereby entry of multiple lines of text is supported.

Text Layer

A user may apply customize text characteristics to an image, as described above, which include: font specifications; pull down list of 'Font Type'; color selection for 'Text Color'; 'Red, Green, Blue' entry boxes to fine tune color or allow a designer to enter their color value if known; text effects, such as anti-aliased Text check box. The anti-aliased option allows a user to minimize the pixel contrast at the edges of the text. As a result thereof, the edges of the text appear smooth and blend into the background.

Save Batch

After finishing with the text rendering, a designer may save multiple images as a batch. A batch file may contain phrases to apply to an image, i.e., image text and image name. Additional options include 'Load a Batch File'— Select a (text.txt) file that contains the batch information; and 'Choose a Destination Directory'—Select the directory the new images are to be stored.

Project Manager

The Definer Project Manager allows a registered user to facilitate the delivery of a successful vertical market solution. The Project Manager co-ordinates a number of Definer products including: Site Definer; Framework Definer; Framework Library; Graphic Designer; and Content Definer.

Once a user enters the Project Manager, a list of projects is displayed at client terminal 125 with the following hierarchy:

- List of Projects
    - Current
        - Open
            - User ID
            - Module Type
            - Description
            - Status
                - Creation Date
                - Start
                - Work in Progress
                - Completion Date
        - New
            - User ID
            - Module Type
            - Industry
            - Theme
            - Description
            - Status
                - Creation Date
    - History
        - List of projects by modules.
    - Transfer Project
        - Transfer project to another user.

By selecting a project, the user (client terminal 125) is directed to the 'Task List Status' for that module with a list of tasks allocated to this user by the 'Project Manager', including the links to the correct module to perform this task.

Introduction Screen

The introduction screen of the Project Manager displays a menu with the Definer modules responsible for a selected project, including: Site Definer; Framework Definer; Framework Library; Graphic Designer; and Content Definer. If one of these modules is selected, the user is provided with the work in progress and the following project management options relating to the selected Definer module.

Site Definer & Framework Definer

The user may select one of the following options (italicized) if either the Site Definer or Framework Definer is selected at the introduction screen:

- New Projects
    - Lists the number of 'New Projects' submitted for Graphic Sets or Framework creation.
- View Definition
    - Lists the page topics.
    - Lists the navigation type.
    - Lists the relationship of the page links.
- View Suitable Frameworks
    - Lists the Frameworks that will fit configuration
- View Suitable Graphics
    - Lists the Graphic Sets available for both the selected vertical market and theme.
- Transfer Site Definer
    - Allows the Project Manager to transfer the selected project to either a Framework Definer or Graphics Designer or both.
        - Enter the Graphic Designer ID or
        - Framework Definer ID to transfer project includes the Project ID and creation date.

- Projects for Approval
    - Lists the number of Projects for approval.
    - The Project Manager can view the new Frameworks and Graphic sets before approval.
- Completed Projects
    - Lists the full directory listing for Site Definer.

Framework Library

If the Framework Library is selected, the user may view the stored frameworks or add new frameworks. In one embodiment, the user may be directed to the Framework Definer interface for viewing or adding frameworks.

Graphic Designer

The user may select one of the following options (italicized):

View New Framework
View New Graphic Sets
Graphic Sets Approval
Projects for Approval
Complete Graphic Sets Category Graphics Library The user may select one of the following options (italicized):

View Vertical Markets
View Themes

Content Definer

The Content Definer allows a registered user to detail content for a vertical market solution (SIS) or web site template. At an introduction screen, a list of the modules that cooperate with the Content Definer under the Project Manager is provided to the user.

By selecting a module, the user (client terminal 125) is directed to the to the 'Task List' for that module and a list of tasks allocated to this user by the 'Project Manager', with the links to the correct module to perform this task. The 'Task List' also includes:

Edit Project-edit existing 'Site Definer'.

Create Project - create new 'Content Definition'
Industry specified by 'Site Definer'.
Current Project Status
Creation Date
Not Started
Work in progress
Completed The user is then directed to the module with the correct task selected.

Content Definer WYSIWYG Editor

A Default Framework is displayed in a WYSIWYG Workspace (similar to the Site Definer interface) with a site map preview of the navigation page links of the web site specified by the Site Definer.

Site Map

By clicking on a page link from the site map preview, the page is displayed in the WYSIWYG Workspace. The Content Definer inserts pre-defined 'Complex Components' directly into the Content areas of the page, including: Text with tables; Text with photo's; FAQ's; Price List; E-Mail form; and Hit Counter. The Content Definer may insert tables into the Content area; otherwise the editing level is the same as an end user using Web Definer. When inserting industry specific text (either by clicking on existing text or inserting new text) the Content Definer specifies the 'Quick Start' components which populates information within the users web site. The populated information specified by the Content Definer will generate the industry specific form, to be entered by the end user as part of the registration of a Definer account.

The Content Definer also provides a menu for: Save Project; Exit Project; Previous Menu (Project Manager); and Help. A Tools Menu section is also provided for previewing a thumbnail of each of the available Frameworks that fit the site definition. By clicking on a thumbnail, a preview of the selected Framework is displayed as the Content area in the WYSIWYG Workspace.

It is noted that if Content Definer modifies the Content area for the selected Framework, those change only effect that Framework.

Graphics Library

The Definer Graphics Library allows the 'End User' to insert multiple images from a clip art library. The cataloging of these images is by the following:

Cataloged by vertical market.
Photograph's
Clipart

Category Image Library

The Definer Category Image Library is where the specific vertical market and theme images for a template are stored. The Project Manager has access to the category to approve and check availability of images. The Image Definer also has access to the category for reference.

Framework Library

The Definer Framework Library is designed to allow Project Manager, Image Definer, Framework Definer, and Web Definer to manage and co-ordinate Frameworks.

The Framework Definer develops frameworks that are submitted to the Definer Framework Library. The Project Manager manages the number of complimenting images and number of Framework variations available to the Image Definer and Web Definer.

Definer Module Integration

The three interconnected modules, Site Definer, Section Definer, and Layout Definer provide the business market with the ability to produce top-grade, content-rich web sites with unique, end user-determined designs. From a single participant (an industry expert, for example) to a group of any size (an entire vertical market), this product trio is essentially a publishing tool that enables the user(s) to create and present industry-specific content. Among the many various ways these easily-accessible devices extend user capabilities are: clear, logically cross-referenced site maps; User-specified navigation indicators; and complete customization and fast update procedures. Prospective participants span the full spectrum of business constituencies; sponsors; software developers; industry experts; and vertical industry groups.

Another segment of the Definer back-end product suite is a graphic design platform two components: Image Definer and Framework Definer. Designers may use Image Definer to build core multi-dimensional graphics for subsequent manipulation and second-generation usage. The Framework Definer may be employed to design layouts that suit specific-image sets.

Thus, the Definer back-end product suite may be used to design a targeted publishing/marketing web site that is hosted using the Web Definer, which will be described in detail below, that provides the tools for building and maintaining web sites to users and/or businesses of the targeted category. For example, a designer may integrate new suggested content, navigation, styles, colors, art, etc. into a targeted publishing/marketing web site where new users of the targeted category may create new web sites by choosing from the suggested content, navigation, styles, colors, art, etc., provided by the designer. The web site categories have been described as GISs and SISs in the illustrative embodiment thus far. However, a designer may use the Definer back-end product suite to redefine the categorization, e.g., fiction writers as an equivalent of a GIS; and mystery writers, horror writers, romance writers, etc. as equivalents of individual SISs under fiction writers (GIS).

Web Definer

With a collection of site templates for a wide range of industries and businesses, an end user at client terminal 125 may construct and publish a complete web site using the Web Definer.

Referring back to FIG. 5, Web Definer link 530, if selected, directs client terminal 125 to the Web Definer module for creating and publishing a web site. In accordance with another embodiment of the invention, the Web Definer module is made available to general end-users for creating web sites without access to the remainder of the Definer modules. According to this embodiment, the URL identifying the Web Definer software at server 105 is made available to such end-users whereby they (e.g., client terminal 125) are directed to a welcome page for the Web Definer separate from page 300. The operation of Web Definer as used by such an end-user will now be described.

Figure 46:
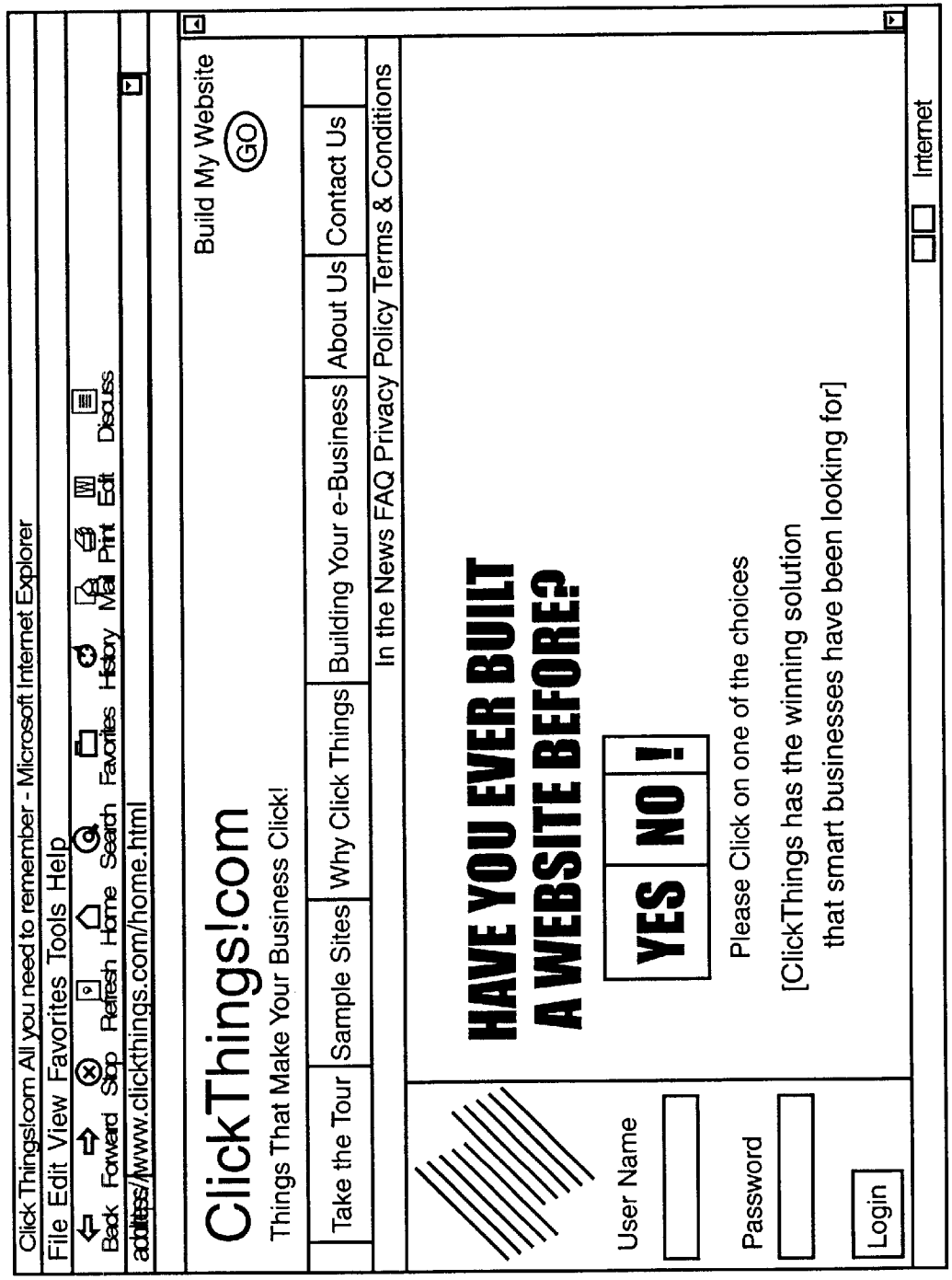
FIG. 46 depicts an initial welcome web page for accessing the Web Definer module according to an embodiment of the invention.

FIG. 46 illustrates an example of an initial welcome page 4600 similar to welcome page 300 that is displayed on client terminal 125 after accessing a predetermined URL identifying server 105 for the end-user Web Definer service. As shown in FIG. 46, initial page 4600 includes a plurality of links 4605, 4607, 4610, 4612, 4615, 4617, and 4620, for accessing additional information on the Web Definer service and the service provider. For example, link 4605, if selected, directs client terminal 125 through a series of demo pages for demonstrating the features and services that are provided by the Web Definer. Button 4622 directs client terminal 125 to a web page that allows a user to register for the use of Web Definer.

For existing members already subscribed to the services provided by server 105, text-entry spaces 4630 and 4635 are provided for entering a previously-defined member name and corresponding password, respectively. Server 105 authenticates the entered information after a click on "ok" button 4640. If the information from spaces 4630 and 4635 correspond to a valid, previously-defined, existing member, then client terminal 125 is directed to a web page comprising services and links designed for the existing member, as will be described in detail below.

Figure 47A:
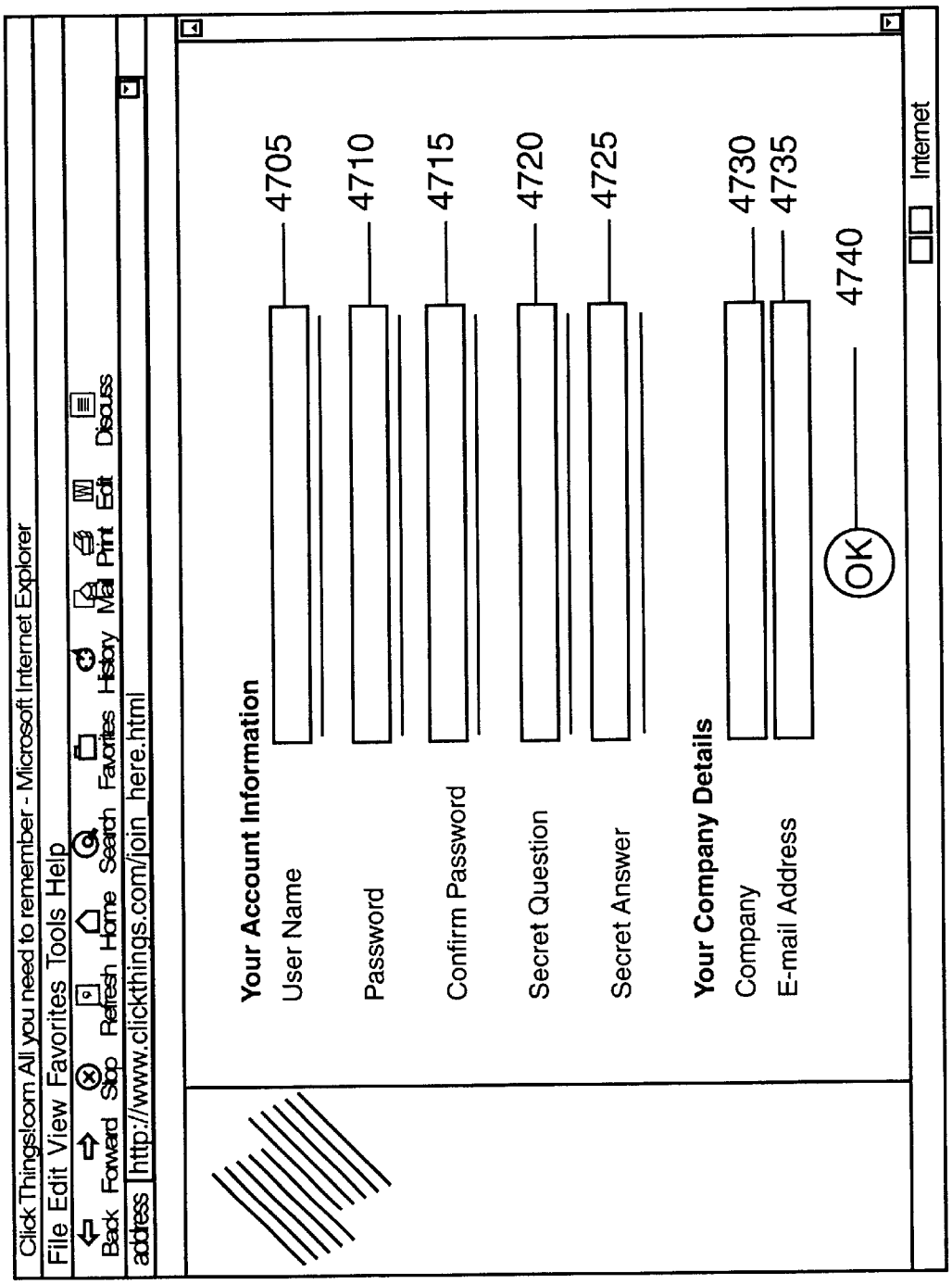
FIGS. 47A, 47B, and 47C show registration web pages for registering a new user for the Web Definer module according to an embodiment of the invention.

If a user has not previously registered with server 105, as noted above, link 4622 directs client terminal 125 to new member page 4700 so that the new user may register, as illustrated by FIG. 47.

As shown in FIG. 47, new member page 4700 comprises a plurality of text-entry spaces 4705, 4710, 4715, 4720, 4725, 4730, and 4735 for entering information regarding the business and basic account information of the new user at client terminal 125. Spaces 4705, 4710, 4715, 4720, and 4725 are provided for entering a user name, a password, and password/username reminder Question and Answer to create an end-user account for Web-Definer. Spaces 4730 and 4735 are provided for the entry of the user's E-mail address and business name to be registered with server 105.

Figure 47B:
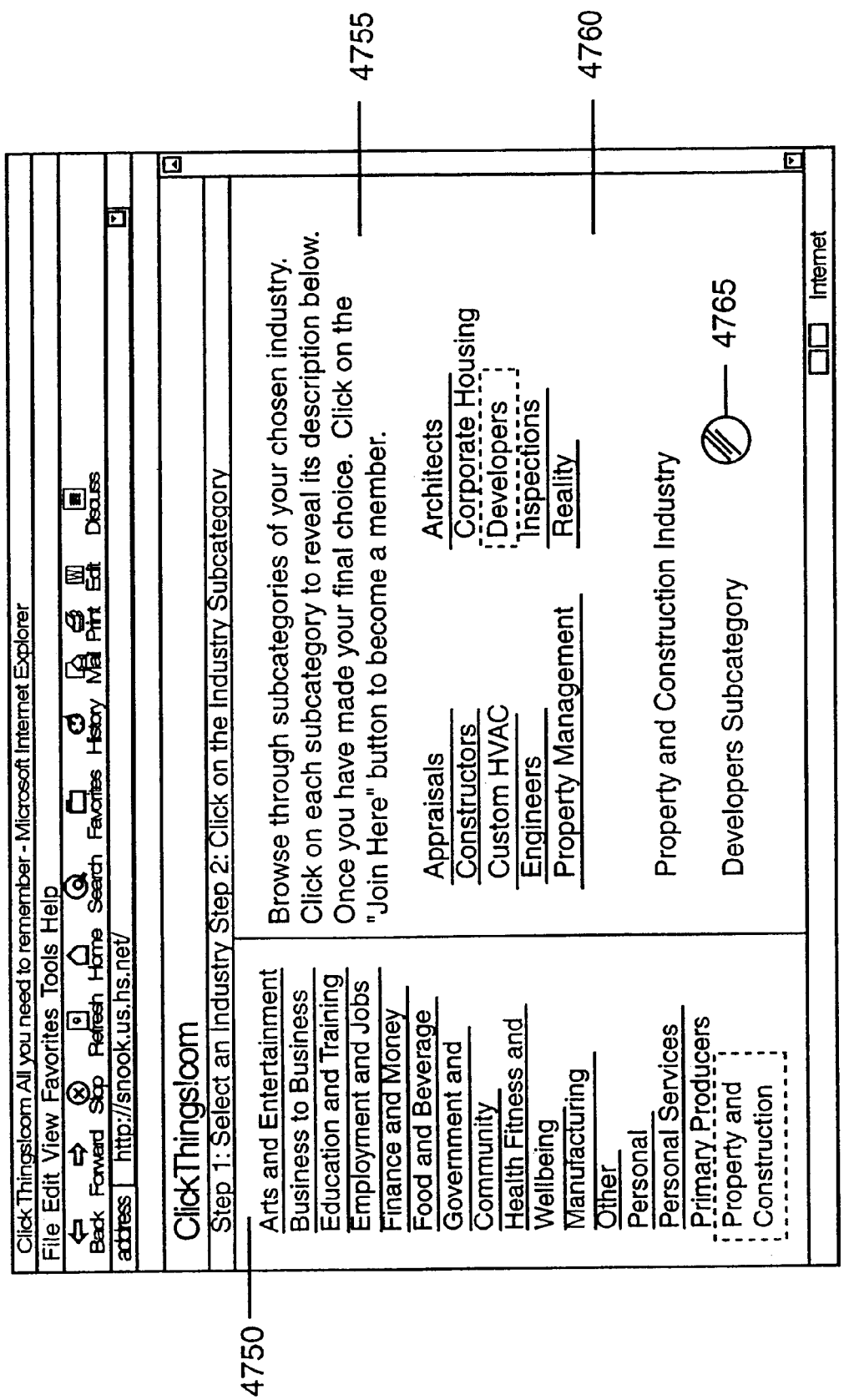

After all the information has been entered, the user at client terminal 125 may click button 4740 whereupon the information is registered with server 105. According to the invention, at least one business category selection page 4745, shown in FIG. 47B, is transmitted from server 105 to be displayed on client terminal 125 for selecting the general industry (4750) and a specific kind of business (4755) within the industry of the end-user's business. The selection is displayed in area 4760.

Figure 47C:
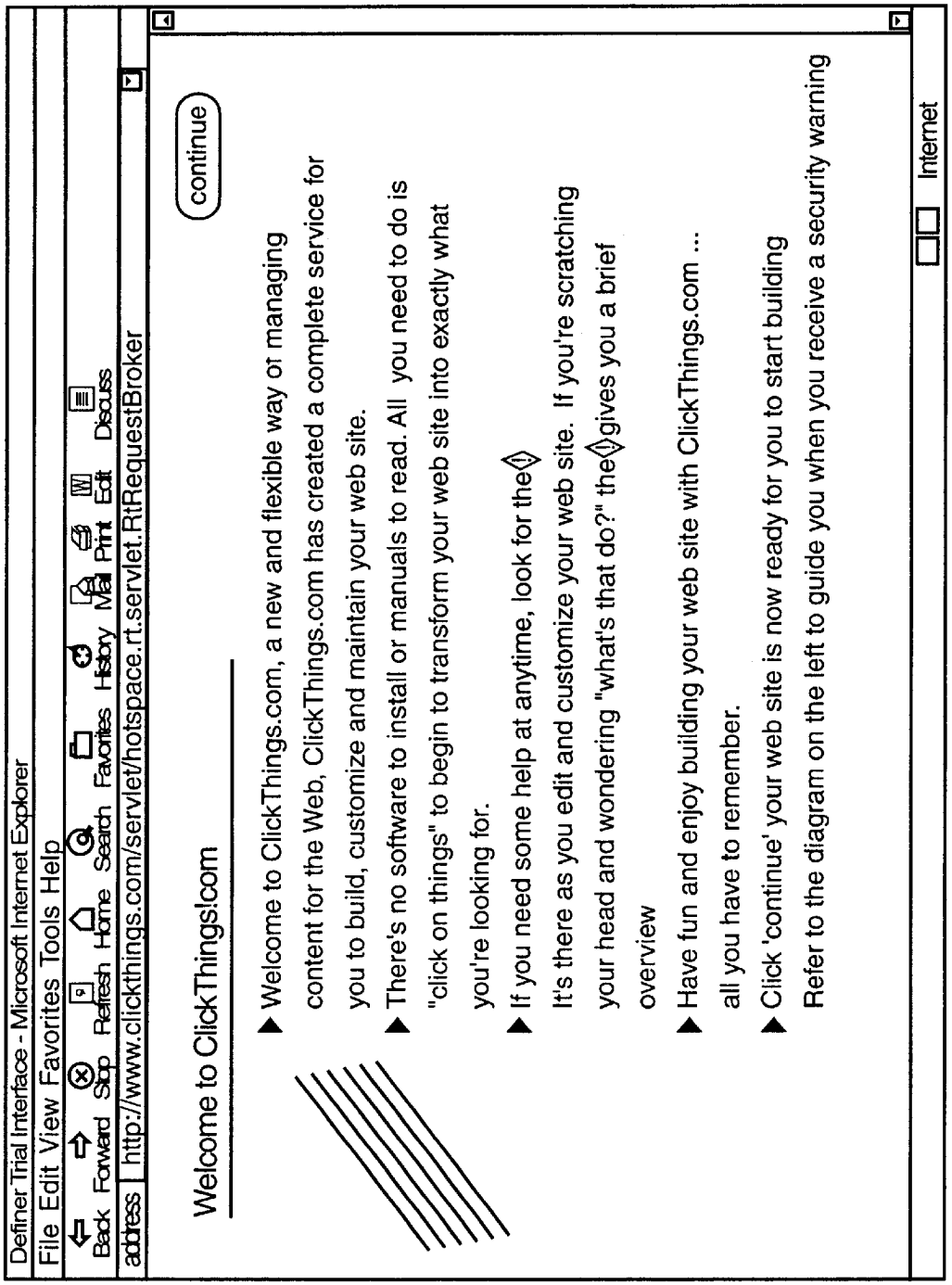

After the correct business type has been selected, the end-user may click a "join" button 4765, which directs client terminal 125 to an introduction page, as shown in FIG. 47C, for describing the various design and on-line help features offered by the Web Definer interface for web site generation. It is appreciated that a user may be registered automatically whereby user information is retrieved from a database.

In accordance with the illustrative embodiment of the invention, after registration of the information submitted by the user in box 4705, server 105 generates a web site with a unique structure that is generally structured to correspond to the registered industry, business, and company information. For example, the web site may be generated in accordance with a site template that is defined using the Site Definer for an SIS selected by an end user at client terminal 125 (which is under a selected GIS). It is noted that a site template defined using the Site Definer may include a number of variations, such as images within an image set, navigation models, themes, colors, etc. These variations may be programmed as complementary sets using the Definer suite (e.g., Image Definer for defining complementary image sets). A web site may be generated according to the site template based on any random, pseudo-random, or non-deterministic algorithm to yield a particular combination of such variations. Therefore, any two users having identical profiles, preferences, SIS's, etc. would have a very small chance of receiving the same generated web site.

Figure 48:
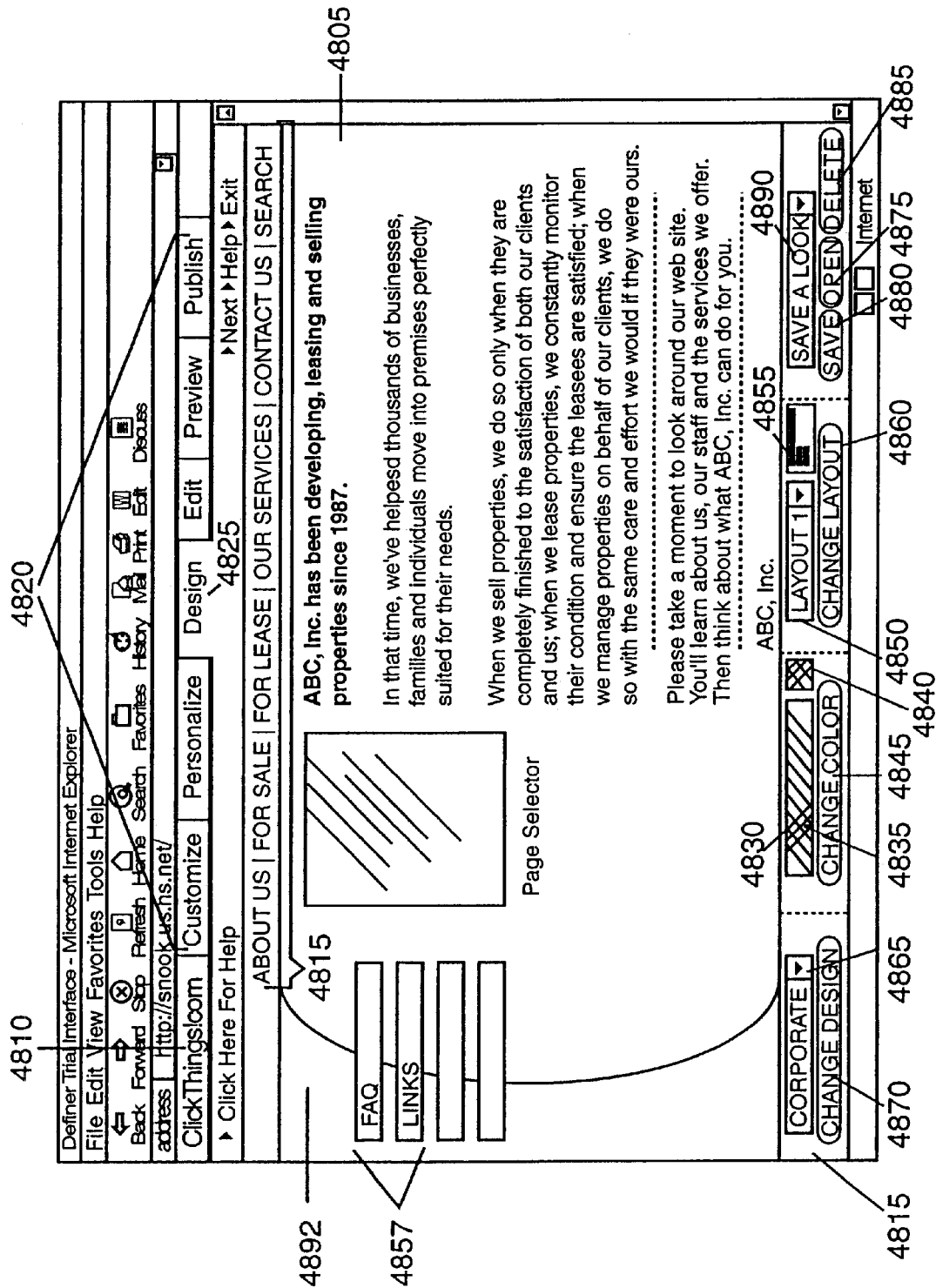

A generated web site, one page of which is displayed in FIG. 48 with its web page structure, is assigned to the user at client terminal 125, and is displayed as a template web site for the user's review and modification. The Web Definer interface of the invention and its various design, edit, and modification features are presented in a plurality of feature web pages. These feature web pages each include a specific interface that is displayed with the template web site to allow the user to make desired edits, modifications, additions, etc. to the displayed template web site. The overall control for accessing these various feature web pages is provided in a Web Definer control bar at the top of each feature web page. Advantageously, the user at client terminal 125 may "jump" from one feature web page to another instantaneously in order to access the corresponding desired design features. Each feature web page accessible through the Web Definer interface and the corresponding design features available at each feature web page will now be described in detail.

FIG. 48 illustrates Design page 4800 for designing the overall framework or "look and feel" of the template web site, including its structure of template web pages. In accordance with an embodiment of the invention, Design page 4800 comprises a template web site area 4805, a control bar 4810, and design tool area 4815. Control bar 4810 comprises a set of buttons 4820, which direct client terminal 125 to the aforementioned feature web pages wherein various design, edit, and preview tools and online help features are available to the user. As shown in FIG. 48, design button 4825 is highlighted, reflecting that Design page 4800 is on display at client terminal 125, as selected by the user. A control bar and a set of buttons corresponding to control bar 4810 and buttons 4820 are included in all of the feature web pages, and that Design page 4800, or any other of the feature pages that will be described is accessible therefrom by simply clicking the button corresponding to design button 4825, or any other appropriate button, as desired.

As illustrated in FIG. 48, template web site area 4805 displays the template web site generated by server 105 according to the information previously provided by the user in pages 4700 and 4745. Template web site area 4805 allows the user at client terminal 125 to preview the template web site as it would appear on any client terminal as if it were published to Internet 120. As shown by FIG. 4, the template "home" page of the template web site is displayed in area 4805 by default. Much like welcome page 4600, this template "home" page would be the initial page that greets a user at a client terminal if the template web site were published on Internet 120.

In accordance with the invention, any changes, edits, modifications, deletions, or additions to the template web site via the tools and features presented at the various feature web pages, including Design page 4800, are immediately incorporated to the template web site at server 105 and displayed at template web site area 4805. Thus, the user at client terminal 125 can instantly review such changes as they would appear on Internet 120 instantly. It is appreciated that the framework or "look and feel" of a web site should be consistent throughout its entire structure of web pages. Thus, in accordance with the invention, any changes made via the interface presented on Design page 4800 to the template "home" web page displayed in area 4805 are automatically incorporated to the entire structure of template web pages. Advantageously, a user is not required to make corresponding changes to each template web page.

Design tool area 4815 comprises a plurality of design tools specific to Design page 4800 that are available to the user. A color bar applet 4830 provides a spectrum of colors available for selection whereby the user may select a color scheme for the template web site by sliding an indicator 4835 to the desired color. A color box 4840 displays a sample of the selected color. By clicking a box 4845, the user may change the overall color scheme of the template web site to the selected color as shown in box 4840. As will be described in further detail below, server comprises software in accordance with the invention that automatically coordinates the color schemes of the template web site to fit the selected color. As mentioned before, the color scheme of the template web site, including all of the template web pages, is changed according to the selected color and displayed in template web site area 4805 right away for the user's review.

A selection bar 4850 provides a plurality of choices for the layout of web site. A preview box 4855 displays a small preview of the selected layout at selection bar 4850. This layout function provides the user with an easy tool for quickly viewing the arrangement of one or more buttons 4857 and links 4859 on the template web site according to the various predetermined arrangements that are available to a user. An apply button 4860, if selected, changes the template web site in accordance with the selected layout. Again, the new layout is applied to each template page of the template web site immediately and displayed in template web site area 4805.

The design tools presented on Design page 4800 described thus far enable the user to change individual design aspects, such as color scheme and layout, of the template web site as displayed in the template web site area 4805. A selection bar 4865, on the other hand, provides a selection of overall themes in "looks and feels," or styles, for the template web site. After the user clicks a "Show More" button 4870, server 105 generates a completely new template web site in accordance with information entered by the user in pages 4700 and 4745 and the selected theme at selection bar 4865. Advantageously, a single access to server 105 enables the presentation of a new look, without any change to the content. Each change incorporates changes in various design attributes, including color, layout and image set. This newly generated template web site is then displayed in template web site area 4805. To enable the user to select between multiple template web sites, a plurality of buttons 4875, 4880, and 4885, and selection bar 4890 are provided. Buttons 4875, 4880 and 4885 allows the user to save multiple template web sites and to restore saved template web sites for display. Advantageously, the user is able to save a collection of template web sites having different themes, colors schemes, or layouts. The user is further able to view his collection of web sites in comparison with one another and select one that is most suited for the user's business.

The design tools in area 4815 on Design page 4800 described thus far are tools for changing the overall appearance of the template web site displayed in area 4805. Design page 4800 includes additional "popup" menus for changing individual components of the template web site. These popup menus appear when the user selects a specific component of the template web site displayed in area 4805. For example, a title bar 4892 may be selected by the user whereupon a popup menu would be displayed with various design options for the title on the displayed page.

Figure 49:
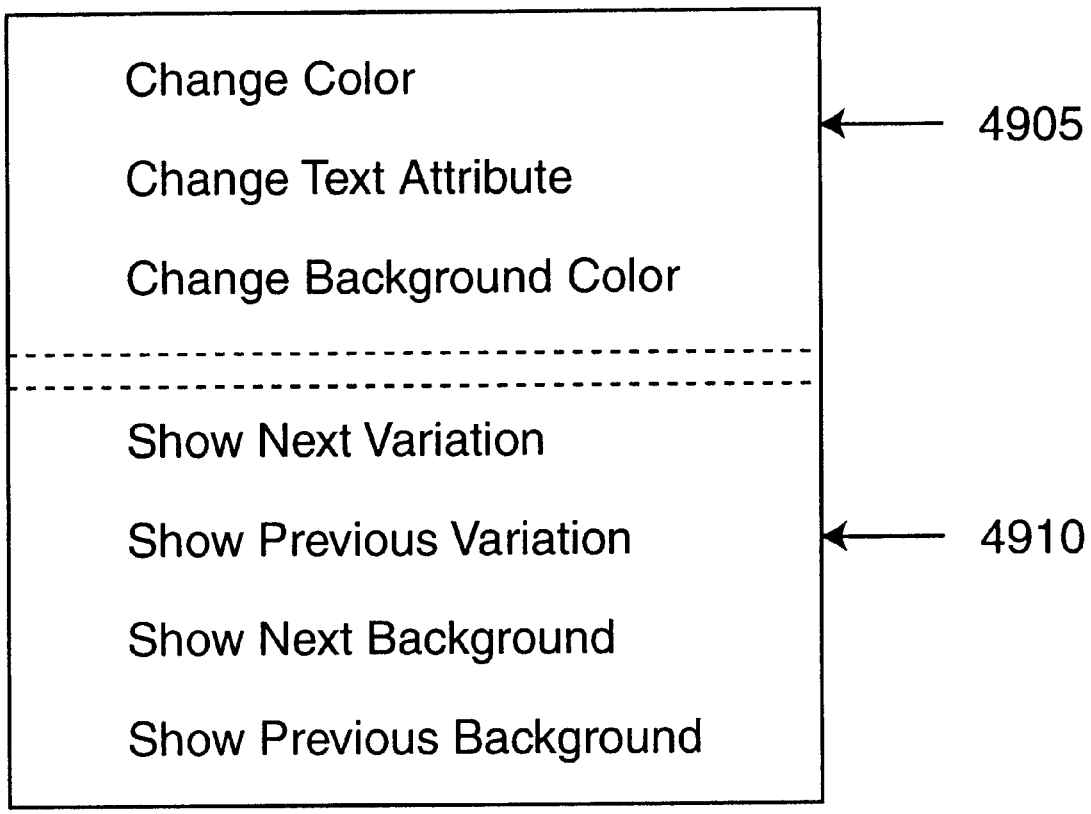

FIG. 49 illustrates a popup menu 4900 that appears at Design page 4900 when a specific component of the template web site, for example, title bar 4892, is selected at client terminal 125. As shown in FIG. 49, popup menu 4900, like the design tools in area 4815, allows the user to change individual design aspects (namely the selections in an upper menu 4905) and the overall "look and feel" (namely the selections in a lower menu 4910) of the selected component and the background set against the component.

Upper menu 4905 provides the user with selections for changing specific design aspects of the selected component and its background. In this illustrative embodiment, the color of the selected component, the text attribute of any text within the component, and the color of the background set against the component may all be changed individually and independently of one another. For example, the user may change the color of title bar 4892 by selecting "Change color" in upper menu 4905. If the user selects to change the color of title bar 492 or its background, a separate window is displayed, which provides the user with control of such changes. Similar, changes to the other attributes can also be made through the selection of other choices from upper menu 4905.

Figure 50:
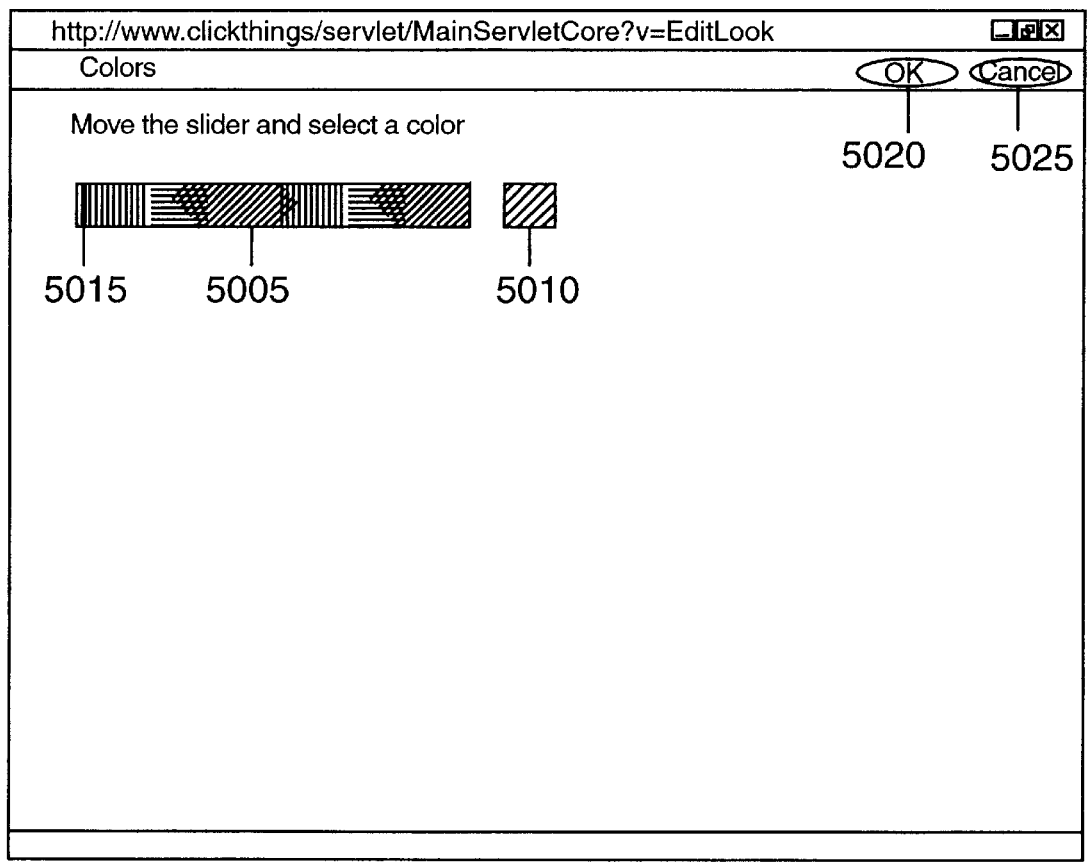

FIG. 50 illustrates a color change window 5000 that is displayed as a separate window on client terminal 125 whenever the user makes a selection in upper menu 4905 to change a color. Similar to the color change tools in design tool area 4815, color change window 5000 comprises a color bar applet 5005 and a color box 5010. In accordance with the invention, color bar applet 5005 makes available to the user only colors that have been predetermined to aesthetically fit into the overall color scheme of the template web site. As will be described in further detail below, server 105 retrieves the color scheme for the template web site, which is indicated by color box 4840, and selects all colors that are complementary to the scheme. These colors are then applied to color bar applet 5005 for the user's selection. The user selects a color by sliding an indicator 5015 along applet

5005, and color box 5010 displays a sample of the selected color. Alternatively, an actual image selected for color change may be displayed in color box 5010 so that an accurate preview of a color change is displayed to the user. The user may apply the selected color to the component or background by clicking an "ok" button 5020, or retain the existing color by clicking a "cancel" button 5025.

Figure 51:
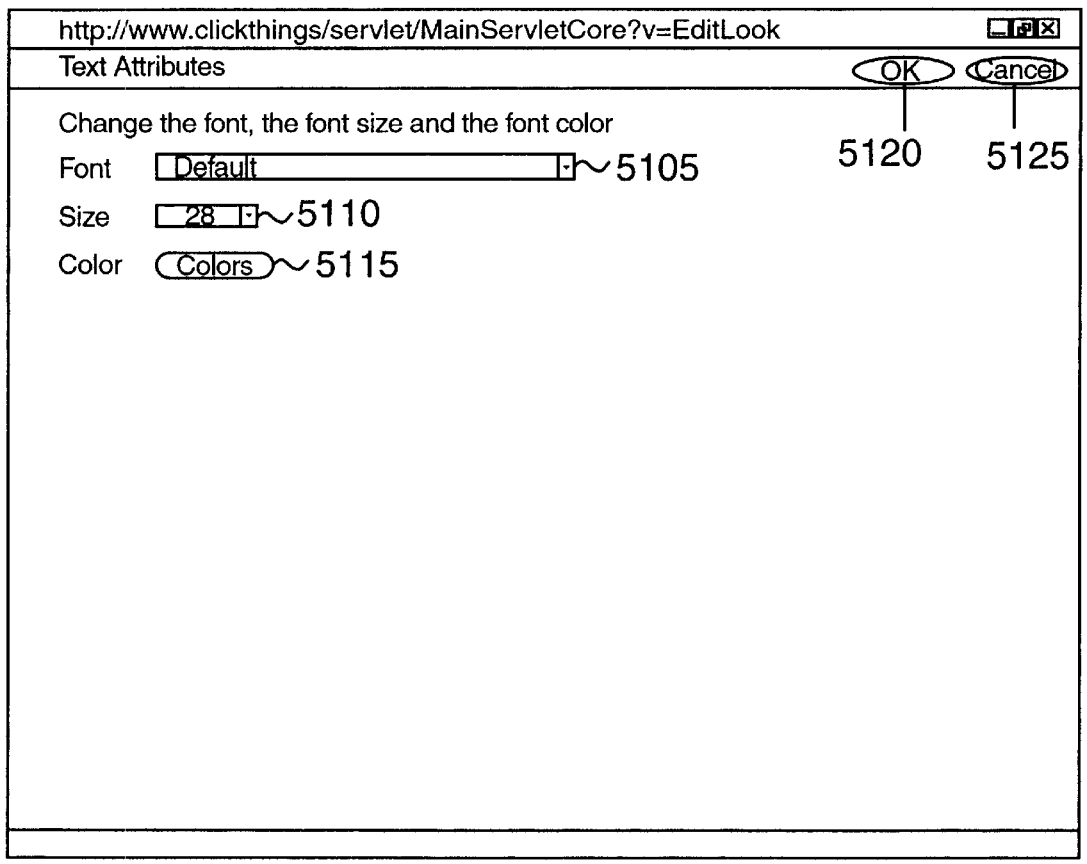

FIG. 51 illustrates a text change window 5100 that is displayed as a separate window on client terminal 125 when "Change Text Attribute" in upper menu 4905 is selected. As shown in FIG. 51, text change window 5100 includes a font selection bar 5105, a size selection bar 5110, and a color selection button 5115. Accordingly, the font and size of a text portion 4894 may be selected using bars 5110 and 5115. The color of text portion 4894 may be changed by clicking button 5115, which would display another window that is similar to color change window 5000 shown in FIG. 50. Again, the selections for the font, size, and color in this illustrative embodiment are limited to those that have been determined by server 105 to be complementary to the overall theme of the template web site. A button 5120 applies the selected changes to the template web site, whereas a button 5125 exits from window 5100 without making any changes.

Referring once again to FIG. 49, lower menu 4910 allows the user to alter the overall "look and feel" of the selected component or its background. Specifically, the user may "scroll" between appearance variations of the selected component (by clicking "Show Next Variation" or "Show Previous Variation") and its background (by clicking "Show Next Background Variation" or "Show Previous Background Variation") from lower menu 4910. As will be described in further detail, server 105 includes a plurality of variations for the appearance of each component that are complementary to the overall theme or "look and feel" of the template web site, as selected and indicated by selection bar 4865.

Figure 52:
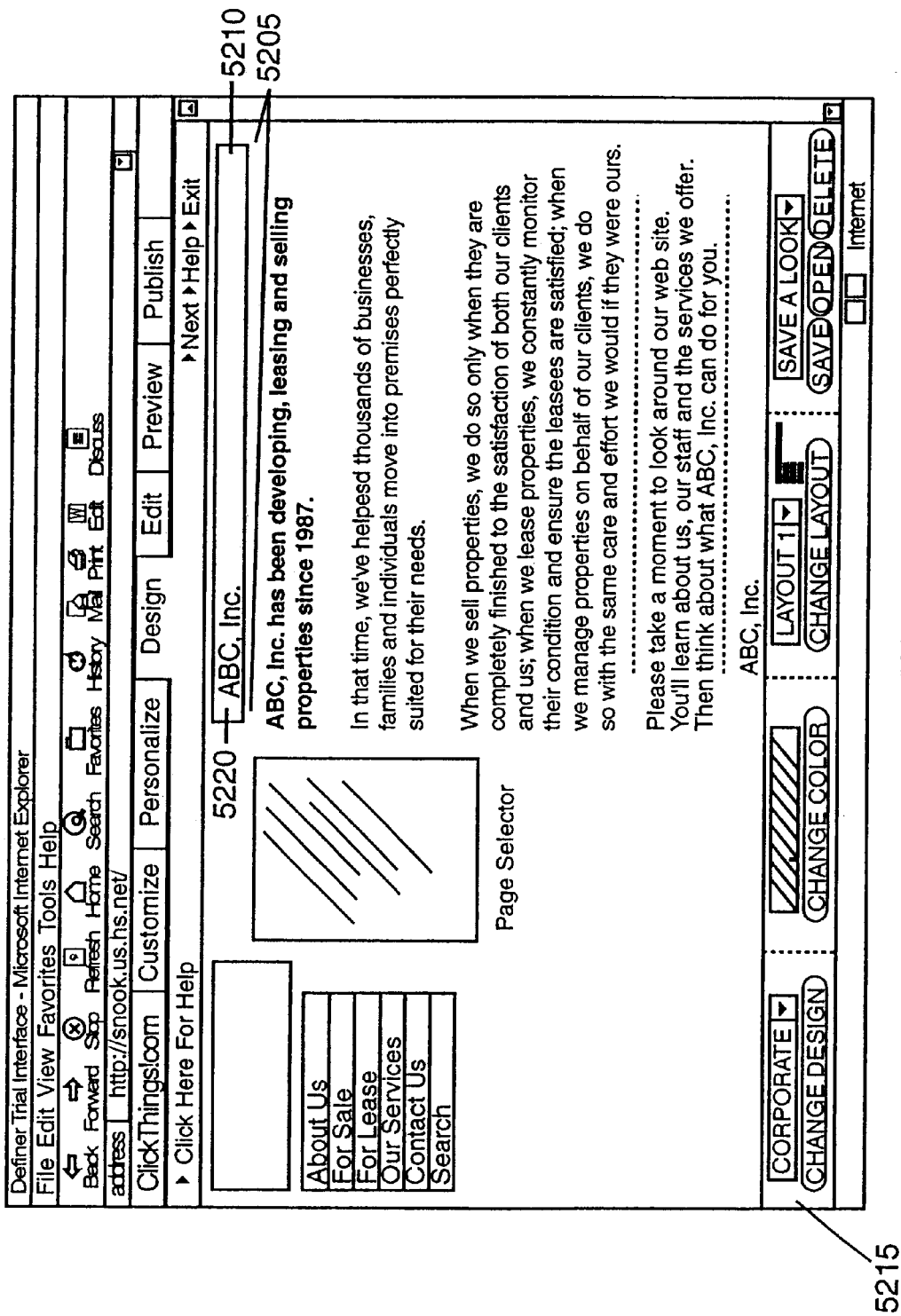

FIG. 52 illustrates an example of the template web site of FIG. 48, having its components changed by the user using popup menu 4900. A title bar 5205 of FIG. 52 corresponds to title bar 4892 in FIG. 48. As shown in FIG. 52, title bar 5205 includes a graphic portion 5210, which differs from that of title bar 4892. Graphic portion 5210 is an example of an appearance variation of title bar 4892, which the user may select by choosing "Show Next Variation" in lower menu 4910 (FIG. 49). It is noted that graphic portion 5210 has been determined by server 105 to fit within the chosen "look and feel" theme as indicated by a selection bar 5215, corresponding to bar 4865 of FIG. 48. Additionally, the user may restore graphic portion 5210 to that of title bar 4892 by simply clicking "Show Previous Variation" in lower menu 4910. FIG. 52 also illustrates a text portion 5220 of title bar 5205 having different attributes than those of title bar 4892. Text portion 5220 is an example of changes made to title bar 4892 using "Change Text Attribute" from upper menu 4905.

As mentioned before, any "look and feel" changes made via the interface presented on Design page 4800 to the template web site displayed in area 4810 are automatically incorporated to the entire structure of template web pages. It is appreciated that such changes may be incorporated according to the hierarchy of the template web site, wherein the changes are incorporated only to a selected web page and the web pages branching therefrom. For example, a user may color each of the main branches of the template web site differently, or have different variations of images in each of those branches. For instance, if a user selects the "Home" page and changes the color, the color of the entire site is changed. But if the user selects a lower level page, such as the "About Us" page, and changes the color, only the color of the "About Us" page and the pages underneath it are changed.

The structure and content design of the template web pages according to the invention will now be described in detail.

Figure 53:
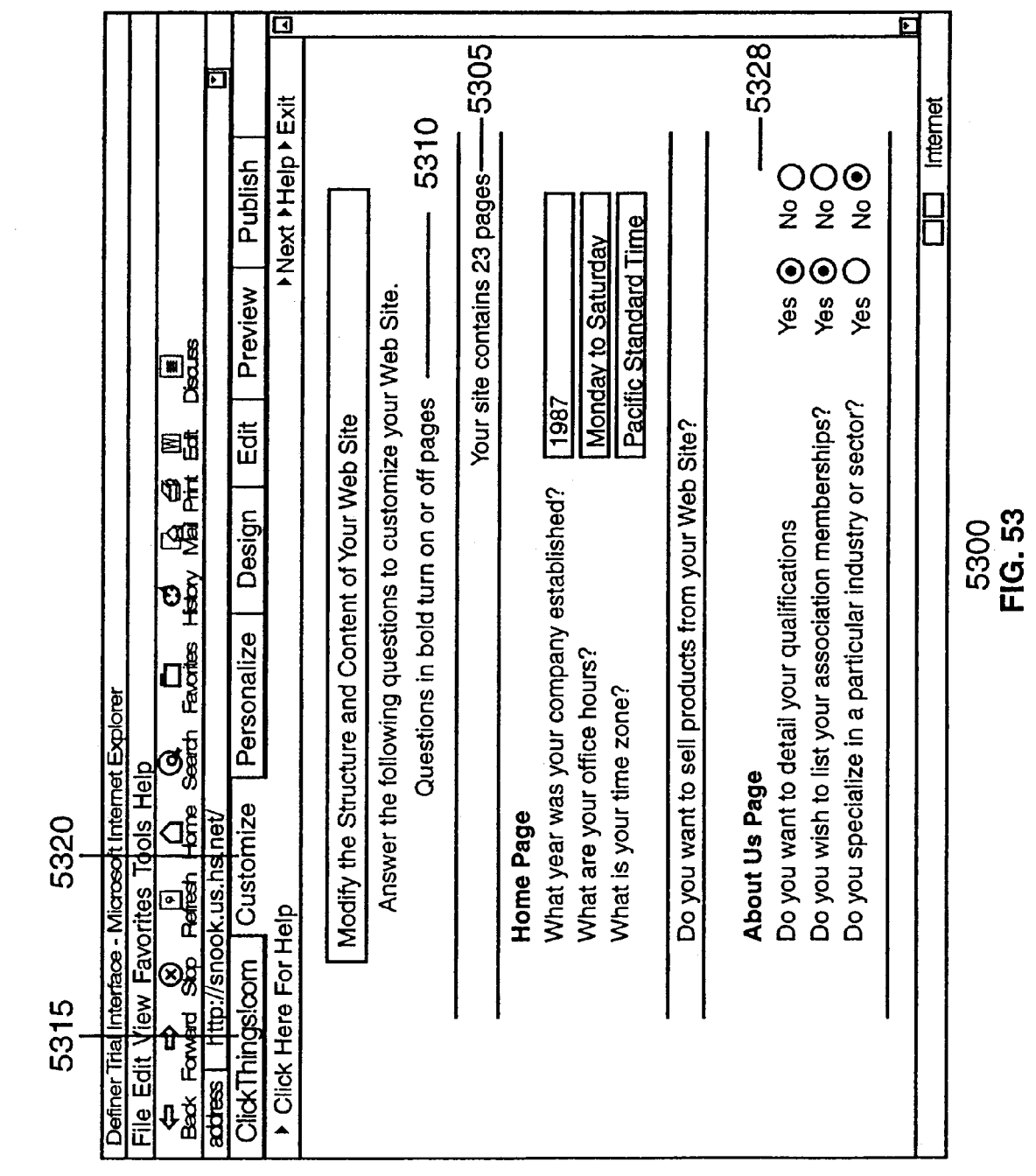

FIG. 53 illustrates a Content page 5300 in accordance with the invention. As shown in FIG. 53, Content page 5300 comprises a web site structure tree 5305, a simplified structural design area 5310, and a control bar 5315. A highlighted button 5320 reflects the user's selection of Content page 5300.

Web site structure tree 5305 displays the structural hierarchy and interrelationship of the template web pages. Each "page symbol" rectangle on tree 5305 represents a template web page within the template web site structure. For example, a top "Home" page 5322 represents the template "home" page on display in area 4810 of Design page 4800. As illustrated by FIG. 53, each branch stemming from home page 5322 ends at a template web page, for example, "For Sale" page 5324, which may further branch into additional template web pages, etc. Some branch template web pages, for example, "for sale" page 5324, include a question mark. This question mark denotes that the template web page may be enabled or disabled by the user, i.e., included or removed from the structure of template web pages. In other words, if the template web site is published to Internet 120, only the enabled template web pages would be included in the publication. It is noted that template "home" page 5322 is the "root" of the template web site, and, thus, does not include a question mark—i.e., it may not be disabled at Content page 5300.

As mentioned before, server 105 automatically designs a structure of template web pages for the template web site pursuant to the information entered by the user in box 4705. Tree 5305 displays the structure thus designed by server 105, with different colors indicating the various enabled and disabled template web pages. For example, an "Employment" page 5326 is displayed in a different color, indicating that it is disabled. In accordance with the invention, the user may manually enable or disable the template web pages bearing a question mark by clicking on any one of them. A popup menu is displayed when the user, say, clicks on "for sale" page 5324 wherein the user is presented with the choices of enabling or disabling selected page 5324.

In addition to manually enabling and disabling the template web pages, simplified design area 5310 includes a list of questions relating to the specific business entered by the user in box 4705. Each of the questions in design area 5310 also pertains to the enabling and disabling of a template web page. Each question that is in bold type directly corresponds to the enabling and disabling of a particular template web page that bears a question mark in tree 5305. The user may answer "yes" or "no" to these questions and the corresponding template web pages would be accordingly automatically enabled or disabled. For example, a question 5328 in design area 5310 corresponds to a "for sale" page 5324 in tree 5305. Hence, if the user answers "no" to question 5328, page 5324 is automatically disabled. Some questions in bold type are grouped with additional questions in normal type, to which the user may answer "yes" or "no." According to the user's answers to these questions, certain basic content in the corresponding template web page is enabled or disabled.

Figure 54:
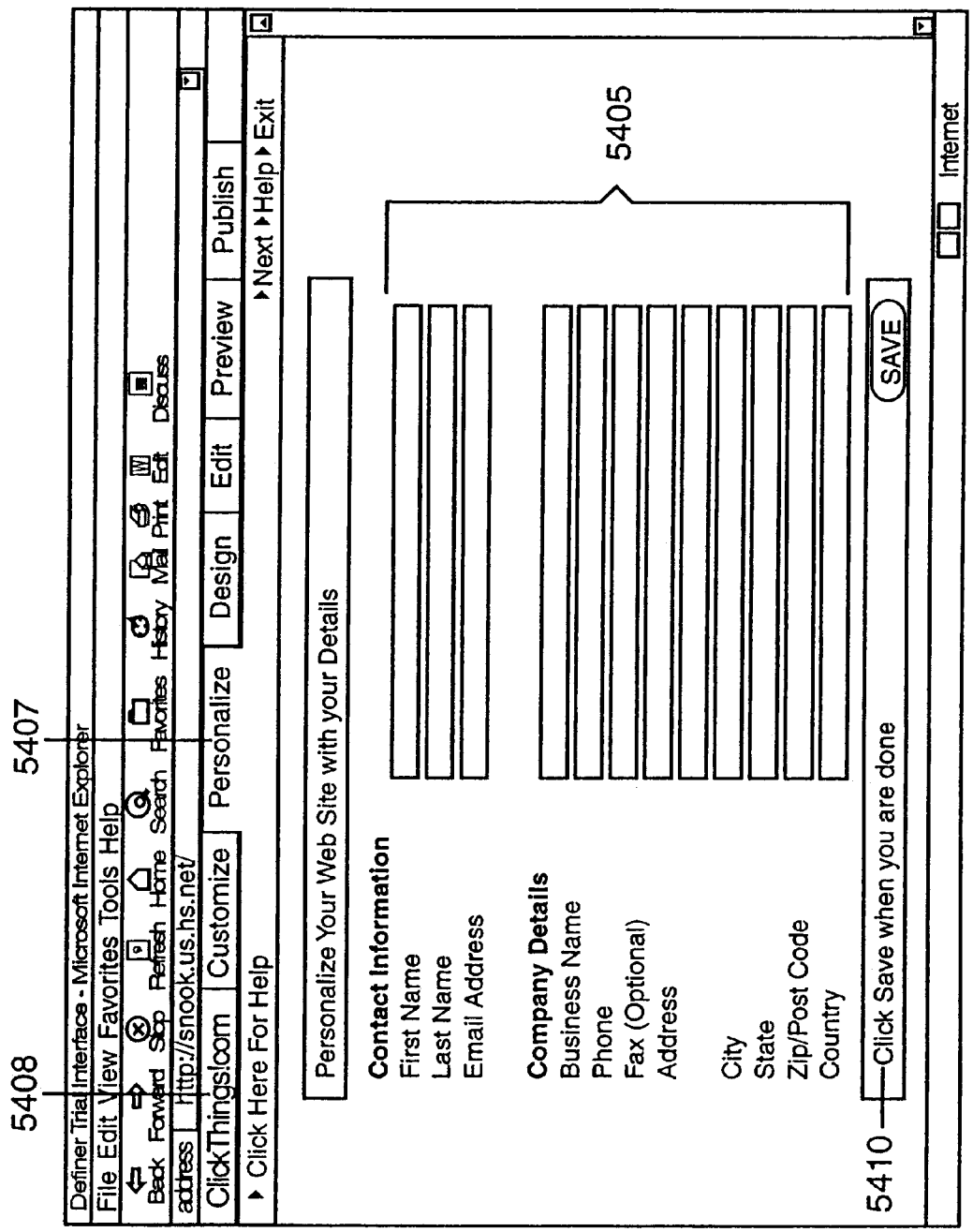

FIG. 54 illustrates a Details page 5400, wherein detailed contact information for the user and the user's business can be entered into a plurality of text entry spaces 5405. As illustrated by FIG. 54, a button 5407 of a Web Definer control bar 5408 is highlighted reflecting the fact that the user has selected Details page 5400. A template web site tree 5409 displays the structural hierarchy of the enabled template web pages, i.e., the structure of web pages that would be published if the user were to publish the template web site. By selecting a button 5410 the information entered into spaces 5405 is updated at server 105 and incorporated to the template web site automatically. In essence, the information entered at feature page 5400 may be viewed as a collection of global variables applicable to the entire template web site. As such, any changes to this information would affect all template web pages that include such information. It is appreciated that an additional feature that allows a user to create new global variables, such as unit price of a product, may be included in feature page 5400. Advantageously, this feature allows a user to define a piece of information that is displayed in multiple places within the template web site as a global variable, and any changes to this information can be done conveniently at feature page 5400 without having to edit every instance this information is displayed in the template web site.

Figure 55A:
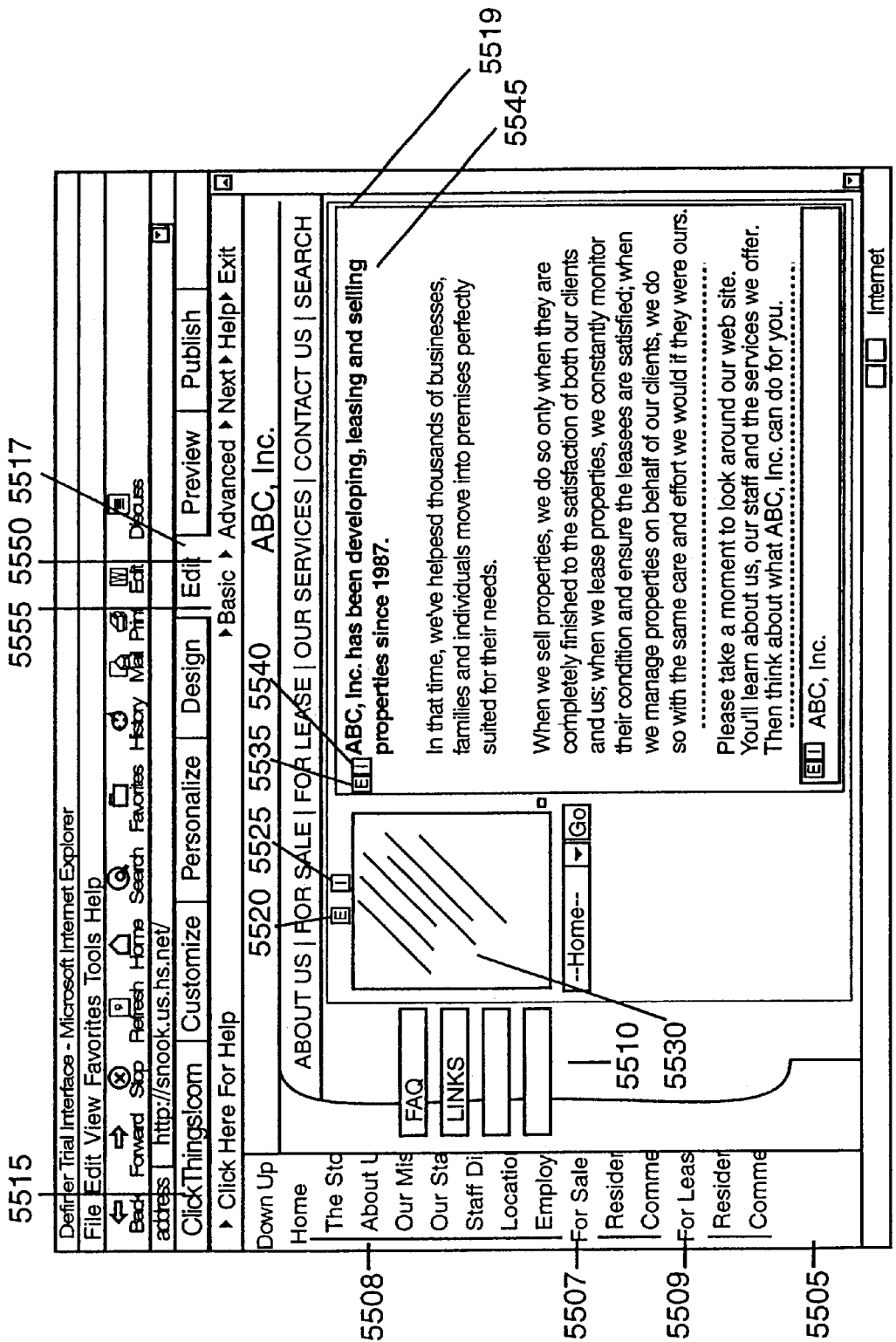

FIG. 55A illustrates an Advanced Edit page 5500, wherein the user is able to edit each component of each template web page. As shown in FIG. 55A, edit feature page 5500 comprises a template web site structure tree 5505, a template web site design area 5510, and a Web Definer control bar 5515. A button 5517 in Web Definer control bar 5515 is highlighted reflecting that the user has chosen edit feature page 5500.

As with tree 5409 in FIG. 54, a structure tree 5505 displays the structural hierarchy of the template web pages that have been enabled for the template web site. The user may edit any template web page within the structure by simply clicking on a page, say, a "For Sale" page 5507, in structure tree 5505. A popup menu is displayed when such a selection is made. It is noted that web pages that have been selected (to be included in the published web site) are indicated with a check mark, whereas web pages that have not been selected are indicated with a cross mark.

Figure 56:
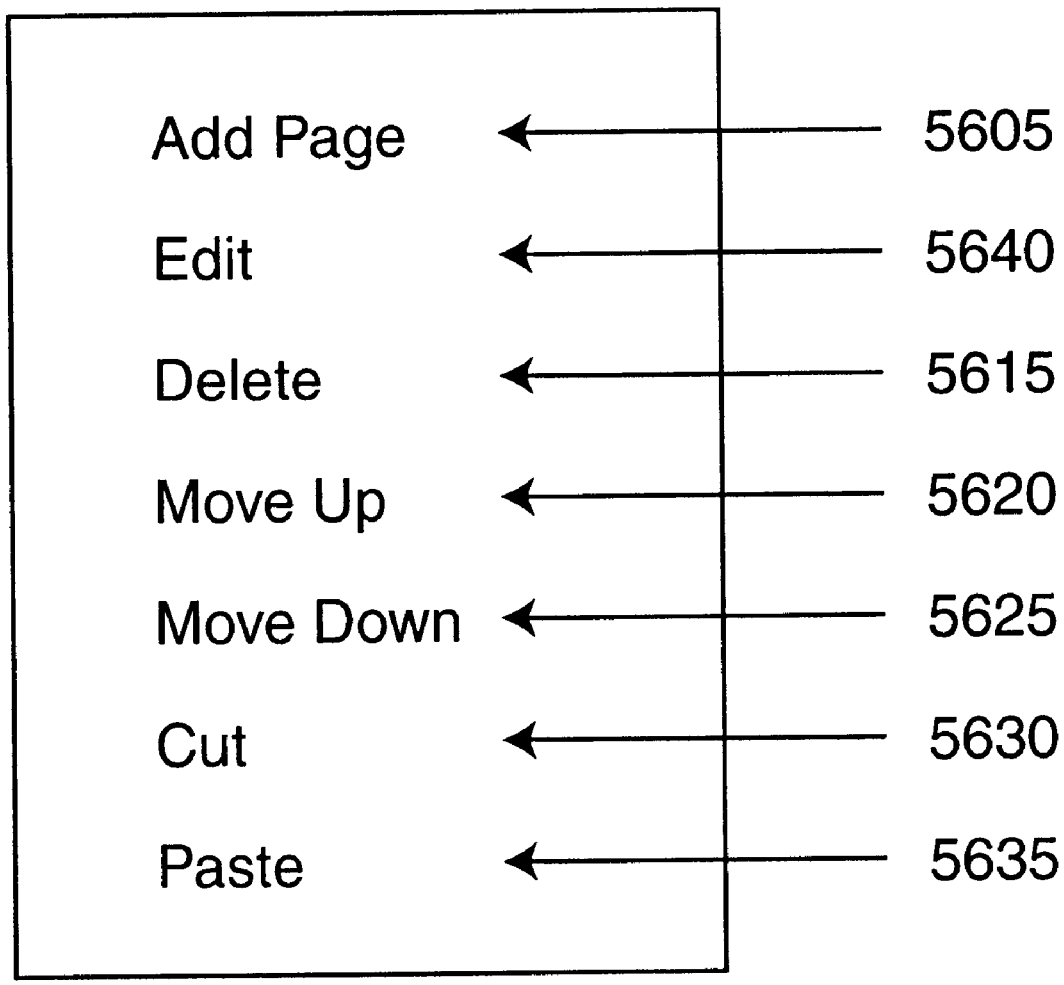

FIG. 56 illustrates a structure edit popup menu 5600 that is displayed on Advanced Edit page 1100 when the user clicks on a template web page, e.g., "For Sale" page 5507, in structure tree 5505. As shown by FIG. 56, the user may add a template web page that branches from template page 5507 by clicking an "Add page" menu item 5605. The user may also delete template page 5507 by selecting "Delete" 5615. "Move Up" 5620 and "Move Down" 5625 allow the user to move template page 5507 "up and down" the order as displayed in tree 5505, respectively. In other words, template page may be "moved up" before template page 5508, or "moved down" after template page 5509. "Cut" 5630 and "Paste" 5635 apply the well-known concept of "cut and paste" to editing the template pages on structure tree 5505. As such, a detailed description is not necessary. Finally, in the illustrative embodiment, the user may click "edit" 5640 if the user wishes to edit selected template page 5507.

Returning now to FIG. 55A, a template web page to be edited is displayed in design area 5510. For illustration purposes, the template "home" page is on display in a design area 5510 for editing. The page displayed in area 5510 contains edit ('E' button) and insert ('I' button) buttons for each "cell" in table 5519. For example, edit button 5520 allows the user to edit the cell in a table 5519 that contains image 5530, and insert button 5525 allows the user to insert additional components to the cell. Likewise, edit button 5535 and insert button 5540 allow the user to edit and insert additional components to the cell containing text component 5545, respectively. Components that may be inserted through insert buttons 5525 and 5540 include images, tables, online stores, structured data, page selectors, e-mail forms, custom HTMLs, and distinct web site components such as search buttons, fortune cookie programs, Frequently Asked Questions ("FAQs") or marquee scrolling bars, etc.

Edit buttons 5520 and 5535 allow the user to edit the cells that contain components 5530 and 5545, respectively. FIGS. 57 and 58 illustrate the "Edit Table" feature pages 5700 and 5800 for editing individual cells and an entire table such as a component 5519, respectively. As shown in FIG. 57, a selected (or "highlighted") cell may be edited to change its dimensional ratio, background color, vertical and horizontal alignments; its contents may be cleared; or, cells may be inserted adjacent to it. The user may click on a button 5705 to edit the entire table containing the selected cell, at which point client terminal 125 is directed to a feature page 5800. As shown by FIG. 58, various characteristics, such as the dimension, alignment, and background color, etc., of the selected table, e.g., component 5519, may be edited by the user.

With respect to the content components contained in the cells of table 5519, the user may edit such content by simply clicking on them while at Advanced Edit page 5500. When the user clicks on text component 5545, a popup menu 5640, as illustrated by FIG. 56B, appears. A standard word processor program is loaded and displayed in a separate window to allow the user to edit the actual text content of component 5545. On the other hand, when the user clicks on an image component, such as component 5530, client terminal 125 is directed to an image edit feature page where the user is presented with a collection of design tools for editing the selected image, e.g., component 5530.

Figure 59:
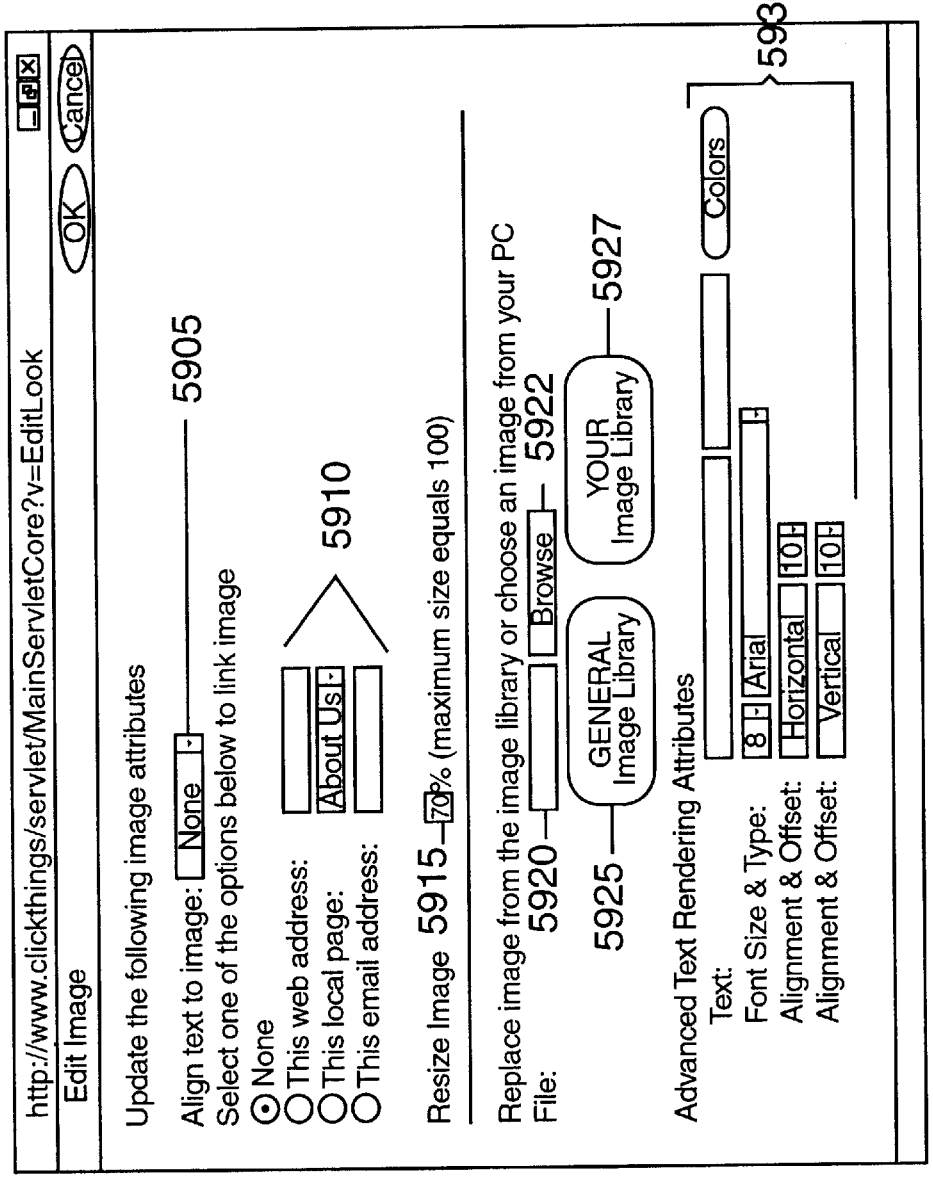

FIG. 59 illustrates an image edit page 5900 that is displayed when an image component such as component 5530 is selected by the user while in Advanced Edit page 5500. As shown in FIG. 59, text components subsequent to image component 5530 may be left or right aligned to component 5530 using a selection bar 5905. A selection menu 5910 provides the user with a choice of all enabled template web pages to which the user may link component 5530. For example, if the user selects template "for sale" page 5507 in menu 5810, component 5530 is "linked" to template page 5507. This "link" means that if template web site were to be published to Internet 120, any visitor to the site would be directed to page 5507 if the visitor were to click on component 5530.

Figure 60:
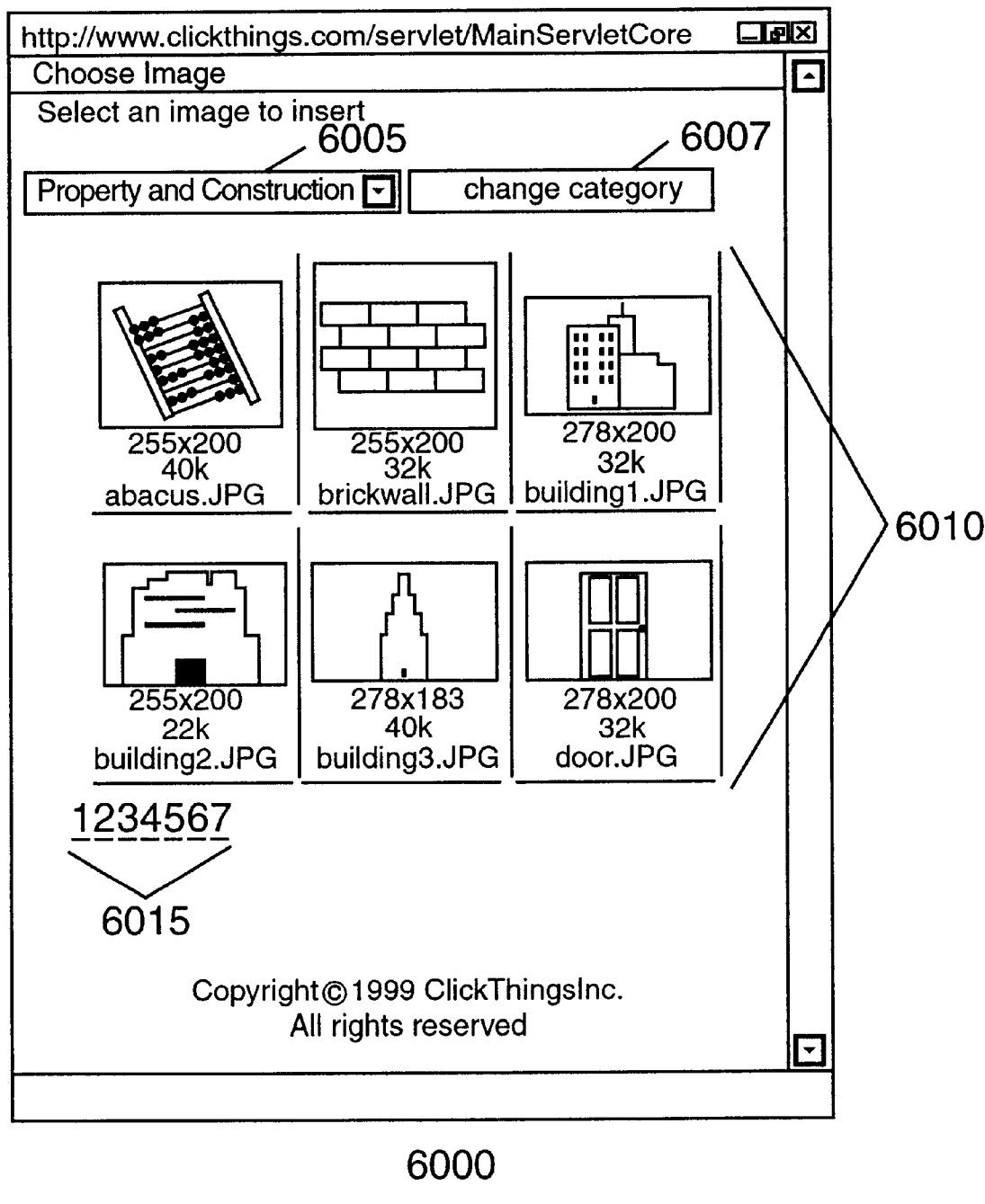

Image component 5530 may be rescaled using an entry space 5915. In addition, the user may replace component 5530 with a new image file. An entry space 5920 and a button 5922 allow the user to specify an image file or browse client terminal 125 for an image file to replace component 5530. Buttons 5925 and 5927 direct client terminal 125 to image libraries stored at server 105, from which the user may retrieve and incorporate a stock image to component 5530. FIG. 60 illustrates a General Image Library page 6000 that provides access to a General Image Library stored at server 105 after the user clicks on a button 5925. As shown in FIG. 60, the user may select a specific "category" or industry using a selection bar 6005 and a button 6007. For example, the user may select "property and construction," whereupon a collection of stock images under "property and construction" is displayed in an area 6010. Illustratively, the collection of images is displayed six images at one time, and the user may browse through pages of the image collection by clicking one of buttons 6015. To incorporate an image from the collection to component 5530, the user simply clicks on the image in area 6010.

Returning now to FIG. 59, the user may also render text within image component 5530. In other words, text may be superimposed onto the image of component 5530 where the attributes of the superimposed text—such as font, font size, color, and alignment and offset within the image—is designed using tools 5930.

Figure 55B:
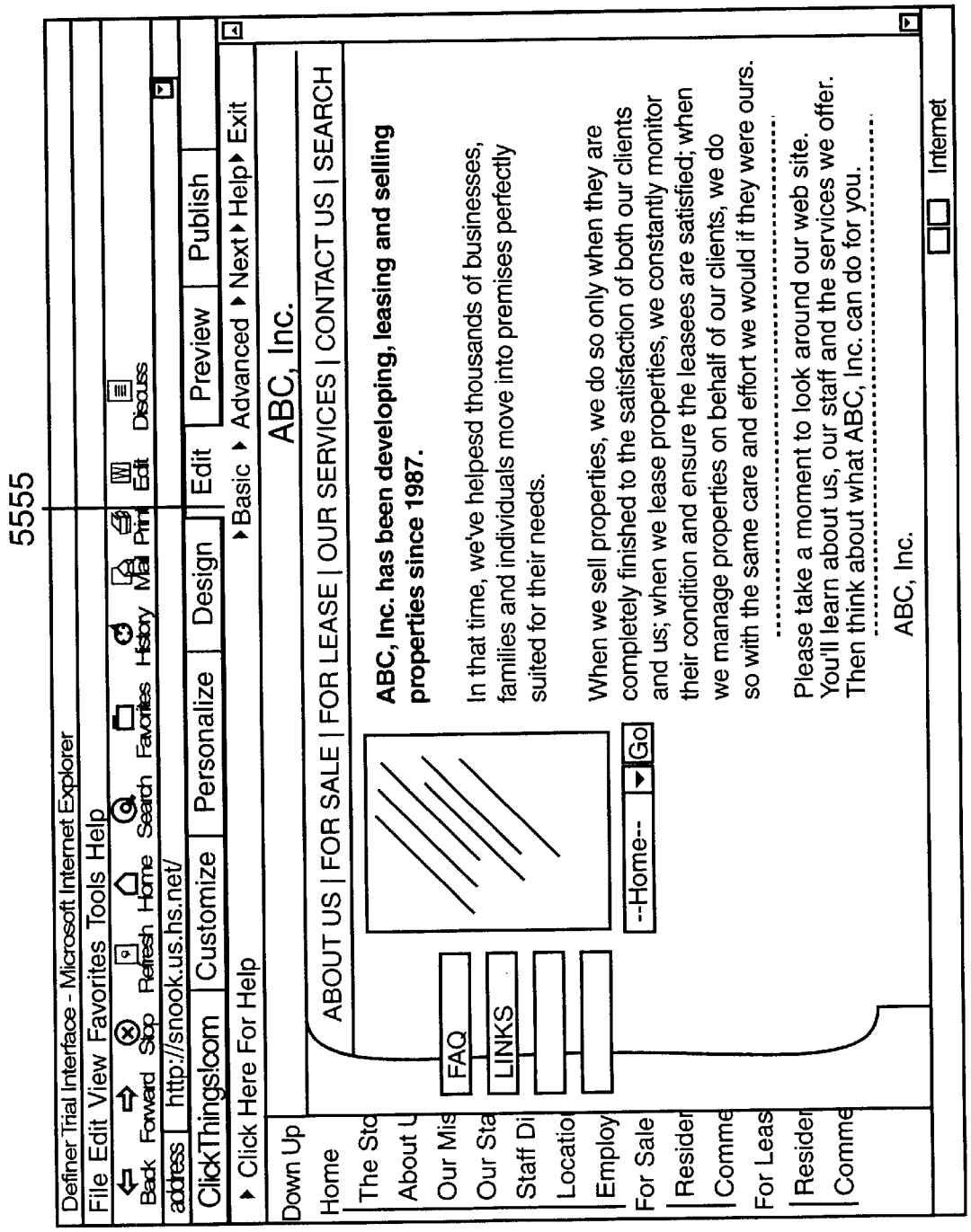

It is noted that "Advanced" button 5550 in FIG. 55A is selected reflecting the advanced edit features, namely, a plurality of table cell edit buttons 5520, 5525, 5535, and 5540 being provided to the user. A "Basic" editing page is shown in FIG. 55B where "Basic" button 5555 is selected. As illustrated by FIG. 55B, the "Basic" editing page does not provide any table cell edit buttons. Instead, the user is allowed to accept the dimensional layout and simply edit the content of the components of the template web page. In addition, in the basic mode, there are no pop-ups, but components are edited directly when clicked. In the advanced mode, instead of automatically editing a selected component, four main options, edit, cut, copy, and paste are presented.

As noted above, every feature web page for providing web site design interface according to the invention includes the overall Web Definer control bar. Illustratively, this Web Definer control bar is correspondingly incorporated in feature pages 4800, 5300, 5400, and 5500 as control bars 4805, 5315, 5408 and 5515, respectively. Advantageously, the user may access any feature web page from any other feature web page simply by clicking a button on the Web Definer control bar.

Figure 61:
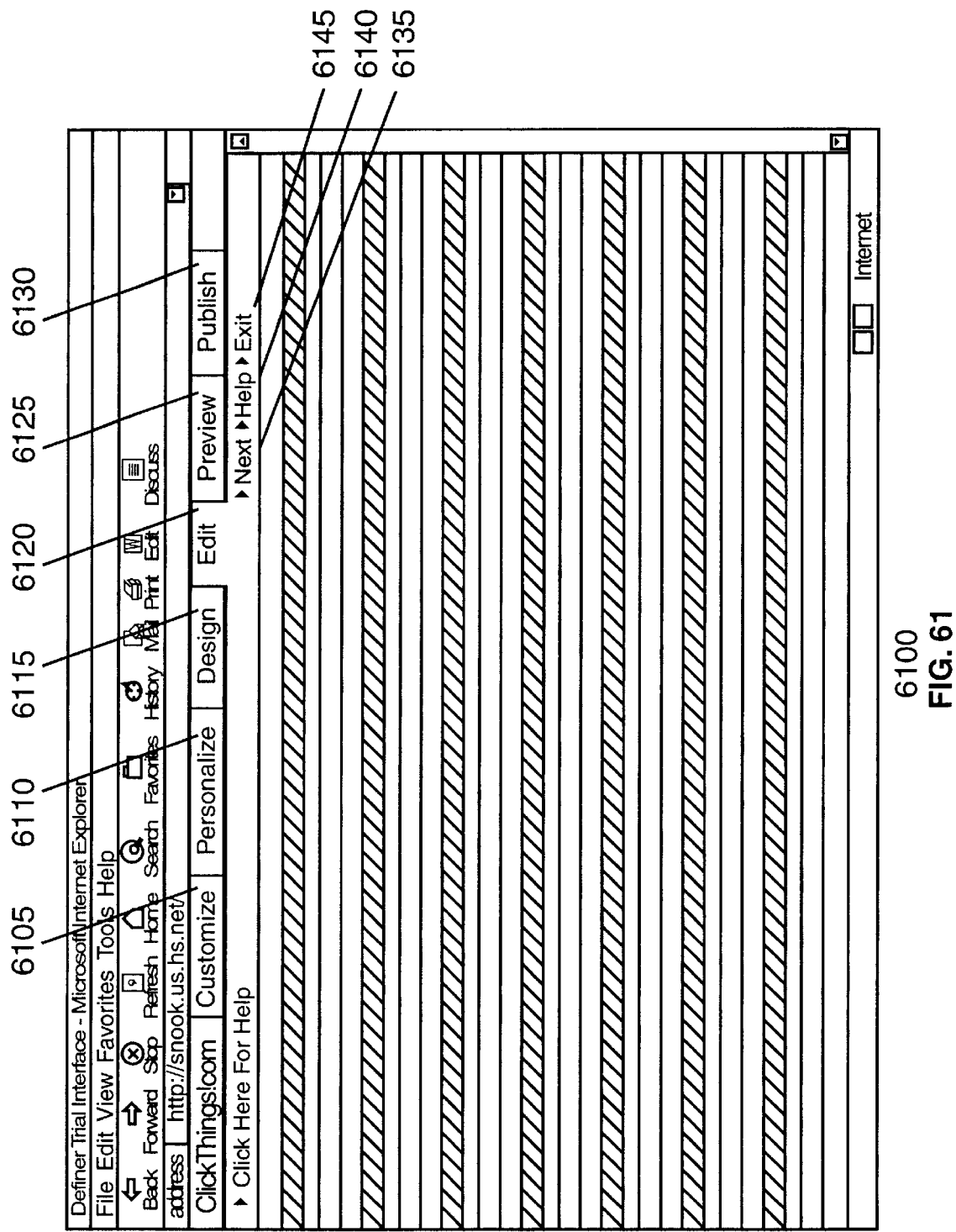

FIG. 61 illustrates a Web Definer control bar 6100 as correspondingly incorporated as bars 4805, 5315, 5408, and 5515. Feature web pages that correspond to one of a plurality of buttons 6105, 6110, 6115, and 6120, namely, feature pages 4800, 5300, 5400, and 5500, have been described in detail. Miscellaneous functions corresponding to a plurality of buttons 6125, 6130, 6135, 6140, and 6145 will now be described.

Figure 62:
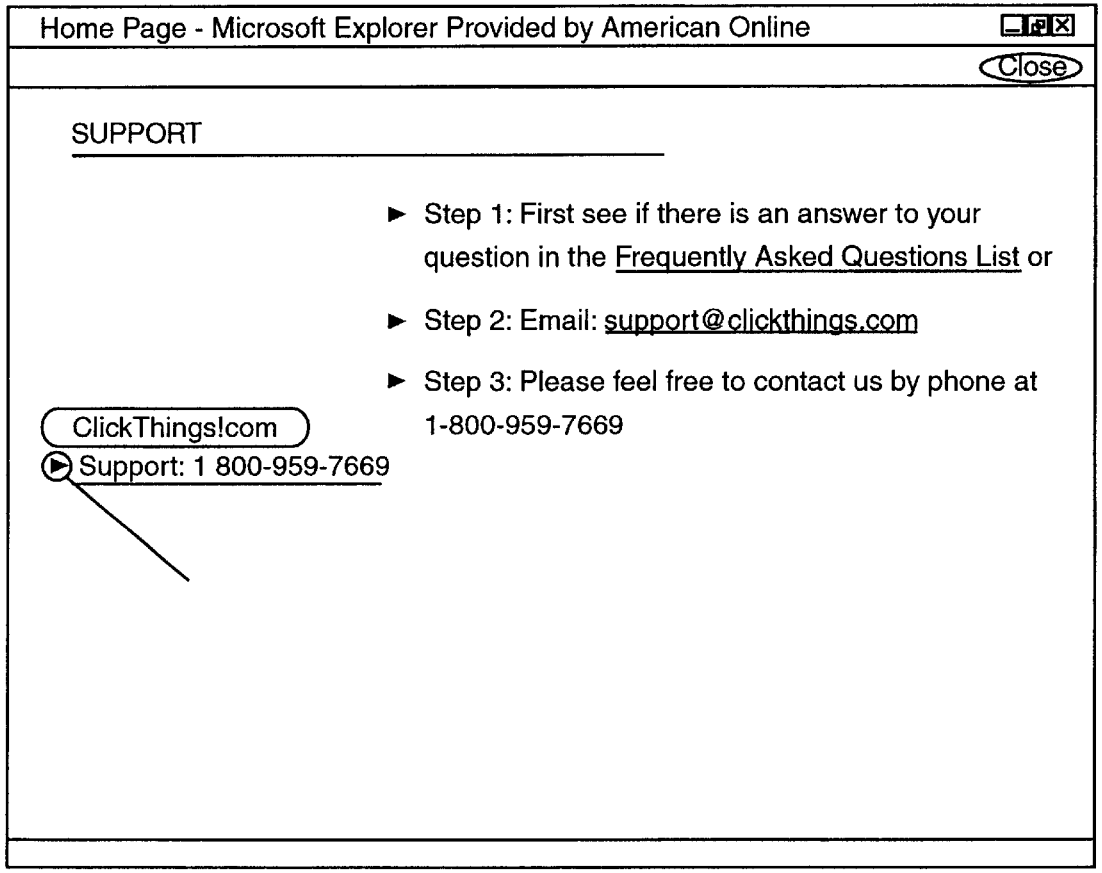

If the user clicks on button 6135 from any feature web page, e.g. pages 4800, 5300, and 5500, client terminal 125 is directed to a subsequent feature page as if each feature page represents a step in a step-by-step process for creating a web site. For example, client terminal 125 is directed to page 5500 from page 4800 after an end-user finishes editing the template web site and selects button 6135 at page 4800. Illustratively, Web Definer moves from left to right along buttons 6105, 6110, 6115, etc. In other words, client terminal 125 is initially directed to feature page 5300 corresponding to button 6105, and then to the features pages corresponding to buttons 6110, 6115, etc., respectively, with each click on button 6135. Help button 6140, if clicked, directs client terminal 125 to a help page 6200 where online help in using Web Definer is provided. FIG. 62 depicts a sample help page 6200. Exit button 6145 allows an end-user to exit Web Definer.

Figure 63:
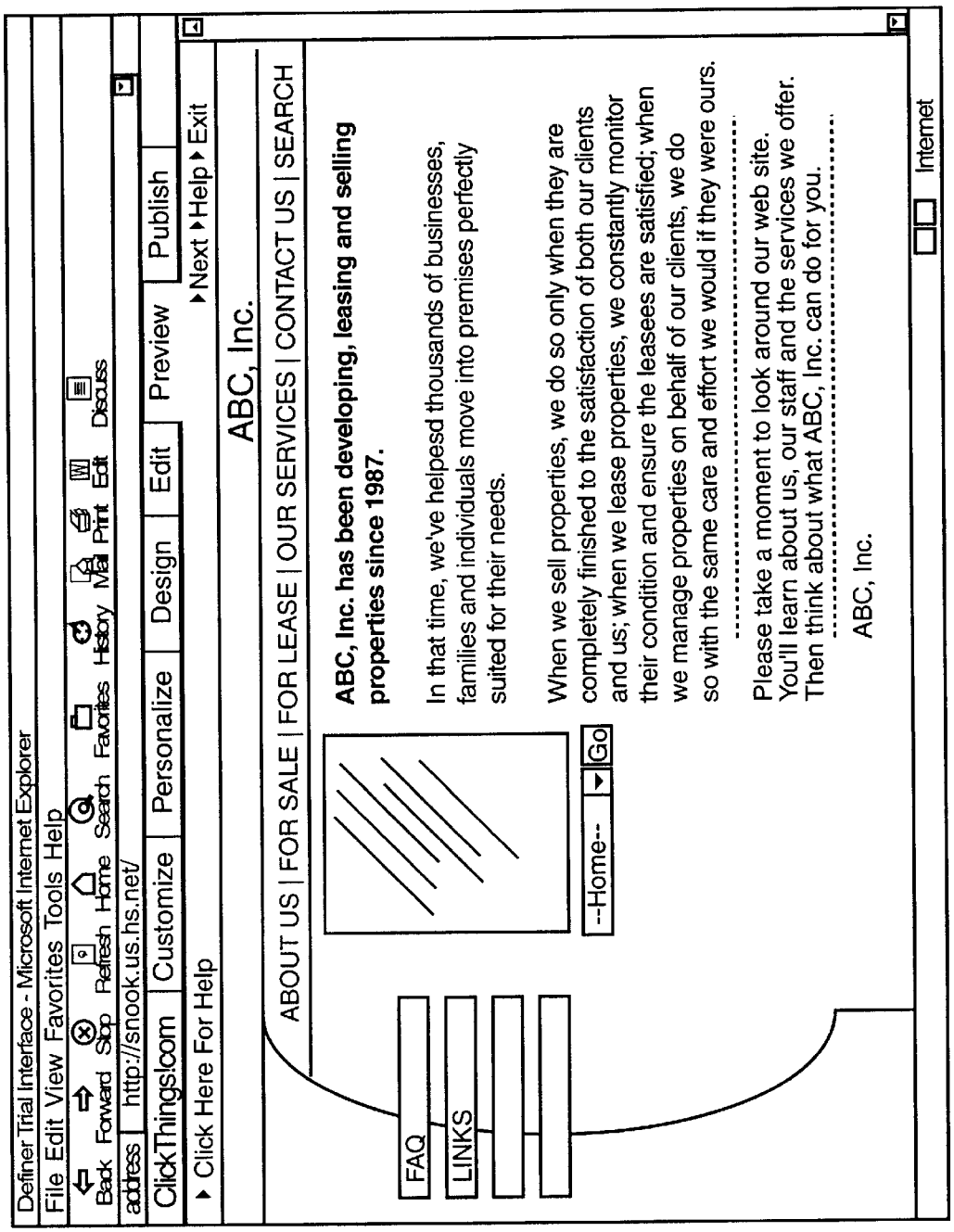

After all the desired edits and modifications have been made, the user may choose to preview the template web site without the design interfaces according to the invention. By clicking "Preview" button 6125 in Web Definer control bar 6100, the template web site is displayed at client terminal 125 as it would appear if published to Internet 120. FIG. 63 illustrates a template web site preview displayed by clicking button 6125. It is noted that all design interfaces, including Web Definer control bar 6100 is removed from the screen for this preview display.

Figure 64B:
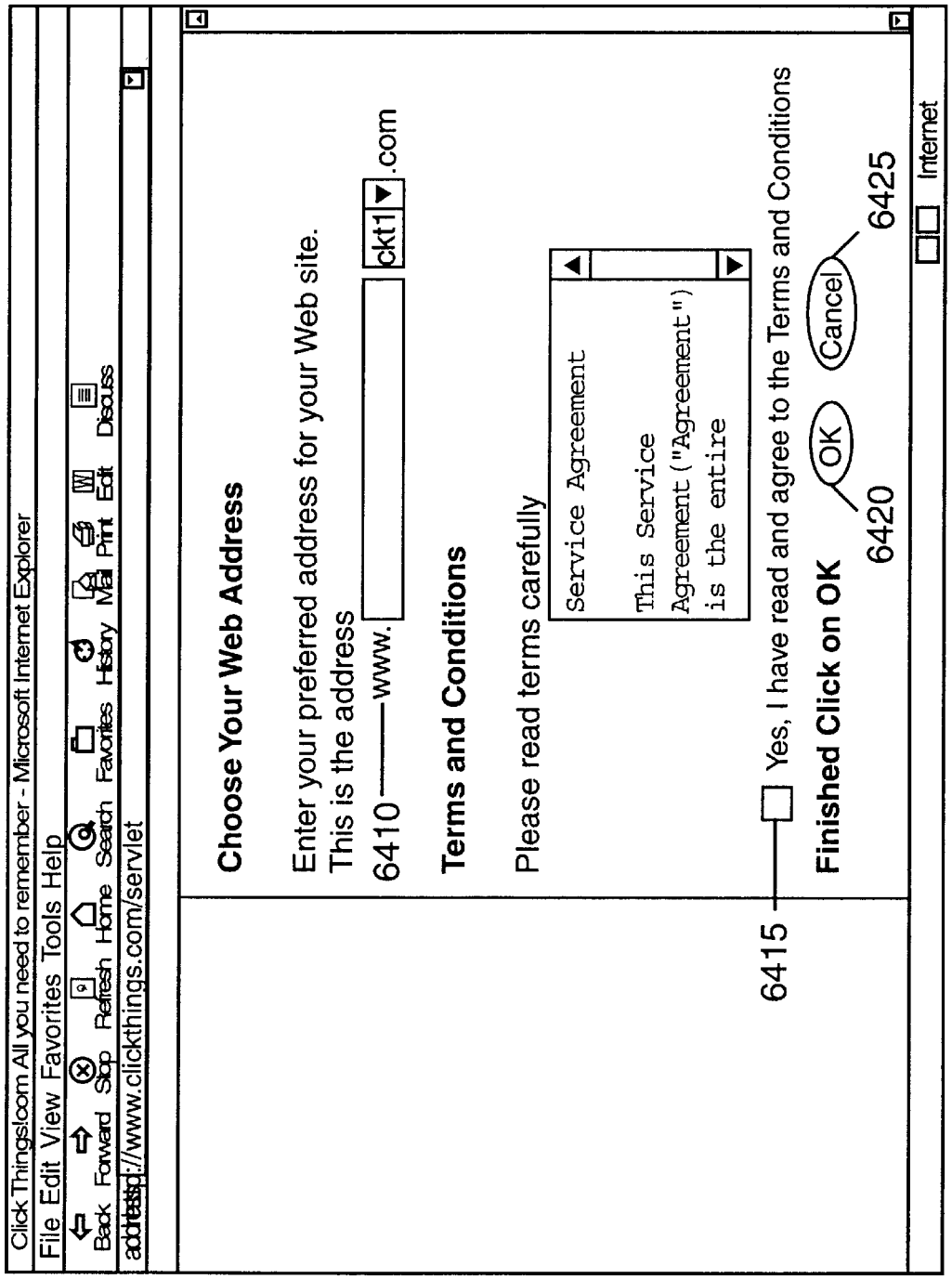

After previewing the template web site and ensuring that it is satisfactory, the user may click the "Publish" button 6130 on Web Definer control bar 6100. FIGS. 64A and 64B illustrate a registration page 6400 where information on the user and the user's business is entered and registered with server 105. The user may also specify a preferred domain name in a space 6410 for publishing the template web site. As shown in FIG. 64B, the user must review the terms and conditions for publishing the template web site and so indicate in a box 6415 before the template web site can be published by clicking a button 6420. A "Clear Form" button 6425 clears all of the entry spaces in FIG. 64A so that the user may re-enter the information.

Figure 65:
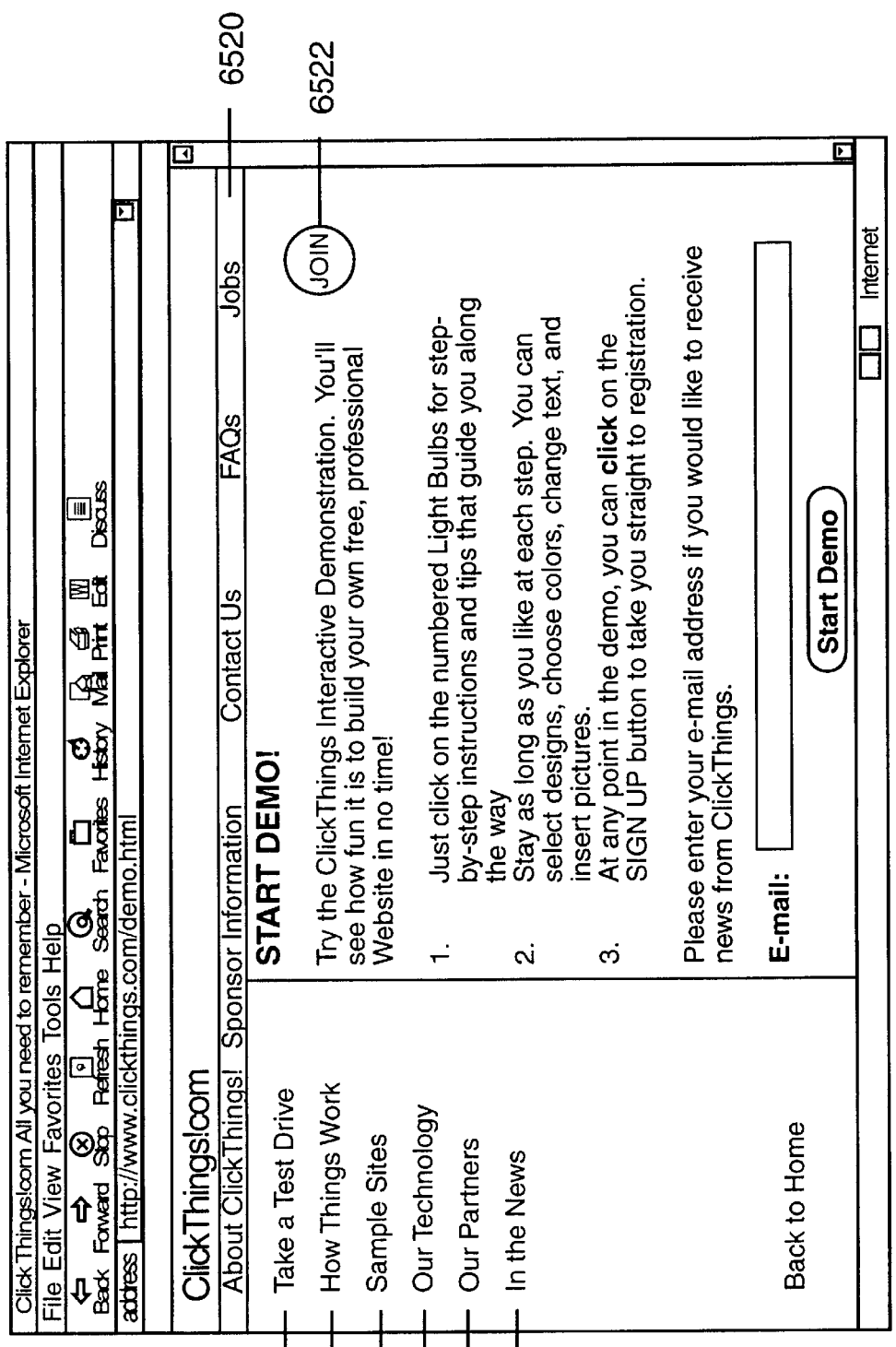
FIG. 65 shows a start demonstration web page for demonstrating the features of the Web Definer module according to an embodiment of the invention.

Referring back to FIG. 46, link 4605 directs client terminal 125 to a "Start Demo!" page where the above-described features of the Web Definer is demonstrated on client terminal 125. FIG. 65 illustrates a "Start Demo!" page 6500 that is displayed on client terminal 125 after link 4605 has been selected. As shown in FIG. 65, "Start Demo!" page comprises links 6505 through 6520 that correspond to links 4605 through 4620 of initial page 4600. In addition, page 6500 also comprises "Join" button 6522 that corresponds to button 4622 of initial page 4600.

Definer Web Site Integration to a Third Party Portal

The Definer platform may be used to construct portal sites. In addition, web sites created using Definer may add real-time instant portal services, immediately turning those sites into Portals. Instant Portal services may include: Web-based e-mail; Group and personal calendars; Message boards; Chat rooms; and Special-interest clubs.

Software Architecture

Figure 66:
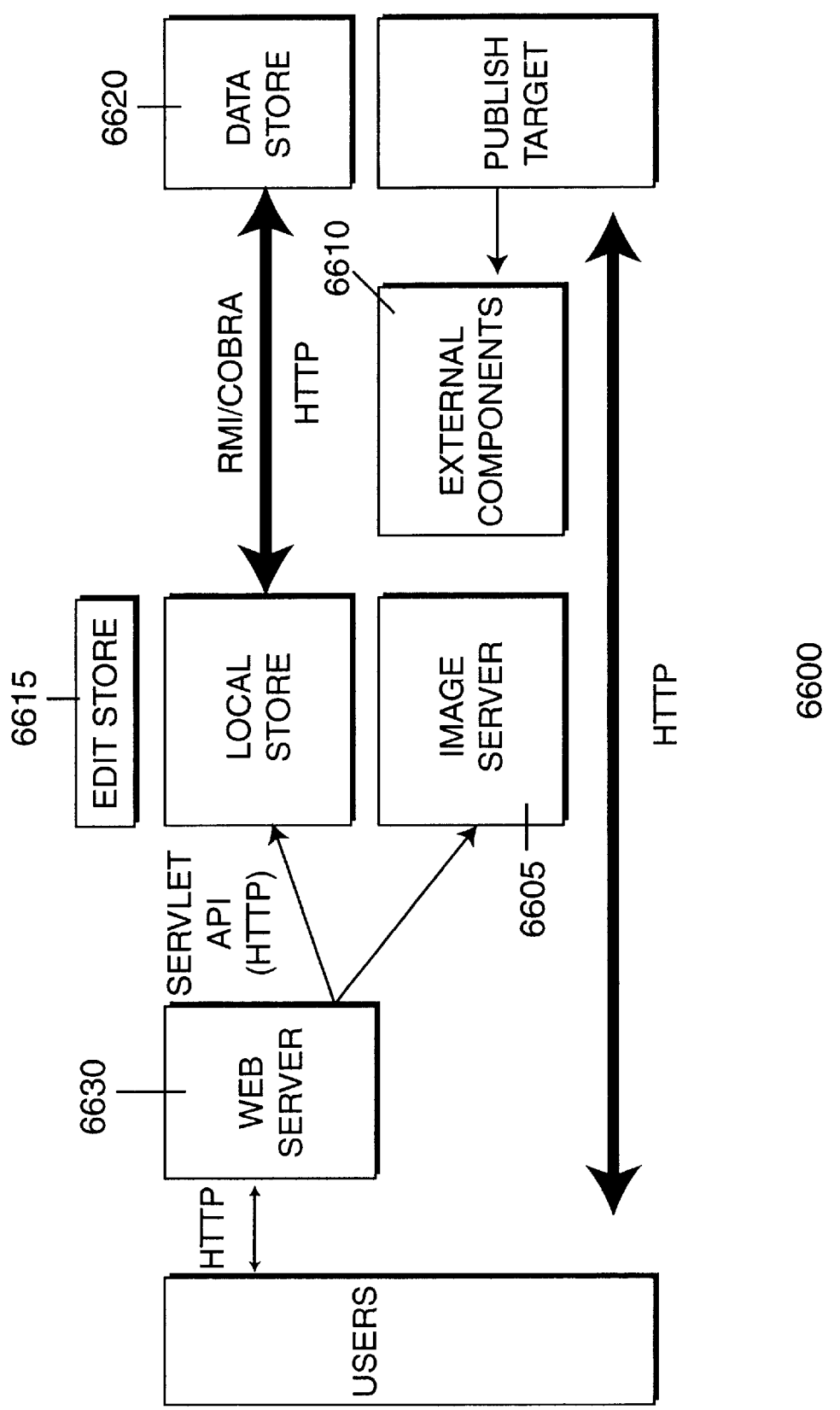

With reference to FIG. 66, the architecture of a software system 6600 for implementing the Definer service in accordance with the invention will now be described. System 6600 is preferably constructed using object-oriented programming with the primary architecture being split into three: the Definer (as described above), an image server 6605, and external components 6610. The Definer is provided using an edit store 6615 (or "local store") and a data store 6620. External components 6610 are web site components that are developed outside of the Definer environment using an SDK. The SDK for creating external components to be used with the Definer, in accordance with the invention, will be described in further detail below.

As shown in FIG. 66, Edit store 6615, Image server 6605, and external components 6610 are designed to be able to exist on many machines, thus making the system scalable. Accordingly, communications between these entities may be accomplished using standard Internet-type protocols, such as HyperText Transfer Protocol (HTTP).

The Definer portion of system 6600 comprises principally edit store 6615 (including a local store 6625), data store 6620, and a database (not shown), which may be a traditional relational database (e.g., Oracle database). Edit store 6615 accommodates all of the Definer user interface functionality (i.e., all of the editing logic, the publishing process, etc). Thus, a majority of the application is within Edit store 6615. Data store 6620 is a repository for content information, and the relational database is used to store information on users, sponsors, accounting information, etc.

In accordance with the invention, a plurality of additional edit stores (not shown) may be connected to data store 6620. These separate edit stores may run on separate machines, e.g., general-purpose computers, that are in different physical (geographical) locations. Accordingly, Remote Method Invocation (RMI) protocols may be used for the remote communications between edit store 6615 and data store 6620. For increased compatibility and flexibility, the Common Object Request Broker Architecture (CORBA) may be used. Thus, system 6600 is scalable in that edit stores can be conveniently added to handle larger numbers of concurrent editing sessions on Definer. Furthermore, multiple web servers may be deployed at various localities for each edit store, which may serve a particular geographical region or community, connected to a central data store. Edit store 6615 also employs aggressive caching implemented near its service customers, for example, at web server 6630, for improved performance. Data store 6620 synchronizes the content information between the different edit stores. For example, if a user changes geographic location between editing sessions where such sessions are handled by different edit stores, data store 6620 provides a distributed environment that can pass information around from one point to the other. This arrangement allows for a faster and more responsive Definer interface. Thus, data store basically acts as a central repository for information and is a centralization point for all of the data, including content for generating web sites and templates using Definer.

Referring back to the illustrative embodiment of FIG. 66, web server 6630 also interfaces with image server 6605 that processes all images used for Definer presentation or features. As described extensively above, Definer provides numerous image manipulation features, such as recoloring, rendering text, filtering, etc. for site template and web site generation (e.g., Site Definer and Web Definer). Image server 6605 returns images to the generated sites or templates. In Definer, images are created in real time, and so the text on each of the images is actually rendered on demand. Image server 6605 provides for such rendering. Image server 6605 can also re-color images, change a blue color to red, and put drop shadows and various other effects onto an image. Its primary function is to place text on images to generate navigation images. Therefore, image server 6605 dedicated for processing these manipulations improves the efficiency of system 6600. Furthermore, real-time processing of the image manipulations using image server 6605 allows for more spontaneous WYSIWYG editing while dispensing with the need for storing variations (manipulated versions) of an image.

System 6600 also includes a library of external components 6610, which are web site components developed outside of the Definer environment using an SDK (not shown). External components 6610 may be developed by and exchanged among users. As discussed above, Definer provides for easy incorporation of these components to a generated web site or template. The SDK and exchange mechanism for external components 6610 in accordance with the invention will be described in further detail below.

As shown in FIG. 66, all of the Definer software components reside behind web server 6630. Web server 6630, residing in server 105 shown in FIG. 1, sets a user connection through Internet 120 and interprets command requests therefrom. Accordingly, server 105 routes an image server request to image server 6605 and a request to Definer to edit store 6615.

FIGS. 67A and 67B illustrate the software architecture and the data structure of edit store 6615.

As shown in FIG. 67A, edit store 6615 comprises a Web Server Interface ("WSI") 6705 on the front-end for communicating with web server 6630. Web server 6630 is connected to a Servlet Application Program Interface (API) (not shown), which is connected to a runtime server (not shown), which, in turn, is connected to WSI 6705. The servlet API is an API for interfacing web servers, for example, web server 6630.

With reference to FIGS. 67A and 67B, the Definer process is divided into a series of stages, or levels. The first level is the runtime server. The runtime server handles session management, where once the user has logged in, information about that user is stored so that the user need not log in again. HTTP used for the web is a stateless protocol. Other than cookies, there is no way to tell one request coming in from another. Thus, session management is used to make such a determination. The runtime server also handles user authentication and registration. In addition, the runtime server controls the members control console ("MCC") and the sponsors control console ("SCC"), which are two parts of the user interface that handle user information such as change of password, change of telephone number, etc. The runtime server is fairly independent from Definer because it provides different types of services than the core Definer services oriented towards editing web pages and templates. The runtime server is oriented towards providing a session-based environment. The runtime server may also be used for some instances of web page delivery. For dynamic content, such as a shopping cart, in a static web page, the runtime server resides in front of the web page and provides the runtime support to facilitate the dynamic content. A shopping cart in accordance with the invention will be described in further detail below.

Once a request passes through the runtime server, it is passed to WSI 6705. WSI 6705 essentially re-implements parts of the interface to improve its usability. WSI 6705 retrieves the request, places it into conforming format, and then forwards it to a Manager 6710. Manager 6710 restores the user context—what site and page a user is working, then examines the request and extracts the commands the user wishes to execute. This command is split into two parts: Process and View. Every command that is sent to Definer may consist of these two parts.

Process is a requested action, such as deleting a block of text or inserting a component. View generates the response. So if a user wishes to delete a piece of text, the user would invoke delete text in the user's process specification and edit page in the user's view specification. Manager 6710 recognizes the delete text command, retrieves all the arguments that would be relevant to deleting the requested piece of text, deletes the text from the page, and returns the edited page in accordance with the view process. The page is edited, and a view of the edited page is provided to the user. This new page does not include the piece of deleted text. Thus, system 6600 according to the invention executes the Process, then executes the View procedure, and returns a response to the user.

All pages of the Definer interface in accordance with the invention are classed according to two methods, coincidentally, one called process and the other called view. This classification allows for the implementation of the user interface—Resultpage 6715. Resultpage 6715 is of an abstract class defining the basis of classes that generate user interfaces and including parameterized content. For example, when the user inserts an image, or uploads an image, what is seen is handled by a class that is an extension of Resultpage 6715.

In summary, a request enters through web server 6630, passes to the runtime server through WSI 6705 to Manager 6710. Manager 6710 reestablishes the user context, splits the request up into its process and its view methods, then loads the relevant Resultpage 6715 for the process method and executes the process method thereon. Manager 6710 then takes the generated response, identifies and executes the proper view method, and then generates the response in HTML that is then passed back up through to the user. Thus, manager class creates and restores the user context; performs user authentication; directs execution of user commands; and provides global re-write facilities. To this end, the Manager class may include a number of objects: user context (not shown), command execute, and HTML re-write. The User Context performs user authentication, manages "cookies" used to identify user login, and recovers context for user interface facilities, such as maintaining a cut and paste clipboard. The Command Execution determines from user request the command to be executed and performs the Process and View methods. The HTML Re-write handles self referential URLs, reference to Image server 6605, and reference to External Applications.

The user interface provided by Manager 6710 will now be described in further detail with reference to the data structure of edit store 6615 illustrated in FIG. 67B.

Each page of the Definer that the user sees at, say, client terminal 125 is represented in Definer as an Ordered tree 6720. The Ordered Tree Class is a storage structure of metadata consists of an ordered list of Components 6725, encapsulating the container relationships amongst various elements (tags) of the page. It is similar to Document Object Model (DOM) but is enhanced to provide more effective user interface. Each component generates HTML for each of the five modes that system 6600 uses. These five modes are View, Edit, Publish, Edit Component, and Insert Component. The Component class is also used to implement interface to external components. As each Ordered Tree is parsed, the relevant mode is used to create the HTML for that Component. The HTML is collected to generate the web page that is passed back and appears on the user's browser at, e.g., client terminal 125. Cache 6730 is implemented to cache access to the Ordered Trees. Datastorefile 6735 provides storage implementation for Data store 6620 independent of Edit store 6615. Localstorefile 6740 provides implementation of serialization of data for edit store 6615 and aggressive disk and memory caching. The method for storing and retrieving the Ordered Trees is implemented under this operation.

As illustrated by FIG. 67B, Definer uses four classes to provide the services that are required to store and retrieve Ordered Trees. These four classes are Account manager 6745, Site manager 6750, Page manager 6755, and Httpservicecontext 6760. Account manager 6745 handles the collection of users' sites. It provides functionality to manage users. Site Manager 6750 manages each user's site. It provides for the creation and deletion of sites and listing the pages that belong to a site. Page manager 6755 provides for the creation and deletion of pages. It also provides the mechanisms to retrieve and save a user's page. Httpservicecontext 6760 provides facilities to determine the state information that is stored about the user. This information includes the user's cut and paste buffer. Each of these managers interface directly to an Editstorerequest 6765. Editstorerequest 6765 provides the managing logic for the relationship between Edit store 6615 and Data store 6620. It decides when information needs to be retrieved from data store 6620 and when information should be flushed to data store 6620. It also provides interface for serialization and implementation of logic for locking mechanisms.

Figure 68:
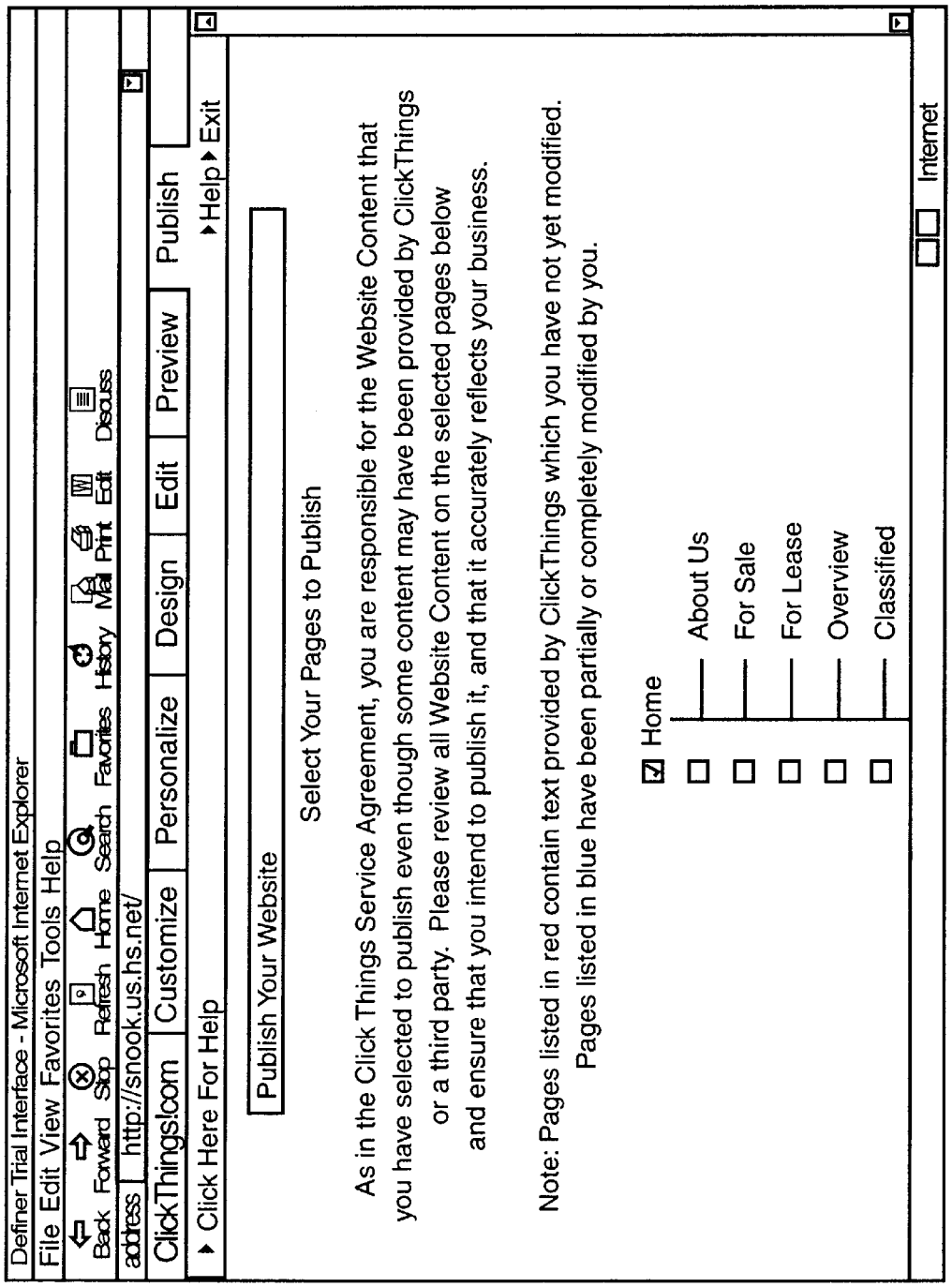

FIG. 68 illustrates the data structure of a sample site definition generated by Site Definer. As shown in FIG. 68, a site definition is actually an ordered tree containing a list of pages, where each page is in turn an ordered tree containing a list of content components. Each content component in a web page includes meta-data for generating the requisite HTML for the web page. For instance, a component may comprise meta-data for generating an image or a paragraph of text. Each component also includes a plurality of method files, including edit, view, publish, edit-component, etc. Advantageously, these method files enable the WYSIWYG editing of a template web page provided by the Web Definer.

The Web Definer first constructs the structure of the template web site according to the site definition, as displayed in area 5305 of FIG. 53. Referring once again to FIG. 48, the Web Definer employs the view method file for each component of a web page to dynamically generate the HTML for the content to be displayed in template web site area 4805. The employment of the edit method file enables a user to edit the content of each components e.g., the actual text of a component. The component-edit method file allows a user to control the attributes of a component, such as text font, size, alignment, etc. FIG. 51 illustrates text change window 5100, which is an illustrative embodiment of the user interface for the component-edit method. When a user has completed editing and elects to publish a site, the publish method is employed, generates the HTML for the web page to be published and loads it onto a web server for hosting the published site.

The WYSIWYG editing of the template web site, including the content and navigation of the site, is possible because these features are handled dynamically by the Web Definer using the ordered tree data structure. In other words, each page is regenerated according to the ordered tree corresponding to the template web site every time the site is edited. As such, a user can instantaneously review any changes to the template web site. In any known prior art system, changes to a web site, e.g., adding a page, requires modifying all of the pages of the web site to reflect such changes. With the Definer system, the user is given a simple mechanism of choosing a navigation model, wherein changes to the navigation of a web site is automatically incorporated to all relevant web pages.

As stated above, a published web site may include a shopping cart, which may be an applet. In accordance with the invention, the applet for the shopping cart goes through a firewall, which normally blocks generic applets.

There are both advantages and disadvantages to using an applet as a shopping cart. One of the many advantages is, of course, once the applet loads, the shopping experience for the end-user is much quicker. The applet also always loads progressively, so instead of loading the entire applet at once, it knows what functions the user will want to use straightaway and loads them first and while they're actually using it, other classes of the applet are being uploaded even while the user is unaware of it. The applet is unlimited in the amount of product someone can sell.

Web Site Referrals

In accordance with another aspect of the invention, web sites created and published using Definer may be provided with referrals to one another or to other non-Definer web sites under the Universal Content Manager.

Figure 69A:
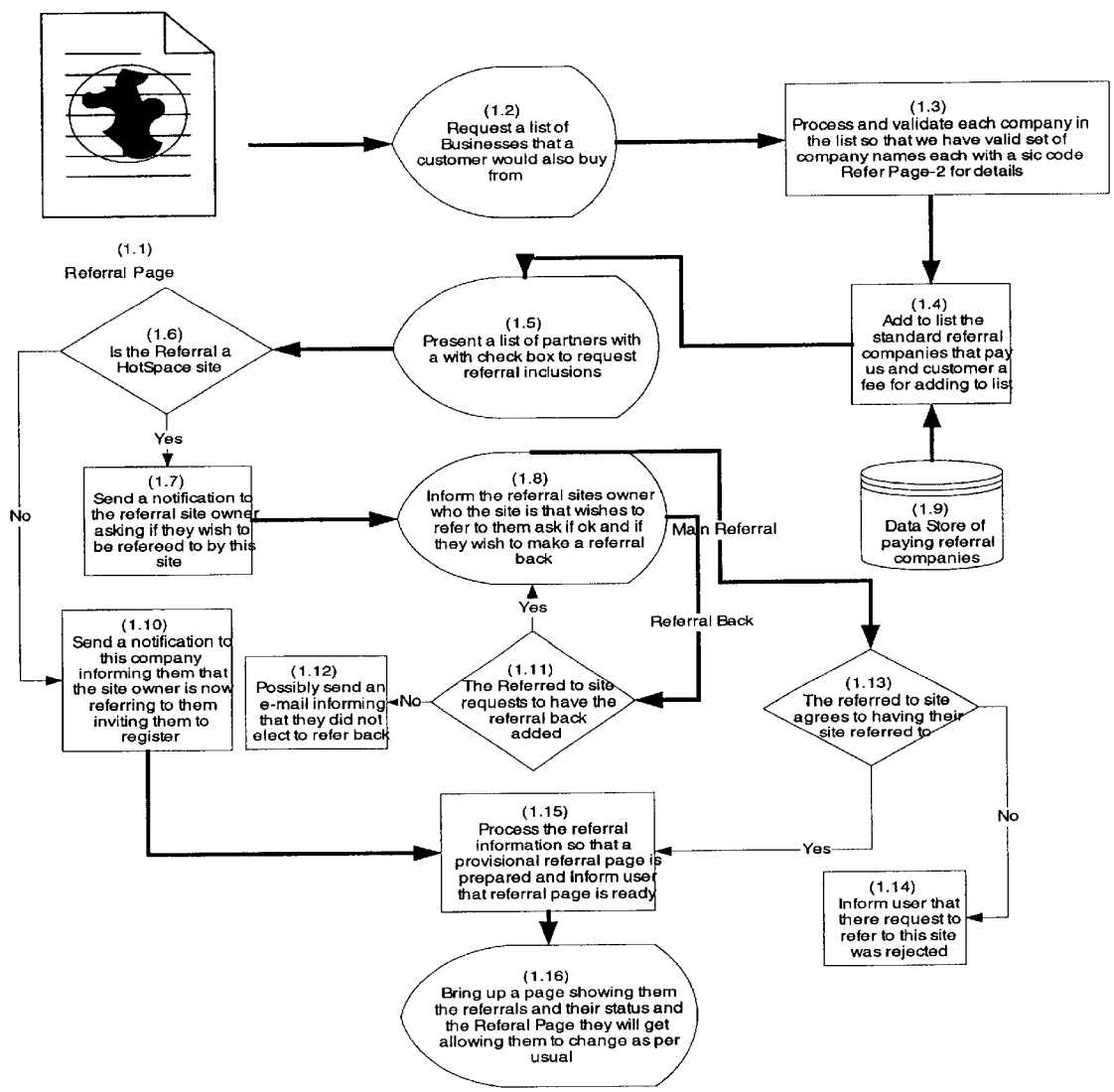
FIGS. 69A and 69B show a process for generating and managing referrals among web sites according to an embodiment of the invention.
Figure 69B:
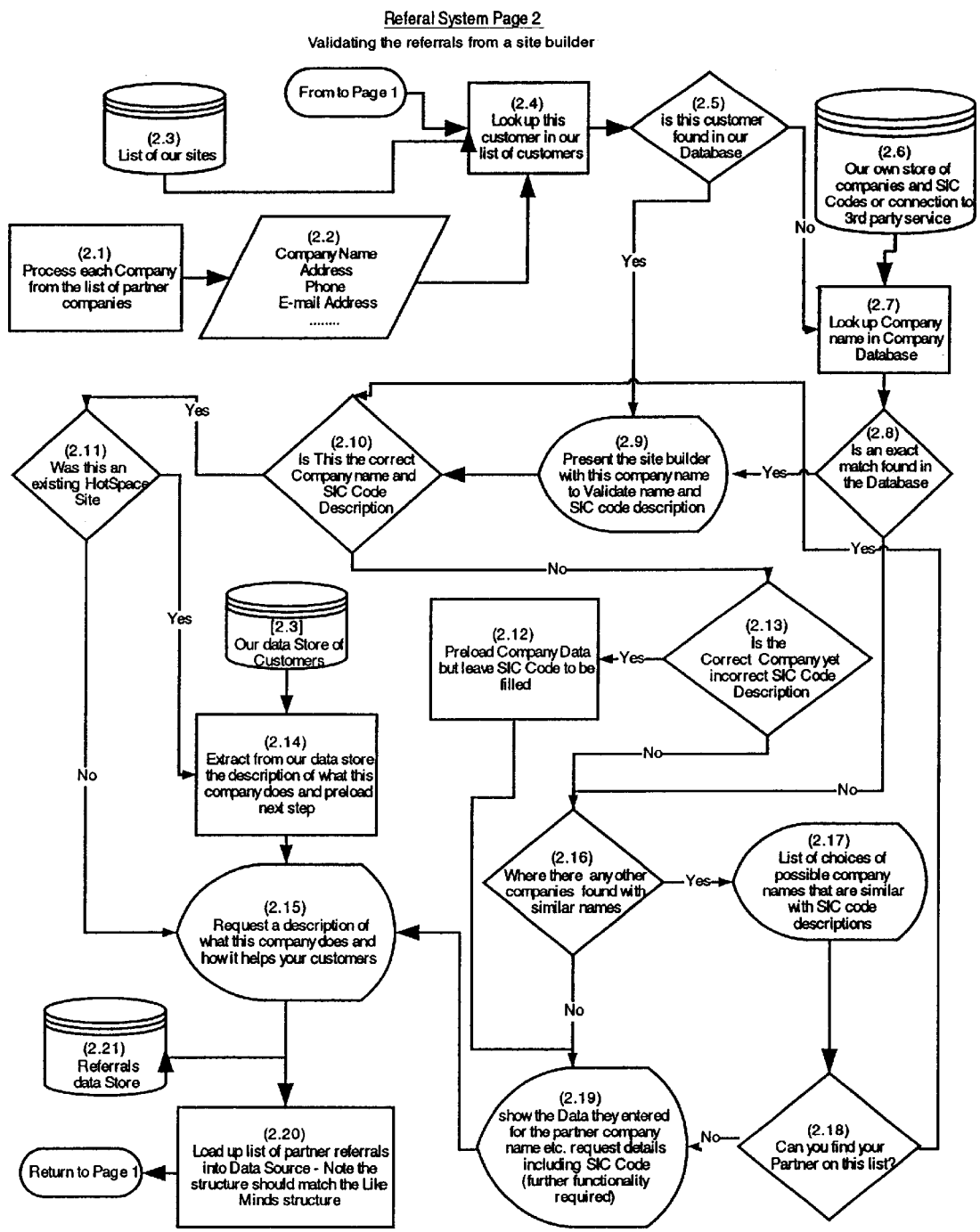

FIGS. 69A and 69B illustrate a process 6900 for gathering and validating web site referrals from a site owner/builder or user in accordance with the invention. Process 6900 provides for constructing referrals, or links, to other web sites that may be related or relevant to a web site published using Definer. For example, a web site for a building contractor designed and published using Definer may include links to sites for: hardware companies, excavators, architects, etc. Thus, process 6900 builds natural "full service" groups among a network of web sites created using Definer. Advantageously, process 6900, according to the invention, provides: impetus to a site builder to tell business associates about Definer, thus expanding the network of Definer-created web sites; information for sending more individualized invitations to join the Definer network; a system where a site visitor to a specific site finds more sites that suit their interests, thus promoting traffic of all sites within the Definer network; a list of other sites in the network that appear to be natural partners to increase the cooperation and communication between site builders in the network. The end result is an environment where we can categorize and understand the sites in our network and understand the usage patterns of the visitors to this network. This is invaluable information that can be used in a multiple of initiatives ranging from buying patterns for customer care and direction to electronic malls and yellow pages style environments.

FIG. 69A illustrates phase 1 of process 6900 for building a business network of referrals among Definer web sites. It is noted that all communications to the web sites and their owners may be accomplished through various communications media, including e-mail. At any point before a web site is published using Definer or after a customer visits a Definer-created web site, a referral page (1.1) initiating process 6900 may be displayed at client terminal 125. At step (1.2), a request for a list of businesses that a customer would also buy from is displayed. Such a list of companies would include natural partners for the company owning the web site (i.e., if a customer buys from this company, who else would they refer the company to? Such referrals may include friends, associates etc.). At step (1.3), each company in the list is processed and validated (process 6900) to create a valid set of company names, each with a Standard Industry Code (SIC), by executing company validation process 6900 shown in FIG. 69B. It is noted that validation process 6900 could be done off line and driven via Emails telling a site builder when to return and continue the process.

At step (1.4), standard referral companies that pay the web site owner and the host of Definer a referral fee are added to the list. An email may be sent to the web site owner or builder to return and finish the referral page, or the referral page may be completed as the web site is created and published using Definer all at once. Sites of owners who wish to be included may also be added to the list of referral pages for a fee. Other natural referral sites that like-minds find to suit the business type may also be added to the list. As shown by step (1.9), paying referral companies from a Data Store are added to the referral list.

At step (1.5), a list of partners with a check box to request referral inclusions is forwarded to the web site owner or builder. A page is presented to the site owner/builder showing the full collection of the possible sites to be included as referral sites with check boxes for selecting each of the companies that the owner/builder wishes to include on the referral page. The referred-to sites that are created using Definer and paid sites already have the company details and descriptions filled out and cannot be changed. The non-Definer sites have this area filled with the information that are validated from the SIC code look up but can be changed by the site owner/builder. Links to the referred-to sites on a referral page may include a small section stating why a customer should go to referred-to site (or use this company if they are not on line yet), we could have a standard for this but have the ability for the site builder to change it.

At step (1.6), it is determined whether a referred-to site is a Definer-created site. In accordance with the invention, there is special processing for a Definer-created web site when it is being referred to. This processing provides the feeling of being part of the Definer network and more control over the business and Internet referrals of the site. It may also provide incentive for the site owners to return to their sites on regular intervals to continue working on them.

If the referred-to site is a Definer-created site, process 6900 proceeds to step (1.7), where a notification is sent to the referred-to site owner asking whether to include their site on the referral list. A notification is sent to the Definer-created site owner that another site owner wishes to refer to them in their web page. This is an email that includes a link to a specific page for managing this process. This will go to the referral system page and hopefully act as an impedance on adding further referrals.

At step (1.8), the referred-to site owner is provided with information on the referring site and asked whether the referral is acceptable (1.13) and whether to add a referral back in the referred-to site (1.11). A site owner receives an email informing that a Definer-created site owner wishes to have them on their referral page. A link in the email directs them to their referral page manager and shows them the site that wants to refer to them, it also asks them if they wish to refer back.

If the referred-to site is not a Definer-created site, process 6900 proceeds to step (1.10) when a notification is sent to the referred-to site informing that the Definer-created web site is now referring to it and inviting the referred-to site owner to register. In accordance with an embodiment of the invention, details from the information received from the original referrer may be user to pre-build a new web site for the referred-to site owner, a password would be included in the site to ensure security.

At step (1.11), it is determined whether the referred-to site requests to have a referral back to the referring site added. If so, then step (1.8) is performed for the referring site informing of the referral back. If not, process 6900 proceeds to step (1.12) where the referring site is informed that a referral back was not elected.

At step (1.13), it is determined whether the referred-to site agrees to having their site referred to. If not, at step (1.14), the referring site is informed that the referral request was rejected.

If the owner of a non-Definer referred-to site chooses to register at step (1.10), or if the owner of a Definer referred-to site agrees to the referral, process 6900 proceeds to step (1.15). At step (1.15), the referral information is processed so that a provisional referral page is prepared and the referring site is informed. At step (1.16), a page showing the referrals and their status is forwarded to the referring site and the referring site builder is allowed to edit the provisional referral page using the Definer interface. It is noted that the description of the referred-to site on a referral page may be locked so that only the referred-to site owner may change or edit its contents.

In conjunction with process 6900 (at step (1.3)) shown in FIG. 67A, process 6900 is performed for validating and classifying the actual referrals from the referring site builder. As illustrated in FIG. 67B, process 6900 receives a list of companies that have been entered as natural partners and return a list of validated companied classified into their SIC codes. It is noted that process 6900 could be done off line so it is run on a separate system at a separate time. Thus, the list of referrals from process 6900 may be stored and all the data access to find the companies done off line. The referring site builder is sent an email stating that the system has found x companies that are ready for validation. This then acts as an impetus to get the referring site builder back to do more work on their site.

Process 6900 begins by processing (2.1) each company from the entered list is processed and retrieving (2.2) specific information for each company. Such information may include: Company Name; Address; Phone number; and Definer SIS code.

A list of all Definer sites is retrieved from a Data Store at step (2.3), and each company from the entered list is looked up in the retrieved Definer sites at step (2.4). At step (2.5), it is determined whether an entered company owns a Definer site.

Concurrently at step (2.6), a repository of non-Definer companies or an external service is queried and companies determined not to own Definer sites at step (2.5) are searched from the repository or external service at step (2.7).

At step (2.8), it is determined if an exact match is found at step (2.7). If a match is found in either step (2.5) or (2.8), process 6900 proceeds to step (2.9) where the company information is forwarded to the referring site owner for validation. At step (2.10), it is determined whether the company name and SIC code description are correct. If so, process 6900 proceeds to step (2.11) where it is determined whether the valid company owns a Definer site.

If the company information is determined to be incorrect at step (2.10) and if the company name is determined to be valid at step (2.13), process 6900 proceeds to step (2.12) to preload the company data but leave SIC Code to be filled.

If the valid company owns a Definer site, as determined at step (2.11), process 6900 proceeds to step (2.14) where the description of what the company does is extracted from the Data Store, which is the same as that of step (2.3). Next, at step (2.15), the owner of the referring site is requested to provide a description of what this referred-to company does and how it relates to its business.

If an exact match is not found for an entered company, in steps (2.8) and (2.13), process 6900 proceeds to step (2.16) where it is determined whether any company names similar to that of the entered company were found. If so, a list of choices of possible company names that are similar with SIC code descriptions is provided to the referring site owner, as shown by step (2.17). Next, at step (2.18), the referring site owner is asked whether the intended referred-to site (partner company) can be found from the list provided at step (2.17).

If the referring site owner cannot find its partner at step (2.18), or similar names to the entered company cannot be found at step (2.16), and after company data has been preloaded at step (2.12), the data entered for the partner company is provided to the referring site owner, as shown at step (2.19). The site owner is also requested for details, including SIC Code.

Once the company descriptions have been entered by the referring site owner at step (2.15), process 6900 proceeds to step (2.20) where the list of partner referrals is loaded into the Data Source at (2.21).

External Components

In accordance with the invention, an SDK, a state-of-the-art, leading-edge package is provided so that software developers may create external web-server-hosted applications that generate custom content for inclusion within a page of a Definer web site. The SDK allows developers to use the code that is at the heart of the Definer Application Programming Interface ("API"), giving them full access to the very foundations and frameworks of the unique Definer material.

These third party applications, or components, described thus far as "external" components (denoted DXC hereinafter), may be registered and stored in a database (DXC Registry) located on a central server, such as Data Store 6620 described above. DXC Registry would contain references to the locations of all available DXC implementations.

A DXC produces HTML representations of DXC instances, which are specific instances of a DXC embedded in a web page, for both the Definer editing environment and the published run-time environment. Definer submits HTTP requests to DXCs in response to user actions in providing a DXC interface.

A DXC interface is an entry-point into the DXC implementation. The SDK specifies a number of DXC interfaces that DXCs should support. Each interface handles a specific type of request. An interface may be a URL, and the same URL may be used to handle multiple interfaces. The simplest types of requests include requesting a DXC to return the HTML representation of a DXC instance. The HTML returned may vary depending on the type of user interface requested, for example, the edit interface versus the run-time interface.

There are other DXC interfaces that support manipulating the properties of DXC instances, although in many cases Definer's built-in Property Page, which is a data entry form that allows users to manipulate the properties of a DXC instance, is sufficient for this purpose. A DXC may override the default Property Page by supplying the HTML for a custom Property Page. There is a specific DXC interface for this purpose, which will be described in detail below.

When a DXC is registered with Definer, an HTTP URL is recorded for each registered interface. These URLs point to the server-side applications implementing each interface, which may include anything that is accessible via HTTP, for example, a servlet, a Computer Graphics Interface ("CGI") script, or even a static HTML page.

DXC interfaces may include: Edit—return the "Edit Mode" HTML for a DXC instance; Preview—return the "Preview Mode" HTML for a DXC instance; Runtime—return the "Publish Mode" HTML for a DXC instance; Property Page—return a custom HTML form allowing users to enter configuration data for a DXC instance; Edit Event—manipulate the properties of a DXC instance and/or perform some server-side processing in response to a user event in Definer; Runtime Event—if a DXC produces dynamic results at runtime, then runtime events are dispatched to this interface; Preview Event—mimic the behavior of the Runtime Event interface within a restricted "Preview" environment.

The "Edit Mode" allows Definer users to visually manipulate the DXCs on a page. The "Preview Mode" allows Definer users to preview pages in their site before publishing. The "Publish Mode" represents the run-time version of a published Definer page.

Figure 70:
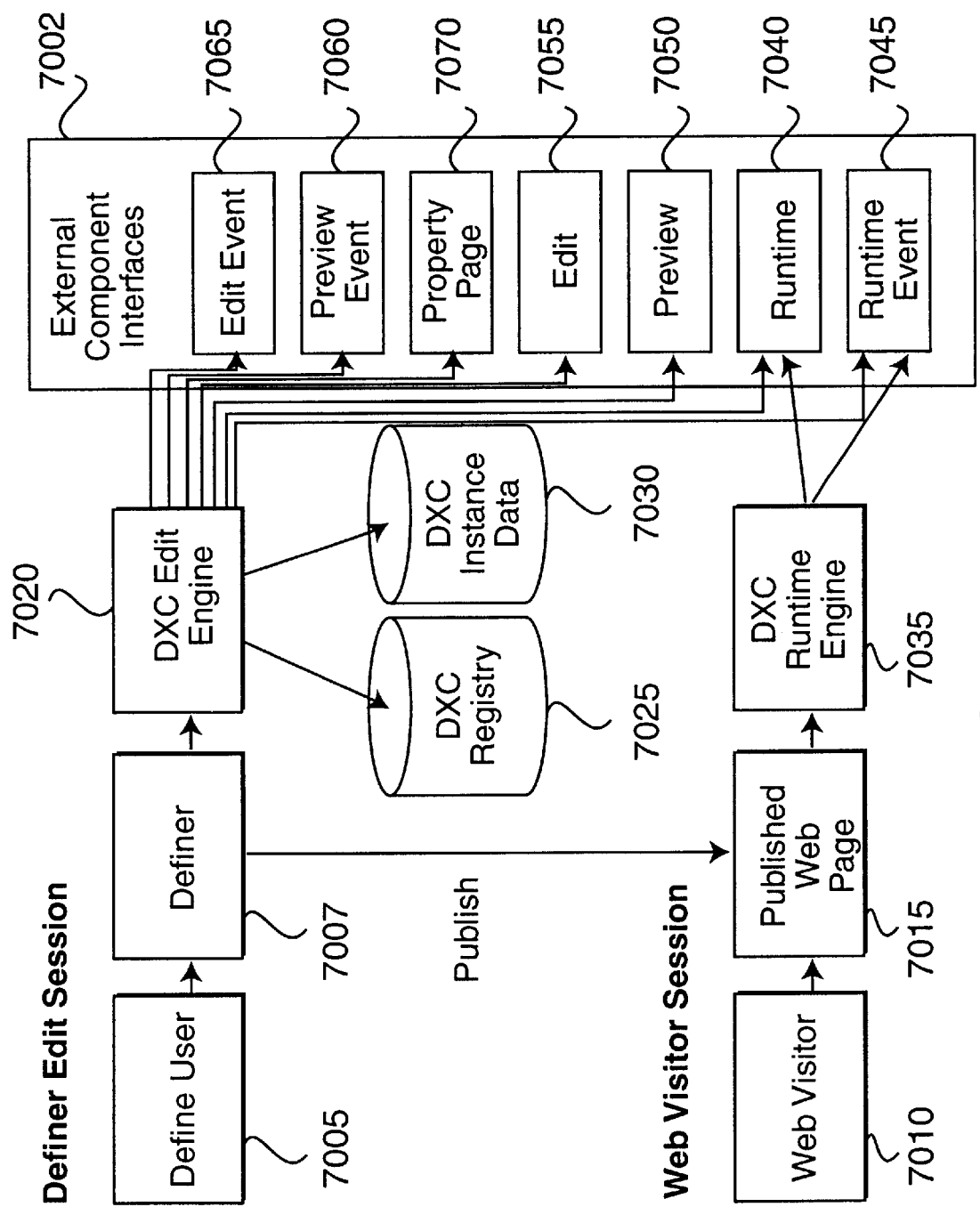
FIG. 70 illustrates providing externally generated components to be incorporated to web sites created using the Web Definer module according to an embodiment of the invention.

FIG. 70 shows external DXC interfaces 7002 that may be invoked at edit-time by a Definer user 7005 using Definer 7007, and at runtime by a Web Visitor 7010 using a Definer published Web Page 7015. As shown in FIG. 70, a DXC Edit Engine 7020 provides DXC interfaces 7002 to Definer 7007, thereby enabling Definer user 7005 to edit the properties of a DXC as stored in DXC Registry 7025 and DXC Instance Data 7030. At runtime, a DXC Runtime Engine 7035 provides Runtime interface 7040 and Runtime Event interface 7045 to published web page 7015.

Each DXC interface 7002, as shown in FIG. 70, will now be described in detail by their corresponding categories, as follows: presentation interfaces; event interfaces; and property page interface.

Presentation Interfaces

Presentation Interfaces are responsible for generating and returning an HTML representation of a DXC instance. They do not modify the DXC instance in any way. The HTML returned by a Presentation Interface may or may not be a complete HTML page. Definer strips any page markup (like <HTML> or <BODY> tags) from the returned HTML to ensure it fits comfortably inside a host page. Presentation interfaces include: Runtime Interface (7040); Preview Interface (7050); Edit Interface (7055).

The Runtime Interface 7040 is responsible for generating the HTML for a DXC instance to be included in a published web site. Runtime interface 7040 is invoked during the site publication process. If the DXC is dynamic at runtime (i.e. it supports runtime events) then Runtime Interface 7040 is invoked after every runtime event, as will be described below, to refresh the DXC HTML within the page being viewed.

The Preview interface 7050 is responsible for generating the HTML representing a "preview" of the DXC within the Definer editing environment. This "preview" version should appear identical to the Runtime version on a client terminal. If no Preview Interface is registered for a DXC then Runtime Interface 7040 is used to generate the preview HTML. The main reason for registering a distinct Preview Interface 7040 is to generate different hyperlink targets for a preview mode, where users preview a page before publication.

The Edit interface 7055 is responsible for generating the HTML to include in an editable Definer web page. The output appears similar to the Runtime and Preview HTML, but may include additional links and controls to support editing the DXC properties. When in an edit mode (for instance, when a page containing a DXC is being edited using Web Definer as described above), Definer automatically attaches a special hyperlink to each DXC in a page. A context menu appears when this hyperlink is activated, allowing the user to perform standard editing functions such as deleting the DXC or accessing the DXC's property page. Thus, if no Edit Interface is registered for a DXC, then the Preview or Runtime interfaces will be used instead. Property Page editing is still possible through the standard edit menu of the DXC.

Event Interfaces

Event Interfaces are responsible for processing event messages. They return updated property values for Definer (or the runtime engine) to store against the target instance. The new property values are returned as header fields of the HTTP response. The names of the response header fields should match the corresponding property names (including the "dxc_-" prefix).

Events may be triggered in two ways:

by the user submitting a Property Page; or by the user activating a callback hyperlink within the DXC.

If an event is triggered by a Property Page submission, then all form fields from the Property Page are included as additional parameters to the Request.

If an event is triggered by a callback, then an additional parameter named "dxc_message" is included in the request. This parameter contains details of the triggered event. Callbacks will be described in further detail below.

Apart from returning property updates via the HTTP response header, Event Interfaces should not return any actual HTML content in the response. Any content returned is simply discarded.

Event interfaces include: Runtime Event Interface (7045); Preview Event Interface (7060); and Edit Event Interface (7065).

The Runtime Event interface 7045 is invoked whenever a runtime callback is activated on a DXC being viewed in a published site. The properties of a DXC instance cannot be modified at run-time, so any property updates returned in the response from Runtime Event interface 7045 is not saved in any database. Instead, the new property values are transferred into a hidden HTML form within the result page. Subsequent events triggered from within that result page use the latest property values from the hidden form in preference to the persistent properties of the DXC instance. Thus, several site visitors may view the same DXC instance simultaneously, and each visitor may individually modify the runtime properties of the DXC instance without affecting the other visitors. Each individual runtime version of a DXC instance is referred to as a DXC Image.

After every invocation of Runtime Event Interface 7045, Runtime interface 7040 is called to reconstruct the HTML for the DXC image.

The implementation of the Preview Event interface 7060 closely mimics the behavior of Runtime Event Interface 7045. If there is no Preview Event Interface registered for a DXC, then Runtime Event Interface 7045 used instead. Preview Event Interface 7060 is only required if the behavior of the DXC needs to be different in Preview mode as opposed to runtime.

After every invocation of Preview Event Interface 7060, Preview interface 7050 is called to reconstruct the HTML for the preview image.

The Edit Event interface 7065 is the only interface that can trigger persistent updates to the properties of a DXC instance. Edit Event interface 7065 is invoked in response to an Edit Mode callback or after a Property Page has been submitted. The details of the event are supplied in either the "dxc message" request parameter (in the case of a callback), or in a set of request parameters that correspond to the form fields from the Property Page.

The DXC is responsible for interpreting the event, performing any appropriate server-side processing, and returning any property updates via header fields in the HTTP response. Definer saves all property updates returned by Edit Event interface 7065. In the case of a Property Page event, any fields from the Property Page form with field names corresponding to property names are automatically saved by Definer. There is no need for the DXC to return property updates from a Property Page event unless the DXC overrides or amends the form data (for example, the DXC may trim trailing spaces from the user-supplied property values).

Property Page Interface

Despite the existence of Definer's generic property page for DXCs, there are several reasons for developing a custom property page for a DXC. Some reasons may be:

to improve on the look and feel of the generic property page;

to support complex data structures;

to improve the usability and type safety of the form by creating list boxes, radio buttons or other form controls; and to restrict which properties can be viewed or edited via the property page.

The Property Page Interface 7070 may be implemented if the default property page is overridden. Property Page interface 7070 simply returns a set of pre-filled HTML form fields with a desired layout. The <FORM> tag or any "Submit" controls are not returned because Definer automatically constructs a Property, Page skeleton including these elements. The HTML returned from Property Page Interface 7070 is simply inserted into the pre-fabricated skeleton.

If the name of a target property is used as the name of the corresponding form field, the form field is automatically transferred into DXC property values when the form is submitted. Definer automatically saves any fields it recognizes as properties (unless overridden by Edit Event Interface 7065).

However, Property Page may not correspond directly with the properties defined for a DXC. For example, the entire state of the DXC may be serialized as EXtensible Markup Language ("XML") and stored in a single property. Rather than making the user edit the XML document directly, a Property Page may be provided to allow the user to modify the individual elements of the XML structure. To achieve this, Property Page Interface 7070 and Edit Event Interface 7065 are used. Form fields that do not correspond to property names are created using Property Page Interface 7070. When the property page form is submitted, Definer forwards all of the form data to Edit Event Interface 7065, which constructs the XML document from the form data and returns it as a property update in the header of its response.

DXC interfaces 7002 may be selectively registered for different DXCs, as will now be described.

Registering DXC Interfaces

Figure 71:
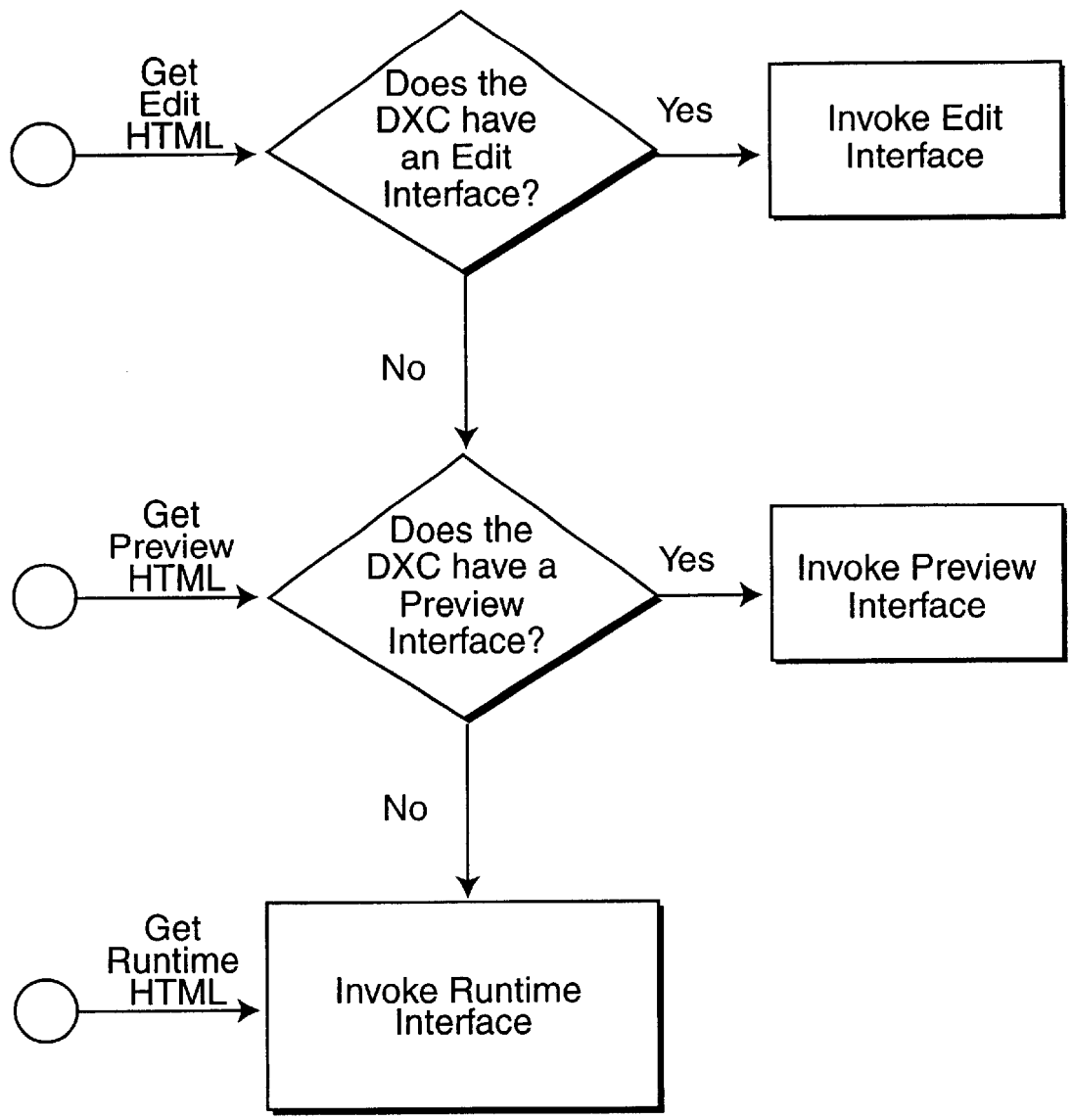

As an example, a pre-existing web page, with no configurable properties and no dynamic run-time behavior may be registered as a DXC via a Definer DXC Registration web site. For this simple example, only a Runtime interface (7040) needs to be specified. The pre-existing web page may be made available for insertion into Definer web pages by simply registering a Runtime interface (7040) pointing to the URL of the web page. With the Edit and Preview interfaces blank, Definer uses the Runtime interface in the editing environment as well as the runtime environment. If a Preview interface but not an Edit interface is specified, then the Preview interface would be used for all Edit interface requests. FIG. 71 is a flowchart illustrating how Definer dispatches user requests to the appropriate DXC interface.

Since the Publish interface points to a static HTML page, all Definer requests to this DXC simply retrieve the page and display it within a host page. No configurable properties need to be registered for this DXC, and thus a Property Page interface (7070) is not needed. Since the component does not generate any event callbacks, Event interfaces are not needed.

Registering DXC Properties

The configurable properties of a DXC are stored in the DXC registry (7025) at registration time. Since Definer maintains a number of internal attributes for each DXC instance, DXC property names are automatically prefixed with "dxc_p_" to differentiate them from the internal attributes. Each instance of a DXC maintains a copy of each registered property. The properties of a DXC instance collectively represent the "state" of that instance.

Whenever a request is submitted to a DXC, the state of the target instance is passed to the DXC interface by including each property as a request parameter. The DXC then interprets the state of the instance and dynamically generates the corresponding HTML. Definer provides a generic Property Page for editing the properties of a DXC instance. The DXC may override the generic Property Page by implementing and registering a Property Page interface. Alternatively, the DXC may use callbacks embedded within its Edit Mode HTML to allow visual editing of properties within the Edit page itself.

For example, a DXC for maintaining a FAQ section of a site may include visual editing controls within its Edit interface, as shown in FIG. 72. If these controls are linked to DXC callbacks, then the properties may be modified without using a property page at all.

Next, specifications for DXC interfaces will now be described.

Interface Specifications

Every HTTP request to a DXC interface includes the following request parameters:

dxc_interface: Identifies the interface being invoked. If two or more interfaces share the same URL, then this request parameter can be used to determine the type of request.

dxc_id: The unique identifier of the target DXC instance. This is a number generated by Definer whenever a new DXC instance is created.

dxc_page: The name of the web page that contains the DXC instance.

dxc_user: The user id of the Definer user, or the runtime user (if known).

(Instance Properties) The state of the DXC instance. Any request parameter name starting with "dxc_p-" identifies a property of the instance.

Implementing Callbacks

There are a number of different ways in which DXC edit interfaces may be implemented. One example is a custom "Property Page" supplied by the component developer. Other alternatives include custom applets, or even "in-place" editing within the DXC's edit page.

For both the applet and the in-place editing approaches, the DXC needs to be able to send itself "messages" in response to user actions or events. However, the DXC cannot call itself directly without losing the context of its host page. Thus, all messages may be routed through Definer or the runtime engine, which may be accomplished with callbacks.

The implementation of Definer callbacks, as well as a few other features that simplify in-place editing, will now be described in detail.

FIG. 73 depicts a sample document containing a valid DXC callback. The document contains a couple of Definer "macros" which are meaningless outside of the Definer environment, but if the document is produced by a DXC for inclusion within a page of a Definer web-site, then the macros can prove very useful.

The "{%dxc_init}" macro at the top of the body, as shown in FIG. 73, is intercepted by Definer and replaced with a number of pre-defined javascript functions. Among those functions is the "DXCCallback_{%id)" function. The {%id} macro is replaced by Definer with the unique id of the DXC instance, allowing many DXC instances to import the same set of functions into the same page without introducing name conflicts. Any reference to a DXC javascript function may include the "_{%id)" suffix.

The "DXCCallback_{%id}" function sends a request to Definer, asking for the specified message to be forwarded to the DXC. In the above example, if the user clicks 'Notify' on the page, then the same DXC instance that produced the HTML would be sent the message "UserClickedNotify". The DXC can interpret and respond to the message any way it chooses.

The format and meaning of any callback message is entirely defined by the DXC. Since the DXC constructs the HTML that contains the callback messages, it should know how to interpret the messages it receives.

Invoking the Definer Text Editor

The Definer Text Editor, e.g., text editor dialog box 2000 shown in FIG. 20, is an applet that allows the user to visually edit and format HTML text. DXCs can make use of the Definer Text Editor as a cheap and easy way of providing rich text editing features within the DXC. A sample implementation is illustrated in FIG. 74.

In the example shown in FIG. 74, when the user clicks 'This is some text', the Definer Text Editor is launched containing the text specified in the first parameter passed to DXCTextEdit__{%id}, i.e. 'This is some text'. Assuming that the user edits the text to read 'The text has changed', then Definer forwards the message "NewTextData=The text has changed" to the DXC. It is noted that the second parameter to the DXCTextEdit__{%id} function (the message to send) contains the special symbol "%at". This symbol is replaced with the output of the Text Editor before the message is sent.

Using Popup Menus

Popup context menus are a useful feature for DXCs that have complex editing features. Definer allows DXCs to create and use popup menus relatively easily.

FIG. 75 shows a sample implementation of a popup context menu. The menus and the menu items are defined. Definer provides a macro to simplify this task. The {%dxc menu . . . } macro requires two parameters (separated by single spaces). The first is the name of the menu, which will be described later. Each menu name is unique within a DXC, however, two different DXCs may create menus with identical names without risk of conflict.

The second parameter to the {%dxc menu . . . } macro is a list of item names, separated by the pipe character ("|") The whole list may be enclosed in single or double quotes (it is noted that the menu name itself is not quoted). The item name list specifies the text that appears for each item in the menu. In this example, the menu has 3 items. Their captions are "Option 1", "Option 2", and "Option 3".

Next, a URL is assigned to each menu item. One of these URLs is invoked if the user selects the corresponding menu item. The URLs are assigned to menu items within a block of JavaScript. The DXCSetMenuItem__{%id} function (imported via {%dxc init}) takes 3 parameters—the menu name, an item name and a URL. In this example, the URLs point to JavaScript function calls that invoke a DXC callback for each item. Each item invokes a callback with a different message when selected by the user.

Finally, a link is provided that shows the popup menu when the link is activated. An anchor is used to point to a DXCShowMenu__{%id} function call. When the user clicks the 'Click here for menu' link, the menu 'pop1' is displayed. If the user selects any item from the menu, then the corresponding message is sent back to the DXC.

Run time interaction between a DXC, a host web page, and various API's (if the DXC is on a Definer Server).

Figure 76:
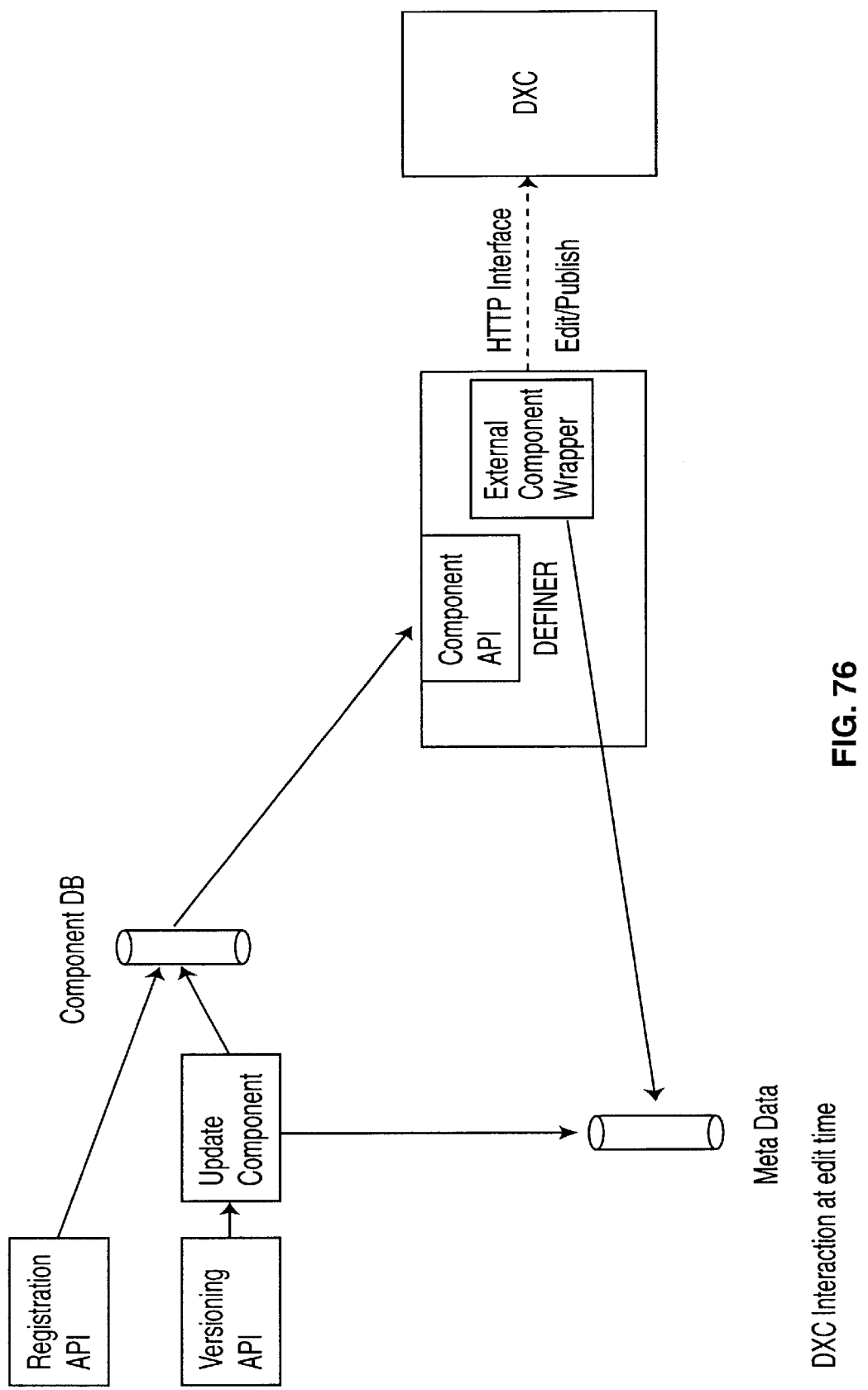

FIG. 76 is a flow diagram illustrating the flow of control at runtime for a DXC containing static HTML. With reference to FIG. 76, the flow of control is as follows.

Part 1: This is a process by which an instance of the object "External DXC Wrapper" is created for every DXC. The HTTP interfaces of this object are set via the DXC database (not shown in the diagram).

Part 2: It is the responsibility of the External DXC Wrapper to pass all the necessary parameters to the external HTTP interface. It obtains these parameters from the metadata store. These parameters are identified by the prefix "dxcp"

Part 3: The Runtime HTTP interface gets called with the relevant parameters passed in.

Part 4: The runtime interface can in turn call a remote application.

Part 5: The remote application returns.

Part 6: Assuming that the interface returns static HTML, this gets returned to the External DXC Wrapper.

Part 7: The header of the HTTP can contain any instance data that needs to be stored. Any parameters that begin with "dxcp" will be stored in the metadata.

Part 8: The static HTML is in turn passed back to the Page.

Figure 77:
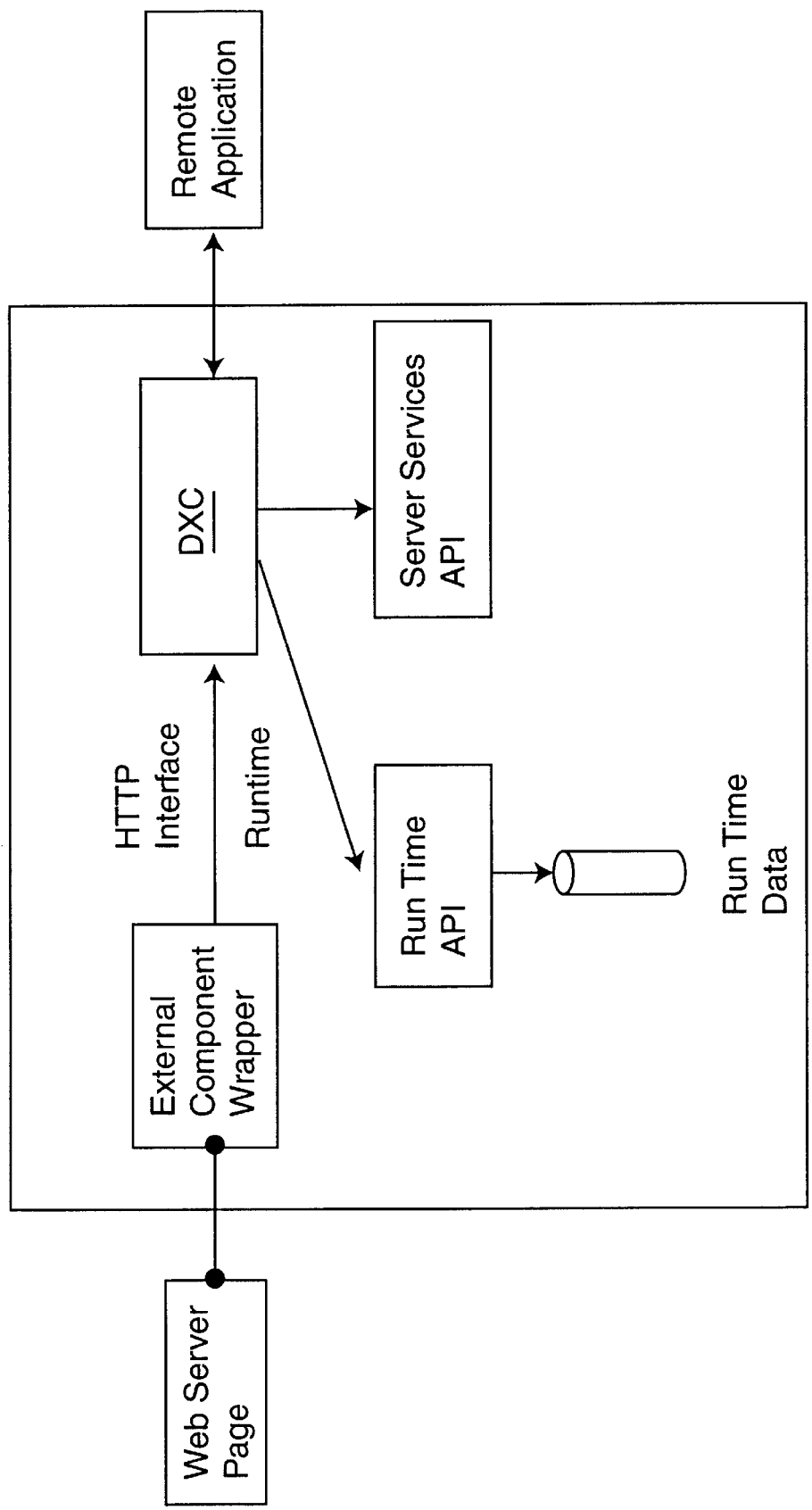

FIG. 77 is a flow diagram illustrating the use of filters and converters in the process illustrated in FIG. 76. As shown in FIG. 77, steps 1 through 7 are similar to those of FIG. 76. Part 8 is replaced by the following.

Part 8: In the example shown in FIG. 76, the External DXC Wrapper returned the static HTML without any modification. In this case, however, the HTML is first filtered or converted before being returned.

An example of such a filter would be one that removes all other sections of HTML other than the body before passing it back to the server page. Filters can be cascaded and can be specified for each interface.

Figure 78:
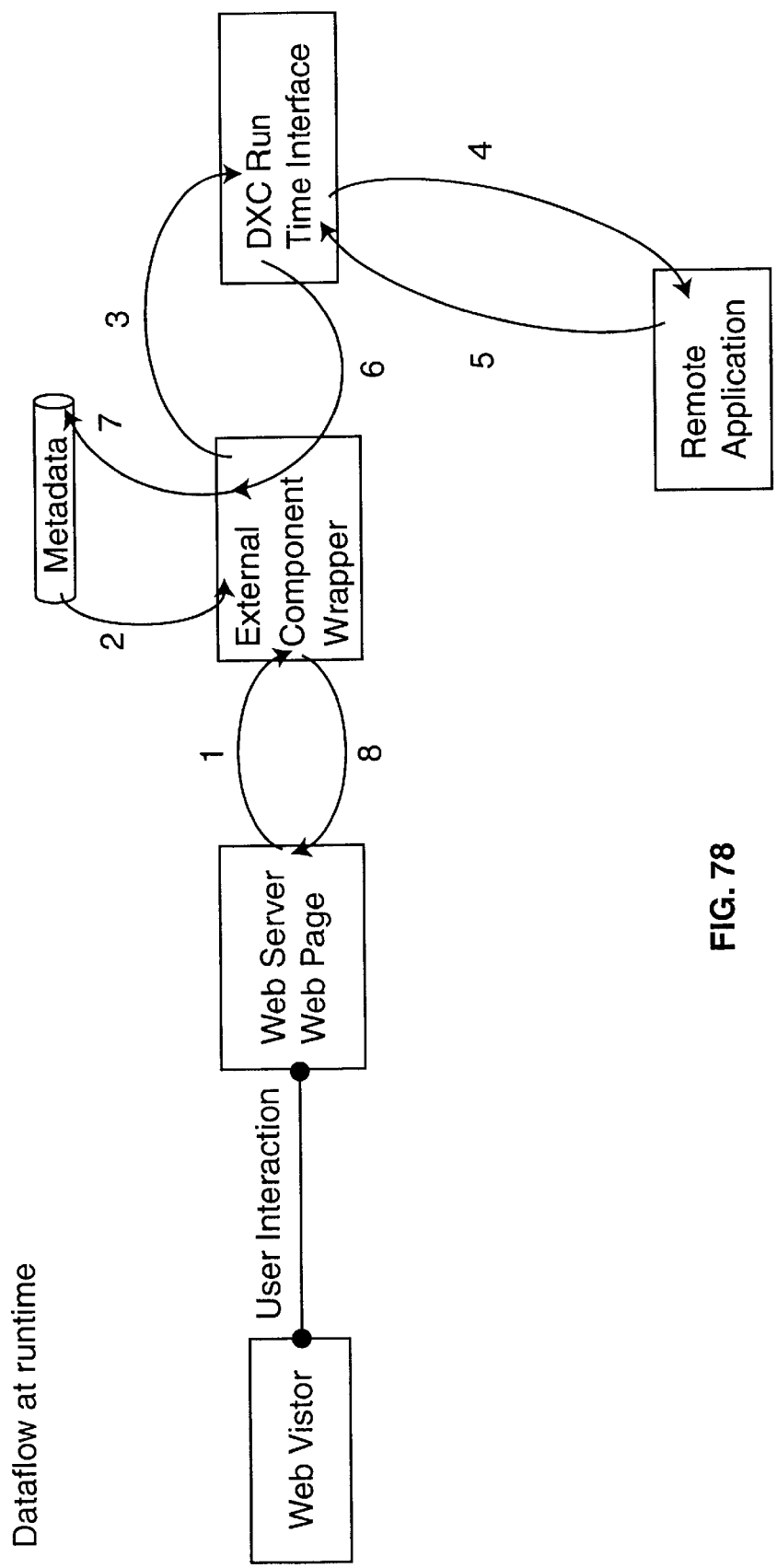

FIG. 78 is a flow diagram illustrating the process illustrated in FIG. 77 with the addition of Server Side Includes ("SSI"s). As shown in FIG. 78, the process further includes Parts 10 & 11.

Parts 10 & 11: Show the data flow to cope with SSIs. Any such SSIs are processed prior to the data being returned to the client.

Billing

The billing subsystem provides the necessary functionality for DXC owners to charge for the usage of their DXCs. There are obviously two types of billing interfaces: Internal and External billing interfaces. If a user has registered a billing interface, then the "External DXC Wrapper" invokes this interface. If there is no registered billing interface then an internal one is used.

Figure 79:
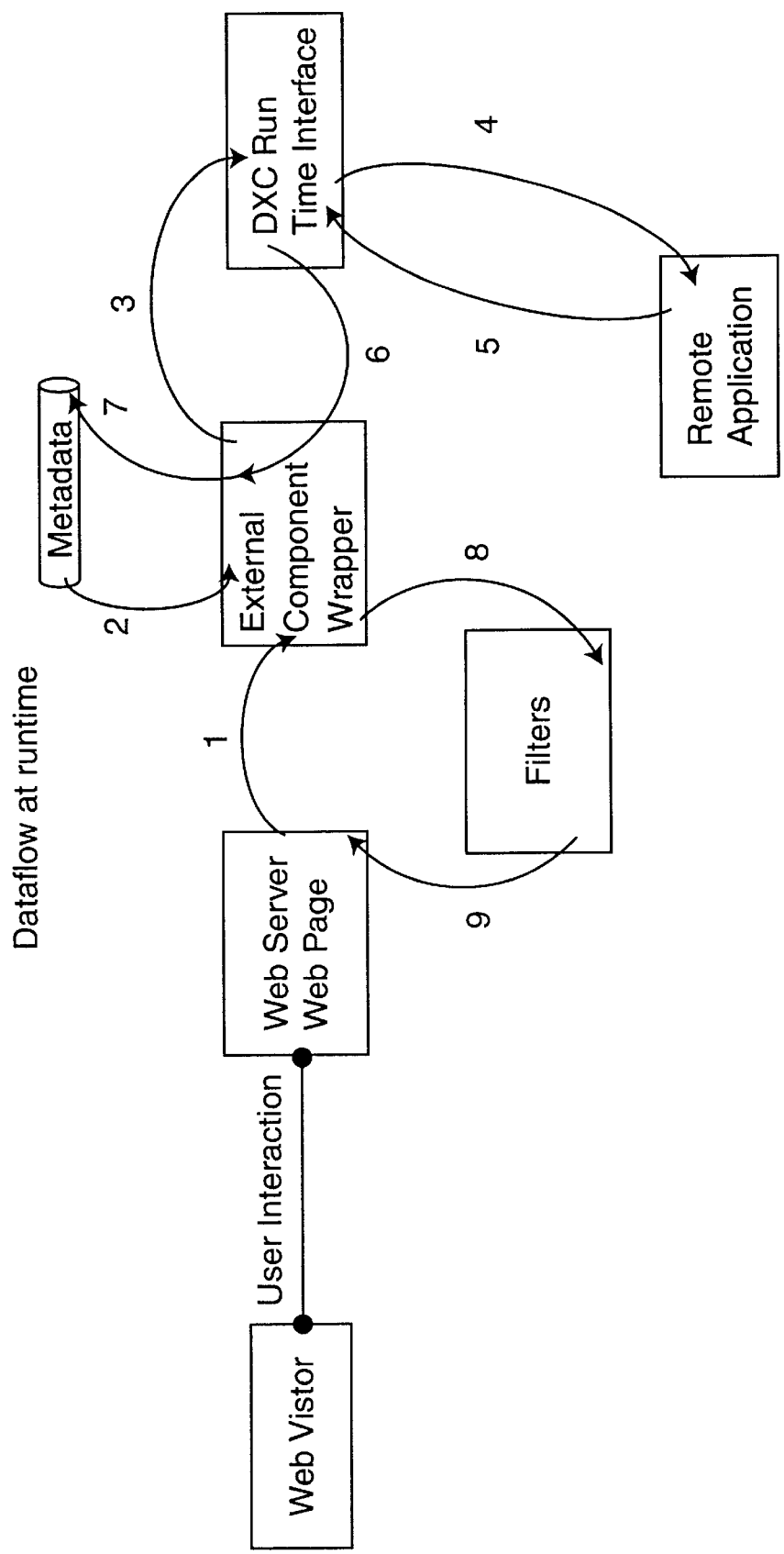
Figure 80:
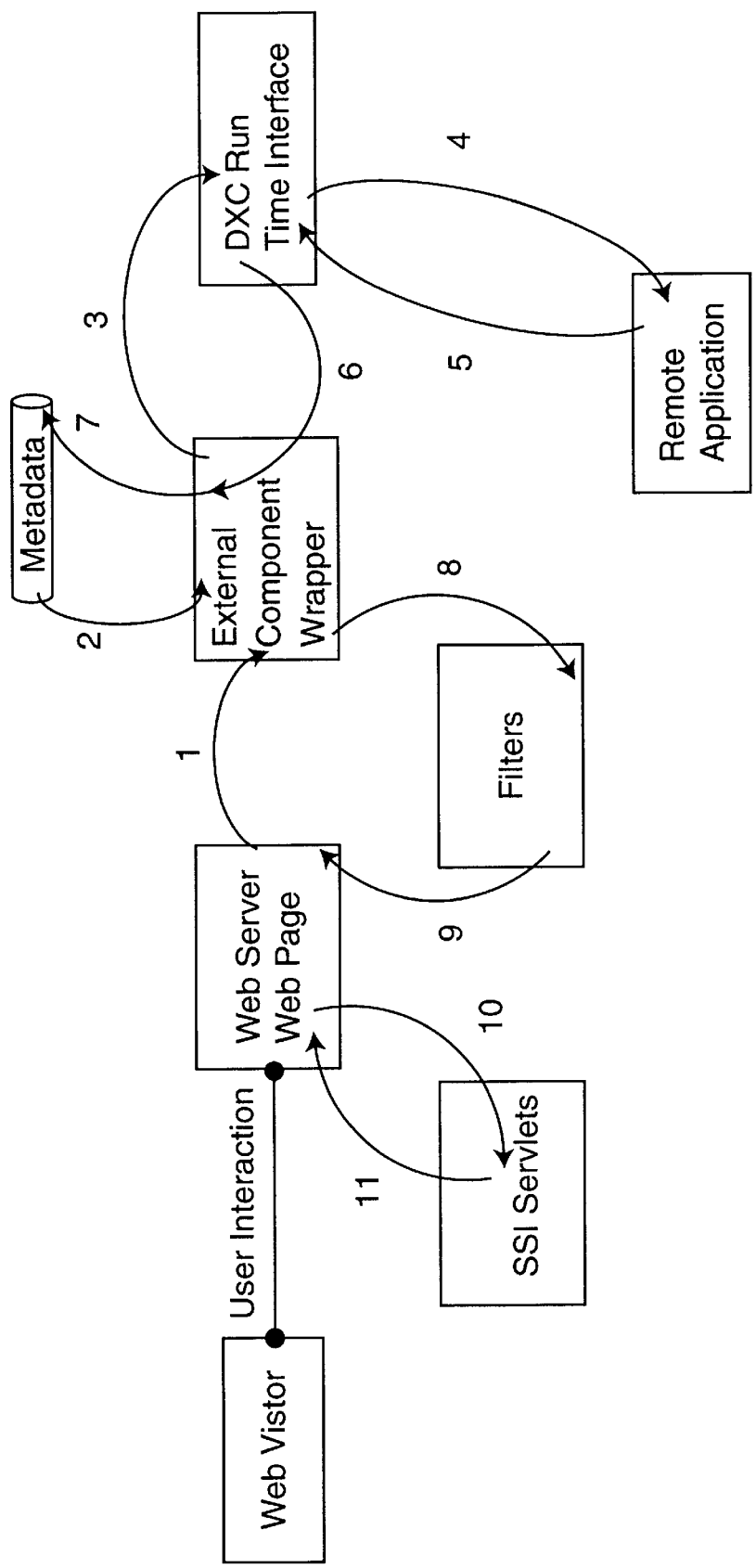
Figure 81:
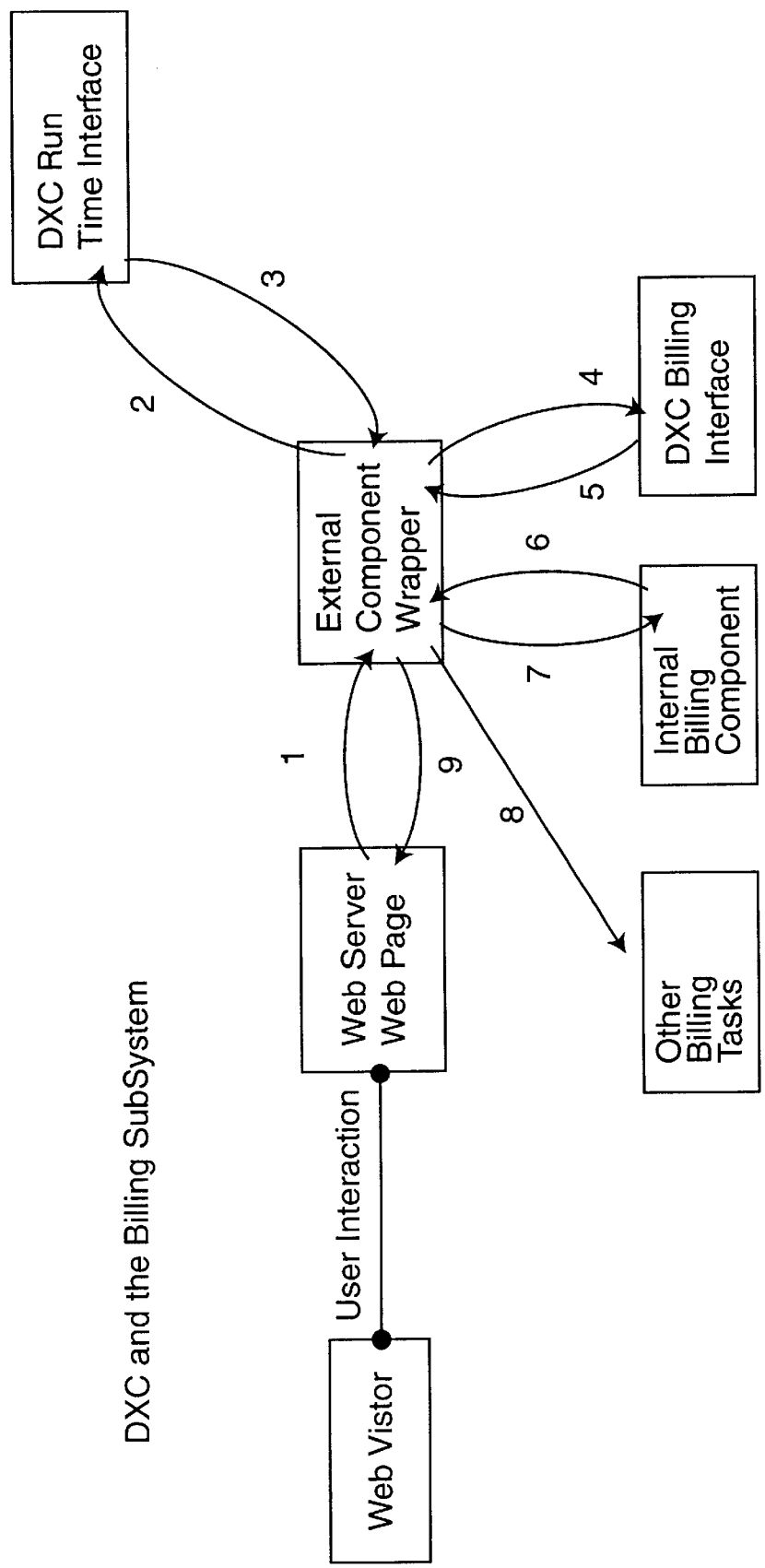
Figure 82:
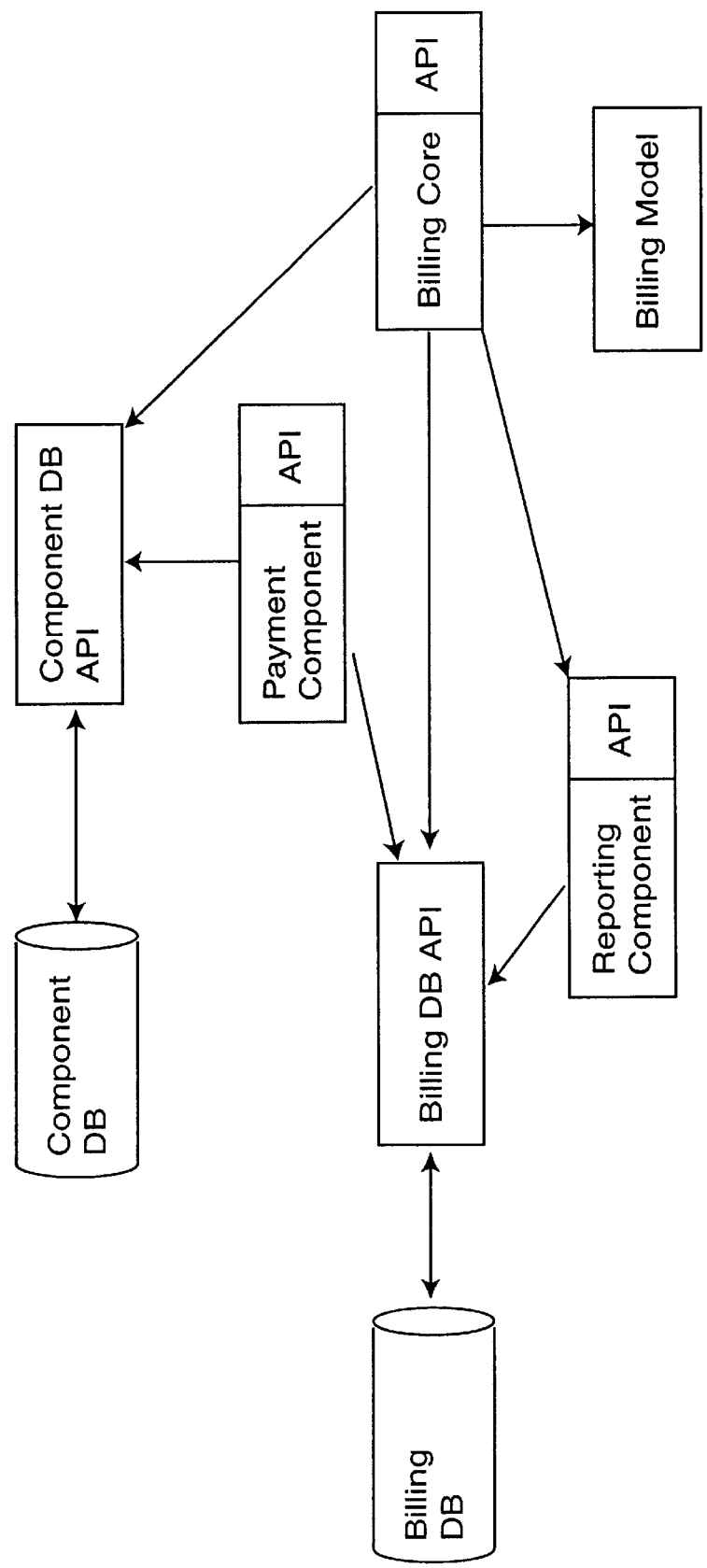

FIG. 79 shows the interaction between a DXC and a billing sub system.

Parts 1, 2 and 3 are similar to those described in FIGS. 76 and 77.

Part 4: The Billing HTTP interface is called with the relevant parameters passed in.

Part 5: While the data from the HTTP response is saved as metadata for the runtime interface, the data may be saved in the billing database.

Part 6: If a billing interface was not registered, then depending on the internal billing model chosen during registration, an internal interface may be invoked.

Part 8: Irrespective of which billing interface is used, several other billing tasks are performed.

Billing Database ("DB") API

The Billing DB API is provided to save and return billing information per user per DXC version (Registration ID). A Billing Information Class defines the types of data stored in a billing information structure. Thus, the Billing DB API allows DXC developers to get statistics on DXC usage.

A Payment DXC accepts secure payments for DXCs, stores the resulting billing information via the Billing API (uses the DXC DB API to retrieve information regarding the DXC), and facilitates payment to the DXC owners. Payments may be made per DXC or per developer.

A report on the amount of credit available may be generated with a warning on low credit (via email). A trigger that determines the low credit warning may be specified as a percentage. A reporting API provides the API's that a billing core may use to trigger a warning if the credit is low.

A Billing Core provides the basic functionality of verifying that a DXC may be used. The steps include: incrementing the usage counter (it is the only module that knows about the billing model); save information about the billing model via the Billing DB API; and interface with DXCs that have been paid for by sponsors. A Billing Core API increments usage and tests if the DXC been paid for.

Rules

At registration a DXC developer is presented with a choice of the following billing options: billing via the developer's own interface; a predetermined provider billing system; no billing (no usage tracking either); free (no charge); or one of a number of other models (e.g., free for the first x days or y uses, then charged . . . ). If the DXC has a registered billing interface then this interface is called every time the DXC is used. A name value pair returns the result. If a user chooses "No billing," then billing API's are not used. If the DXC is Free, then the usage is tracked. If the DXC is not free and there is no billing interface registered, then the billing is determined by the billing model for that particular DXC. The following are some of the billing models: free for first N days (per user); free for the first M uses (per user); and subsequent to the period during which it is free charges are applied (e.g., $X per day (per user) or $Y per use). For such billing models, N, M, X & Y need to be stored as part of the billing information.

Versioning and Billing

The billing interface invoked or the internal billing model used depends on the version of the DXC being executed. Once an older version is converted to a newer version, the billing model used becomes that of the newer one. Credit is stored per DXC or per DXC writer. Hence a user may not need to have a separate credit account just to be able to use the newer version of a DXC. Available credit is stored in a form that is independent of the billing model (stored as $). Hence it may be possible for versions of the same DXC to use different billing models.

Life Site

In accordance with another aspect of the invention, a Life Site with the Definer interface may be provided to an end-user. Life Site is a server-based interface that enables an individual to manage all personal content on the Internet in a protected environment. Individuals are able to organize, manage and store all their relevant information in a centralized storage for management of important personal information (e.g., biographical data, property, passport information, social security number, moving violations, employment history, insurance policies, product warranties, etc.). Life Site also provides the ability for an individual to manage the navigation ("surfing" or visitation") of information on the Internet through their own life site. Thus, important personal information is easily retrieved via the Web, enabling mobility and providing a greater sense of information/data security.

Since the Life Site is accessed with a Web interface, it is PC independent with the ability to manage and retrieve information from wherever there is a Web connection. Individuals are less dependent on their own ability to manage technology advances because such advances may be incorporated to the Life Site at the central server.

Extranet Business Infrastructures

In accordance with another embodiment of the invention, extranet business infrastructures may be provided under the Universal Content Manager. With an extranet created according to the invention, companies may interact with each other in a custom-built, dedicated environment which will envelop all aspects of their business operations. It is a server-based system featuring easily-managed Universal Content Manager user interfaces, enabling manufacturers, sub-contractors, wholesalers and retailers to communicate and transact with high efficiency. Among Extranet's many benefits to businesses of all sizes are:

The ability to bypass the channel conflicts inherent in broad-based Internet activity;

Professional presentations of a wide variety of information, including text, graphics, video and sound;

Secure and efficient processing and distribution of orders back-orders, transactions, billing, and account summaries;

Up-to-the-minute dialogues between inter-dependent, industry-specific business and business groups; and Streamlined general and custom-targeted communications As Extranet systems become woven into a broad variety of business landscapes, DXCs may be created and integrated into the Universal Content Manager interface by third-party developers. These participants may utilize the application program interface (API) contained in the Software Development Kit as—thereby fueling the ongoing expansion of the Universal Content Manager on an exponential, ever-widening basis.

Billing Processes

An end-user may be directed to the Web Definer welcome page 4600 to register in a number of ways:

visits the page of a Sponsor, which may be on server 105, as a result of the Sponsor's marketing effort.

visits the Web Definer welcome page 4600 as a result of marketing.

visits the page of a Sponsor as a result of a Click-Through on a Sponsor's Logo at an existing Customer's Web Site.

visits the Web Definer page 4600 as a result of a Click-Through from the Logo of the provider of Web Definer.

Once registered, the basic product offered to the customer includes their site, wrapped inside a frame. The bottom frame includes the following:

Customer Web Site Server Logo, which when clicked takes the customer to the Web Definer welcome page 4600;

Advertisement;

Sponsor's Logo, which when clicked takes the customer to the Sponsor's page (within the Universal Content Manager environment) or to the Sponsor's web site.

As a basic billable offering, the customer has the option of paying a fee (monthly or annual) to Perform Initial Registration. This is currently planned to be free, but is included here to allow the identification of the registration event.

Remove the Advertisement from the site (and reducing the size of the lower frame, but retaining the logos).

Remove the logos by completely removing the lower frame.

In addition, the customer has immediate ability to choose the following other (one-time) billable options:

Select a Domain Name from InterNIC. The customer is given the ability to select an available Domain Name from InterNIC (through an online whois facility). The Domain Name will then be set up dynamically and the appropriate registration request is sent to Transfer a Domain Name from InterNIC. The customer is allowed to initiate the transfer of an InterNIC Domain Name to, say, server 105, so that their web site is accessed with their own Domain Name based on the Definer Software Development Kit. This SDK enables Third Party Developers to implement server-based applications, called components or Definer External Components (DXC). The SDK will define a billing interface for components, which allow components to register and generate. Billing Events when the component is activated or invoked.

One component available is a Shopping Cart, which is tightly integrated with Definer. The following Billable events are for the shopping cart:

Instantiation of the Shopping cart within a Customer's Site. Currently planned to be free, but included here for identification of the billing event.

Installation of greater than 10 products within the Shopping Cart.

Installation of greater than 20 products within the Shopping Cart.

Installation of higher numbers of products within the Shopping Cart.

Additionally, a customer may trigger a billing requirement if his site usage exceeds the following resource limits:

Bandwidth Utilization.

Disc Space

Rating

With the advent of future products, it is essential that the following flexible rating modes are supported:

Start-up or one-off charge (such as a registration fee or InterNIC registration fee).

Recurring monthly or annual charge (such as removal of advertising or banners).

Fixed usage charge for utilization of a resource (such as running a spell or grammar checker on a site).

Resource Charges (such as bandwidth or disc space utilization, if exceeding the free limit).

Layered Charges (such as Shopping Cart utilization depending on number of items included in the Cart).

Currency Support

It may be a limitation that the billing solution restrict a customer to be billed in a single currency.

Collections

The following modes of payments should be accepted

One-line Credit card authorization

Off-Line

Invoice/Check

Direct Debit

Currently, Credit Card payments are processed manually in the country of the customer (USA, Australia, Hong Kong). Therefore, Definer initiates off-line processing of Credit Card payment through a batch process (written or on-line report). It also automatically generates electronic invoices for any product. Initially only email invoices will be supported, though in the future it should be possible to include other forms (e.g. fax).

Interfaces

The interfaces should be implemented in order to allow the billing system to inter-operate with the Web Definer and Hosting environments. The Web Servers, such as server 105, will be globally distributed and provide the necessary primary customer information systems. Component (SDK) Environment Ad Server Environment Customer Care Environment - Financial Systems (General Ledger).

Commissions

Sponsorship relationships for sponsoring the Web Definer may include a commission component, where a commission is paid to the Sponsor for a percentage any revenue from customer introduced as part of the relationship. The commission levels may differ for different classes of product: Full-access to Definer or limited-access to Web Definer, etc.

Security

The following security issues are achieved:

All customer interaction for payment details and other confidential information are implemented using secure connectivity, such as SSL. The Customer Control Panel has been designed to totally utilize SSL.

Any internal storage of sensitive Customer information (such as Credit card numbers) are secure from browsing by unauthorized staff. This is achieved either through the use of Internal Encryption of CC Numbers (such as the use of Blowfish by the Customer Shopping Cart), or some other mechanism.

The Billing System resides behind a Firewall to prevent any unauthorized access.

Security Audit

Additional Revenue Sources

When a software developer installs an external component, that component may be for sale. Charges may be levied for the following:

Fee to install the component and offer it for sale.

Fee to offer the component to a specific industry segment.

Fee to prioritize the listing of the component.

Additional revenue sources may include link exchange functionality.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therein.

What is claimed is:

1. A system for generating web site component data, comprising:

a registry storage for storing web site component data including data defining at least one interface for each of one or more-web site components; and an instance data storage coupled to said registry storage, said instance data storage storing instance data defining one or more instances of said one or more web site components as presented in one or more web pages, wherein each of said one or more instances of said-one or more web site components for said one or more web pages are determined based at least in part upon one or more determined characteristics of said one or more web pages in accordance with a pseudo-random algorithm.

2. The system as claimed in claim 1, wherein said at least one interface includes at least one of a runtime interface, a preview interface, an edit interface, a property page interface, a runtime event interface, a preview event interface, and an edit event interface.

3. The system as claimed in claim 2, wherein the runtime interface includes presenting an instance of the respective web site component in the one or more web pages.

4. The system as claimed in claim 2, wherein the preview interface includes presenting an instance of the respective web site component in a preview of the one or more web pages.

5. The system as claimed in claim 2, wherein the edit interface includes presenting an instance of the respective web site component in editable form in the one or more web pages.

6. The system as claimed in claim 2, wherein the property page interface includes receiving configuration data for defining an instance of the respective web site component.

7. The system as claimed in claim 2, wherein the runtime event interface includes receiving input data for modifying a component image of an instance of the respective web site component presented in the one or more web pages.

8. The system as claimed in claim 2, wherein the preview event interface includes receiving input data for modifying a component image of an instance of the respective web site component presented in a preview of the one or more web pages.

9. The system as claimed in claim 2, wherein the edit event interface includes receiving input data for editing an instance of the respective web site component in the one or more web pages.

10. The system as claimed in claim 1, further comprising an edit engine for presenting said at least one interface to a system for creating a web site.

11. The system as claimed in claim 1, further comprising a runtime engine for presenting said at least one interface to a system for presenting said one or more web pages.

12. A system for generating web site component data, comprising:
- a registry storage for storing web site component data including data defining at least one interface for each of one or more web site components;
- an instance data storage coupled to said registry storage, said instance data storage storing instance data defining one or more instances of said one or more web site components as presented in one or more web pages;
- an input for receiving data entry; and
- a multi-purpose computing device coupled to said registry storage, said instance data storage, and said input, said multi-purpose computing device adapted to perform the steps of:
  - determining one or more characteristics for each of one or more web site dimensions in response to the data entry, each of said one or more characteristics being determined based at least in part upon one or more of said determined characteristics in accordance with a pseudo-random algorithm;
  - generating a description of the web site based upon the one or more determined characteristics for each of the one or more web site dimensions;
  - retrieving web site data in accordance with the generated description of the web site;
  - generating one or more pages of the web site based upon the description of the web site and the retrieved web site data; and
  - presenting the generated web site, wherein
  the retrieved web site data includes the web site component data for at least one designated web site component designated by the generated description of the web site.

13. The system as claimed in claim 12, wherein the at least one designated web site component is presented in a plurality of portions of the web site.

14. The system as claimed in claim 13, wherein the multi-purpose computing device is further adapted to perform the step of modifying the instance data for the at least one designated web site component presented in one of the plurality of portions of the web site.

15. The system as claimed in claim 13, wherein the multi-purpose computing device is further adapted to perform the step of modifying the instance data for the at least one designated web site component thereby modifying the presentation of the at least one designated web site component in one of the plurality of portions of the web site.

16. The system as claimed in claim 12, wherein the at least one designated web site component is presented in a plurality of pages of the web site.

17. The system as claimed in claim 16, wherein the multi-purpose computing device is adapted to further perform the step of modifying the instance data for the at least one designated web site component presented in the plurality of pages of the web site.

18. The system as claimed in claim 16, wherein the multi-purpose computing device is further adapted to perform the step of modifying the instance data for the at least one designated web site component thereby modifying the presentation of the at least one designated web site component in one of the plurality of pages of the web site.

19. The system as claimed in claim 12, wherein the multi-purpose computing device is further adapted to perform the step of generating instance data for the at least one designated web site component.

20. The system as claimed in claim 19, wherein the multi-purpose computing device is further adapted to perform the step of storing the generated instance data in the instance data storage.

21. The system as claimed in claim 19, wherein the multipurpose computing device generates the instance data based upon the one or more characteristics for the one or more web site dimensions.

22. A system for generating web site component data, comprising:
- a registry storage for storing web site component data including data defining at least one interface for each of one or more web site components;
- an instance data storage coupled to said registry storage, said instance data storage storing instance data defining one or more instances of said one or more web site components as presented in one or more web pages; and
- a multi-purpose computing device coupled to said registry storage and said instance data storage, said multi-purpose computing device adapted to perform the steps of:
  - determining one or more characteristics for each of one or more web site dimensions, each of said one or more characteristics being determined based at least in part upon one or more of said determined characteristics in accordance with a pseudo-random algorithm;
  - generating a description of the web site based upon the one or more determined characteristics for each of the one or more web site dimensions, at least one of the characteristics designating at least one web site component to be included in one or more portions of the description of the web site;
  - retrieving web site data in accordance with the generated description of the web site;
  - generating one or more pages of the web site based upon the description of the web site and the retrieved web site data; and
  - presenting the generated web site; and
- an input for receiving modification data modifying the at least one of the characteristics, wherein
  the retrieved web site data includes the web site component data for the at least one designated web site component, and
  the multi-purpose computing device is adapted to further perform the step of modifying the instance data for the at least one designated web site component based upon the modified characteristics.

23. A system for generating web site component data, comprising:
a registry storage for storing web site component data including data defining at least one interface for each of one or more web site components;
an instance data storage coupled to said registry storage, said instance data storage storing in stance data defining one or more instances of said one or more web site components as presented in one or more web pages; and
a characteristic data storage coupled to said instance data storage, said characteristic data storage storing characteristic data defining one or more characteristics for one or more web site dimensions, wherein
each of said one or more characteristics for one or more web site dimensions is determined based at least in part upon one or more of said determined characteristics in accordance with a pseudo-random algorithm, and
the instance data is generated based upon the characteristic data.

24. A method of generating web site component data, comprising the steps of:
storing web site component data including data defining at least one interface for each of one or more web site components; and
storing instance data defining one or more instances of said one or more web site components as presented in one or more web pages, wherein
each of said one or more instances of said one or more web site components for said one or more web pages are determined based at least in part upon one or more determined characteristics of said one or more web pages in accordance with a pseudo-random algorithm.

25. The method as claimed in claim 24, wherein said at least one interface includes at least one of a runtime interface, a preview interface, an edit interface, a property page interface, a runtime event interface, a preview event interface, and an edit event interface.

26. The method as claimed in claim 25, wherein the runtime interface includes presenting an instance of the respective web site component in the one or more web pages.

27. The method as claimed in claim 25, wherein the preview interface includes presenting an instance of the respective web site component in a preview of the one or more web pages.

28. The method as claimed in claim 25, wherein the edit interface includes presenting an instance of the respective web site component in editable form in the one or more web pages.

29. The method as claimed in claim 25, wherein the property page interface includes receiving configuration data for defining an instance of the respective web site component.

30. The method as claimed in claim 25, wherein the runtime event interface includes receiving input data for modifying a component image of an instance of the respective web site component presented in the one or more web pages.

31. The method as claimed in claim 25, wherein the preview event interface includes receiving input data for modifying a component image of an instance of the respective web site component presented in a preview of the one or more web pages.

32. The method as claimed in claim 25, wherein the edit event interface includes receiving input data for editing an instance of the respective web site component in the one or more web pages.

33. The method as claimed in claim 24, further comprising the step of presenting said at least one interface to a process of creating a web site.

34. The method as claimed in claim 24, further comprising the step of presenting said at least one interface to a process of presenting said one or more web pages.

35. A method of generating web site component data, comprising the steps of:
storing web site component data including data defining at least one interface for each of one or more web site components;
storing instance data defining one or more instances of said one or more web site components as presented in one or more web pages;
receiving data entry;
determining one or more characteristics for each of one or more web site dimensions in response to the data entry, each of said one or more characteristics being determined based at least in part upon one or more of said determined characteristics in accordance with a pseudo-random algorithm;
generating a description of the web site based upon the one or more determined characteristics for each of the one or more web site dimensions;
retrieving web site data in accordance with the generated description of the web site;
generating one or more pages of the web site based upon the description of the web site and the retrieved web site data; and
presenting the generated web site; wherein
the retrieved web site data includes the web site component data for at least one designated web site component designated by the generated description of the web site.

36. The method as claimed in claim 35, wherein the at least one designated web site component is presented in a plurality of portions of the web site.

37. The method as claimed in claim 36, further comprising the step of modifying the instance data for the at least one designated web site component presented in one of the plurality of portions of the web site.

38. The method as claimed in claim 36, further comprising the step of modifying the instance data for the at least one designated web site component thereby modifying the presentation of the at least one designated web site component in one of the plurality of portions of the web site.

39. The method as claimed in claim 35, wherein the at least one designated web site component is presented in a plurality of pages of the web site.

40. The method as claimed in claim 39, further comprising the step of modifying the instance data for the at least one designated web site component presented in the plurality of pages of the web site.

41. The method as claimed in claim 39, further comprising the step of modifying the instance data for the at least one designated web site component thereby modifying the presentation of the at least one designated web site component in one of the plurality of pages of the web site.

42. The method as claimed in claim 35, further comprising the step of generating instance data for the at least one designated web site component.

43. The method as claimed in claim 42, further comprising the step of storing the generated instance data in the instance data storage.

44. The method as claimed in claim 42, wherein the instance data is generated based upon the one or more characteristics for the one or more web site dimensions.

45. A method for generating web site component data, comprising the steps of:
- storing web site component data including data defining at least one interface for each of one or more web site components;
- storing instance data defining one or more instances of said one or more web site components as presented in one or more web pages;
- determining one or more characteristics for each of one or more web site dimensions, each of said one or more characteristics being determined based at least in part upon one or more of said determined characteristics in accordance with a pseudo-random algorithm;
- generating a description of the web site based upon the one or more determined characteristics for each of the one or more web site dimensions, at least one of the characteristics designating at least one web site component to be included in one or more portions of the description of the web site;
- retrieving web site data in accordance with the generated description of the web site;
- generating one or more pages of the web site based upon the description of the web site and the retrieved web site data;
- presenting the generated web site;
- receiving modification data modifying the at least one of the characteristics; and
- modifying the instance data for the at least one designated web site component based upon the modified characteristics, wherein
    the retrieved web site data includes the web site component data for the at least one designated web site component.

46. A method for generating web site component data, comprising the steps of:
- storing web site component data including data defining at least one interface for each of one or more web site components;
- storing instance data defining one or more instances of said one or more web site components as presented in one or more web pages; and
- storing characteristic data defining one or more characteristics for one or more web site dimensions, wherein
    each of said one or more characteristics for one or more web site dimensions is determined based at least in part upon one or more of said determined characteristics in accordance with a pseudo-random algorithm, and
    the instance data is generated based upon the characteristic data.

47. A system for generating web site component data, comprising:
- means for storing web site component data including data defining at least one interface for each of one or more web site components; and
- means for storing instance data defining one or more instances of said one or more web site components as presented in one or more web pages, wherein
    each of said one or more instances of said one or more web site components for said one or more web pages are determined based at least in part upon one or more determined characteristics of said one or more web pages in accordance with a pseudo-random algorithm.

48. A system for generating web site component data, comprising:
- means for storing web site component data including data defining at least one interface for each of one or more web site components;
- means for storing instance data defining one or more instances of said one or more web site components as presented in one or more web pages;
- means for receiving data entry;
- means for determining one or more characteristics for each of one or more web site dimensions in response to the data entry, each of said one or more characteristics being determined based at least in part upon one or more of said determined characteristics in accordance with a pseudo-random algorithm;
- means for generating a description of the web site based upon the one or more determined characteristics for each of the one or more web site dimensions;
- means for retrieving web site data in accordance with the generated description of the web site;
- means for generating one or more pages of the web site based upon the description of the web site and the retrieved web site data; and
- means for presenting the generated web site, wherein
    the retrieved web site data includes the web site component data for at least one designated web site component designated by the generated description of the web site.

49. A system for generating web site component data, comprising:
- means for storing web site component data including data defining at least one interface for each of one or more web site components;
- means for storing instance data defining one or more instances of said one or more web site components as presented in one or more web pages;
- means for determining each of one or more web site dimensions, each of said one or more characteristics being determined based at least in part upon one or more of said determined characteristics in accordance with a pseudo-random algorithm;
- means for generating a description of the web site based upon the one or more determined characteristics for each of the one or more web site dimensions, at least one of the characteristics designating at least one web site component to be included in one or more portions of the description of the web site;
- means for retrieving web site data in accordance with the generated description of the web site;
- means for generating one or more pages of the web site based upon the description of the web site and the retrieved web site data;
- means for presenting the generated web site;
- means for receiving modification data modifying the at least one of the characteristics; and
- means for modifying the instance data for the at least one designated web site component based upon the modified characteristics, wherein the retrieved web site data includes the web site component data for the at least one designated web site component.

50. A system for generating web site component data, comprising:

means for storing web site component data including data defining at least one interface for each of one or more web site components;

means for storing instance data defining one or more instances of said one or more web site components as presented in one or more web pages; and means for storing characteristic data defining one or more characteristics for one or more web site dimensions, wherein each of said one or more characteristics for one or more web site dimensions is determined based at least in part upon one or more of said determined characteristics in accordance with a pseudo-random algorithm, and the instance data is generated based upon the characteristic data.

* * * * *